United States Patent
Reed et al.

(10) Patent No.: US 7,051,018 B2
(45) Date of Patent: May 23, 2006

(54) MULTIMEDIA SEARCH SYSTEM

(75) Inventors: Michael Reed, Chicago, IL (US); Greg Bestick, Lacosta, CA (US); Carol Greenhalgh, Austin, TX (US); Norman J. Bastin, Chicago, IL (US); Ron Carlton, San Marcos, CA (US); Stanley D. Frank, Chicago, IL (US); Dale Good, Evanston, IL (US); Neil Holman, Buffalo Grove, IL (US); Carl Holzman, Chicago, IL (US); Ann Jensen, Austin, TX (US); Harold Kester, San Diego, CA (US); Dave Maatman, Solana Beach, CA (US); Edwardo Munevar, San Diego, CA (US); Derryl Rogers, Carlsbad, CA (US)

(73) Assignee: Encyclopaedia Britannica, Inc., Chicago, IL (US)

( * ) Notice: Subject to any disclaimer, the term of this patent is extended or adjusted under 35 U.S.C. 154(b) by 0 days.

(21) Appl. No.: 11/150,812

(22) Filed: Jun. 13, 2005

(65) Prior Publication Data

US 2005/0251515 A1    Nov. 10, 2005

Related U.S. Application Data

(63) Continuation of application No. 10/103,814, filed on Mar. 25, 2002, which is a continuation of application No. 08/202,985, filed on Feb. 28, 1994, now Pat. No. 6,546,399, which is a continuation of application No. 08/113,955, filed on Aug. 31, 1993, now abandoned, which is a continuation of application No. 07/426,917, filed on Oct. 26, 1989, now Pat. No. 5,241,671.

(51) Int. Cl.
    *G06F 17/30*    (2006.01)

(52) U.S. Cl. .................. 707/3; 715/700; 345/418
(58) Field of Classification Search ................ 707/3; 715/700; 345/418
    See application file for complete search history.

(56) References Cited

U.S. PATENT DOCUMENTS

| RE30,666 E | 7/1981 | Mitchell et al. |
| 4,422,158 A | 12/1983 | Galie |
| 4,542,477 A | 9/1985 | Noyori et al. |

(Continued)

FOREIGN PATENT DOCUMENTS

EP    0 172 357    2/1986

(Continued)

OTHER PUBLICATIONS

Kishimoto, J., "A Browsing Methods For Image Database On The Microfilm Library Devices", TENCOM '89-IEEE Reg. 10 Conf. on Computer and Communication . . . (Aug. 1989) pp. 974-977.

(Continued)

*Primary Examiner*—Wayne Amsbury
(74) *Attorney, Agent, or Firm*—Dickstein Shapiro Morin & Oshinsky LLP

(57) ABSTRACT

A database search system that retrieves multimedia information in a flexible, user friendly system. The search system uses a multimedia database consisting of text, picture, audio and animated data. That database is searched through multiple graphical and textual entry paths. Those entry paths include an idea search, a title finder search, a topic tree search, a picture explorer search, a history timeline search, a world atlas search, a researcher's assistant search, and a feature articles search.

129 Claims, 20 Drawing Sheets

U.S. PATENT DOCUMENTS

| | | | |
|---|---|---|---|
| 4,553,206 A * | 11/1985 | Smutek et al. ............... | 707/101 |
| 4,558,300 A * | 12/1985 | Goldman ............... | 340/286.14 |
| 4,587,635 A | 5/1986 | Hashimoto et al. | |
| 4,616,220 A * | 10/1986 | Grunewald et al. ......... | 345/501 |
| 4,630,209 A | 12/1986 | Saito et al. | |
| 4,646,089 A | 2/1987 | Takanabe et al. | |
| 4,658,351 A | 4/1987 | Teng | |
| 4,661,811 A * | 4/1987 | Gray et al. ................. | 345/636 |
| 4,674,006 A | 6/1987 | Driller | |
| 4,675,676 A | 6/1987 | Takanabe et al. | |
| 4,677,570 A | 6/1987 | Taki | |
| 4,685,001 A | 8/1987 | Martin | |
| 4,695,975 A | 9/1987 | Bedrij | |
| 4,703,425 A | 10/1987 | Muraki | |
| 4,716,404 A | 12/1987 | Tabata et al. | |
| 4,717,971 A | 1/1988 | Sawyer | |
| 4,720,849 A | 1/1988 | Tayama | |
| 4,724,523 A | 2/1988 | Kucera | |
| 4,729,043 A | 3/1988 | Worth | |
| 4,739,477 A | 4/1988 | Barker et al. | |
| 4,752,908 A | 6/1988 | Bouillot | |
| 4,754,326 A | 6/1988 | Kram et al. | |
| 4,757,302 A | 7/1988 | Hatakeyama et al. | |
| 4,758,955 A | 7/1988 | Chen | |
| 4,768,144 A | 8/1988 | Winter et al. | |
| 4,774,596 A | 9/1988 | Hashimoto | |
| 4,775,935 A | 10/1988 | Yourick | |
| 4,779,080 A | 10/1988 | Coughlin et al. | |
| 4,780,717 A | 10/1988 | Takanabe et al. | |
| 4,798,543 A | 1/1989 | Spiece | |
| 4,803,643 A | 2/1989 | Hickey | |
| 4,804,328 A | 2/1989 | Barrabee | |
| 4,805,134 A | 2/1989 | Calo et al. | |
| 4,811,217 A | 3/1989 | Tokizane et al. | |
| 4,814,972 A | 3/1989 | Winter et al. | |
| 4,823,306 A | 4/1989 | Barbic et al. | |
| 4,829,169 A | 5/1989 | Watanabe | |
| 4,829,423 A | 5/1989 | Tennant et al. | |
| 4,831,610 A | 5/1989 | Hoda et al. | |
| 4,839,853 A | 6/1989 | Deerwester et al. | |
| 4,847,604 A | 7/1989 | Doyle | |
| 4,868,750 A | 9/1989 | Kucera et al. | |
| 4,870,575 A | 9/1989 | Rutenberg | |
| 4,870,576 A | 9/1989 | Tornetta | |
| 4,873,513 A | 10/1989 | Soults | |
| 4,873,643 A | 10/1989 | Powell | |
| 4,890,104 A | 12/1989 | Takanabe et al. | |
| 4,899,292 A | 2/1990 | Montagna et al. | |
| 4,905,094 A | 2/1990 | Pocock | |
| 4,907,188 A | 3/1990 | Suzuki | |
| 4,912,671 A | 3/1990 | Ishida | |
| 4,914,586 A | 4/1990 | Swinehart et al. | |
| 4,916,655 A | 4/1990 | Ohsone et al. | |
| 4,923,314 A | 5/1990 | Blanchard, Jr. et al. | |
| 4,931,950 A | 6/1990 | Isle et al. | |
| 4,939,689 A | 7/1990 | Davis et al. | |
| 4,939,822 A * | 7/1990 | Henn ........................ | 24/271 |
| 4,945,476 A | 7/1990 | Bodick et al. | |
| 4,954,981 A | 9/1990 | Dehner | |
| 4,967,375 A * | 10/1990 | Pelham et al. ............... | 345/564 |
| 4,982,344 A | 1/1991 | Jordan | |
| 4,985,697 A | 1/1991 | Boulton | |
| 4,998,248 A | 3/1991 | Matsuzaki | |
| 5,002,491 A | 3/1991 | Abrahamson | |
| 5,019,961 A | 5/1991 | Addesso et al. | |
| 5,030,100 A | 7/1991 | Hilderman | |
| 5,030,117 A | 7/1991 | Delorme | |
| 5,043,929 A | 8/1991 | Kramer et al. | |
| 5,053,956 A | 10/1991 | Donald et al. | |
| 5,056,021 A | 10/1991 | Ausborn | |
| 5,056,029 A | 10/1991 | Cannon | |
| 5,065,345 A | 11/1991 | Knowles et al. | |
| 5,091,852 A | 2/1992 | Tsuchida et al. | |
| 5,099,426 A | 3/1992 | Carlgren et al. | |
| 5,109,399 A * | 4/1992 | Thompson ............. | 379/201.08 |
| 5,109,482 A | 4/1992 | Bohrman | |
| 5,111,409 A | 5/1992 | Gasper et al. | |
| 5,121,477 A | 6/1992 | Koopmans et al. | |
| 5,123,088 A | 6/1992 | Kasahara et al. | |
| 5,133,052 A | 7/1992 | Bier et al. | |
| 5,146,404 A | 9/1992 | Calloway et al. | |
| 5,148,522 A | 9/1992 | Okazaki | |
| 5,150,109 A | 9/1992 | Berry | |
| 5,157,783 A | 10/1992 | Anderson et al. | |
| 5,159,669 A | 10/1992 | Trigg et al. | |
| 5,172,245 A | 12/1992 | Kita et al. | |
| 5,231,584 A | 7/1993 | Nimura et al. | |
| 5,235,680 A | 8/1993 | Bijnagte | |
| 5,241,671 A | 8/1993 | Reed et al. | |
| 5,250,787 A | 10/1993 | Arii et al. | |
| 5,274,758 A | 12/1993 | Beitel et al. | |
| 5,408,655 A | 4/1995 | Oren et al. | |
| 6,546,399 B1 | 4/2003 | Reed et al. | |

FOREIGN PATENT DOCUMENTS

| | | |
|---|---|---|
| EP | 0 206 214 | 12/1986 |
| EP | 0 272 158 | 6/1988 |
| GB | 2105075 | 3/1983 |
| JP | S59-85599 | 5/1984 |
| JP | S60-230684 | 11/1985 |
| JP | 62-151884 | 7/1987 |
| JP | 62-151885 | 7/1987 |
| JP | S63-18386 | 1/1988 |
| JP | S63-251900 | 10/1988 |
| WO | WO 8802152 | 3/1988 |

OTHER PUBLICATIONS

Tabuchi, M., et al., "MESOD: The Metric Spatial Object Data Model For A Multimedia Application: Hyperbook", COMPCON Spring '89 IEEE Computer Society Int'l. Conf. (Apr. 1989) pp. 396-401.

Tonomura, Y., et al., "Content Oriented Visual Interface Using Icons For Visual Database Systems"; Visual Languages, 1989 IEEE Workshop (Apr. 1989) pp. 68-73.

Irven, J.H., et al., "Multi-media Information Services: A Laboratory Study", IEEE Communications Magazine, 26(b) (Jun. 1988), pp. 27-44.

Marchionni, G., et al., "Finding Facts vs. Browsing Knowledge In Hypertext Systems", Computer Magazine (Jan. 1988), pp. 70-79.

Holland, M.P., ZyINDEX: Full Text Retrieval Power, Online Magazine (Jul. 1985) pp. 38-42.

Wang, G., et al., LITREF—"A Multicomputer Based Information Retrieval System Supporting Stroke Diagnosis Design and Development", Computer Based Medical Systems, 1989 Symposium-IEEE (Jul. 1989) pp. 46-51.

Tseng, G., et al., "What's The Benefit Of A Compact Disk? (Review of Kirk-Othmer Encyclopedia of Chemical Technology"; Nature, vol. 333 (Jun. 1988).

Brady, H., "Interactive Multimedia: The Next Wave", Classroom Computer Learning (Sep. 1989) pp. 56-61.

Koved, L., et al., "Embedded Menus: Selecting Items In Context", Communication Of The ACM, 29(4), (Apr. 1986), pp. 312-318.

Schneiderman, B. et al., "The Hyperties Electronic Encyclopedia: An Evaluation Of Three Museum Installations", J. of American Society of Information Sciences, 40(3) (May 1989).

Brawer, J., "A+ Teacher's Toolbox: World GeoGraph Harnesses Ilgs Technology & Delivers A Unique Learning Tool", A+, vol. 7, No. 5, (May 1989), p. 88(3).

Johnson, Eric W., "Sales Letter & Order Form" (For Purchase of the, "McGraw-Hill CD-ROM Science & Technical Reference Set" from publisher McGraw-Hill (per E.W. Johnson), to Encyclopedia Britannica Co., (per N. Taylor), dated Apr. 7, 1987.

Mueller, S., "Peripherals" in: "Upgrading & Repairing PCs", pp. 435-448.

Laserdisk News, "Ebook's New Electronic Artr Anthology Being Distributed by EBSCO", Online Magazine (Jan. 1989) p. 81.

Christodoulakis, S., et al., "The Multimedia Object Presentation Manager of MINOS: A Symmetric Approach", SIGMOD '86-ACM, SIGMOD Record 15(2), (Jun. 1986) pp. 295-310.

Thompson, R.H., et al., "Support For Browsing In An Intelligent Text Retrieval System", Int, J. Man-Machine Studies (1989) 30, pp. 639-668.

Fox, E.A., "Optical Disks and CD-ROM: Publishing and Access", in Annual Review of Information Science & Technology, vol. 23 (1988); pp. 85-124.

"Compton's Multimedia Encyclopedia User's Guide", Britannica Software, Inc. (San Francisco, 1991).

APS Text Search and Retrieval-Classroom Manual, Prepared for USPTO, Planning Research Corp., (McLean, VA), Chemical Abstracts Service (Columbus, OH) no date.

Feiner, Steven, et al., An Experimental System for Creating and Presenting Interactive Graphical Documents, ACM Transactions on Graphics, vol. 1, Jan. 1982, pp. 59-77.

McGlynn, T.A., et al., Connecting on Optical Disk Archive with a Relational Database Catalogue, [1988?], Space Telescope Science Institute, USA, pp. 535-541.

Field, Cynthia E., Where The Heck Am I?, InCider, Oct. 1989, pp. 48-53.

O'Connor, Richard J., Integrating Optical Videodisc and CD/ROM Technology to Teach Art History, Journal of Educational Technology Systems, vol. 17 (1), 1988-89, Barwood Rub, Co., Inc., pp. 27-32.

Glushko, Robert J., et al., "Hypertext Engineering": Practical Methods for Creating A Compact Disc Encyclopedia, Proceedings-ACM Conference on Document Processing Systems, Dec. 5-9, 1988, Santa Fe, NM, pp. 11-19.

Dureau, J-M., Videralp: An Optical Analog Disk Planed in the Rhone Alpes Region, [1986?], Ecole Nationale Superieure des Biblioteques, Francheville, France.

Crawford, R.G., and Becker, H.S., Toward the Development of Interfaces for Untrained Users, ASIS Proceedings, 1985, pp. 236-239.

Barney, Ron, Getting It All on Disc, CD-ROM Review, pp. 26-27.

Aigrain, P., Organising Image Banks for Visual Access: Model and Techniques, [1987?], Laboratoire Langage et Systemes Informatiques, Universite Paul Sabatier, Toulouse, France, pp. 257-270.

Glushko, Robert J., Transforming Text Into Hypertext for a Compact Disc Encyclopedia, CHI '89 "Wings for the Mind"Conference Proceedings, Austin, TX, Apr. 30-May 4, 1989, ACM Press, pp. 293-298.

Rawles, Richard, HyperTime, Macworld, Apr. 1988, p. 127.

Swaine, Michael, Time Table of Science and Innovation, MacUser, May 1989, pp. 208-209.

Batley, S., Visual Information Retrival: Browsing Strategies in Pictorial Databases, University of Aberdeen, UK. Pp. 373-381 No Date.

Veith, Richard H., Information Retrieval and Spatial Orientation, ASIS Proceedings, 1985, pp. 250-254.

McAlpine, Gordon and Ingwersen, Peter, Integrated Information Retrieval in a Knowledge Worker Support System, © 1989 ACM, Association for Computing Machinery, pp. 48-47.

Lewis, Peter H. Planetarium on a Screen, New York Times Science, Sep. 12, 1989.

Christodoulakis, S., et al., Multimedia Document Presentation, Information Extraction, and Document Formation in MINOS: A Model and a System, ACM Transactions on Office Information Systems, vol. 4, No. 4, Oct. 1986, pp. 345-383.

Hewitt, Thomas T., The Drexel Disk: An Electronic "Guidebook", [1986?] Drexel University, Philadelphia, PA pp. 115-129.

Salomon, Gitta, et al., Using Guides to Explore Multimedia Databases, Proceedings of the 22nd Annual Hawaii International Conference on Systems Sciences, vol. IV: Emerging Technologies and Applications Track (IEEE Cat. No. 89th0245) pp. 3-12, 0073-1129/89/000/0003, © 1989 IEEE.

Yankelovich, Nicole, et al, Reading And Writing the Electronic Book, Computer, IEEE, Oct. 1985, pp. 15-30.

Ropiequet, Suzanne, The Microsoft Multimedia Encyclopedia, Jun. 1986, Paper presented at an Invitational Conference on Multimedia in Education, Cupertino, CA, Jun. 19-20, 1986, Published in Learning Tomorrow, ERIC-ED302194, pp. 303-318.

Frisse, Mark E., Searching for Information in a Hypertext Medical Handbook, Communications of the ACM, vol. 31. No. 7 Jul. 1988, pp. 880-886.

Klinger, Joseph W., et al., Using Hypermedia to Teach Cardiovascular Imaging, A Prototype System Based on HyperCard.TM., 0276-6574//89/0000/0457 IEEE . COPYRGT.1989, pp. 457-460.

Salton, Gerard, Another Look at Automatic Test-Retrieval Systems, Communications of the ACM, Jul. 1986, vol. 29, No. 7, .COPYRGT.1986 ACM, pp. 648-656.

Weyer, Stephen and Borning, Alan H., A Prototype Electronic Encyclopedia, ACM Transactions on Office Information Systems, vol. 3, No. 1, Jan. 1985, pp. 63-88.

Seefeldt, Paula, PC Update, PC Magazine (Ziff-Davis Pub. Co.), vol. 7, No. 22, Dec. 27, 1988, p. 59.

Nielsen, Brian, The second annual CD/ROM Expo:the latest in the technology, CD-ROM Librarian (Meckler Corp.), vol. 3, No. 10, Nov. 1988, p. 14.

Ryan, Joe and Philbin, Paul, CD-ROM databases product directory, CD-ROM Librarian (Meckler Corp.), vol. 3, No. 10, Nov. 1988, p. 29.

Hertzke, Eugene R., Compatible means versatile: using Tandy computers to improve K-12 education; IBM PCs and compatibles special issue, T H E Journal (Technological Horizons in Education), vol. 16, No. 4, Nov. 1988, p. S62.

Coursey, David, Few CD-ROM Strategies, but many archive needs, MIS Week (Fairchild Publications, Inc.), vol. 9, No. 41, Oct. 10, 1988, p. 9.

Beiser, Karl, ALA CD-ROM Highlights: American Library Assoc. conference, CD-ROM Librarian (Meckler Corp.) vol. 3, No. 9, Oct. 1988, p. 4.

Meadow, Charles T., Online database industry timeline, Database (Online, Inc.), vol. 11, No. 5, Oct. 1988, p. 23.

"Library consumer's almanac for fall; buyers guide," American Libraries (ALA), vol. 19, No. 9, Oct. 1988, p. 771.

Reeves, Perry and Glyer. Steve, Videodisc applications bring new promise to schools; the latest developments in the field of interactive video, CD-ROM, CD-V, and CD-I in education, T H E Journal (Technological Horizons in Education), vol. 16, No. 2, Sep. 1988, p. 68.

Tanner, Dennis P. and Bane, Robert K., CD-ROM: new technology with promise for education; part one of two articles on CD-ROM technology in education, T H E Journal (Technological Horizons in Education), vol. 16, No. 1, Aug. 1988, p. 57.

Bane, Robert K., CD-ROMs with educational applications; one of two related articles on CD-ROM; directory, T H E Journal (Technological Horizons In Education), vol. 16, No. 1, Aug. 1988, p. 58.

Robertson, Barbara, CD-ROM: a young technology with a bright future; Innovative applications are starting to appear; includes related article on how CD-ROMS store information, Lotus (International Data Group), vol. 4, No. 5, May 1988, p. 16.

Tucker, Sandra L., et al., How to manage an extensive laserdisk installation: the Texas A&M experience, Online (Online, Inc.), vol. 12, No. 3, May 1988, p. 34.

Lehrer, Ariella, A network primer: how they're used . . . and how they could be used part 3, Classroom Computer Learning (Peter Li Inc.), vol. 8, No. 7, Apr. 1988, p. 41.

Kleeman, Michael J., Hypertext adds non-linear thinking to computers, Administrative Management, the Magazine of Office Administration (Dalton Communications, Inc.), vol. 49, No. 2, Mar. 1988, p. 39.

Kleinman, Lisa, 550Mb at your fingertips; Laserdrive-1; Hardware review; Product review—CD drive; evaluation, Personal Computing (VNU Business Publications, Inc.), vol. 12, No. 2, Feb. 1988, p. 218.

Roha, Ronaleen R., Would you believe Encyclopedia Electronica? Entire set of encyclopedias on a single compact disc,Changing Times (The Kiplinger Washington Editors Inc.), vol. 41, Jul. 1987, p. 49.

Helliwell, John, The hand-held encyclopedia; CD-ROM which stores an entire library on a few discs, is the next frontier of computer memory, Canadian Business (CB Media Ltd.), vol. 60, Feb. 1987, p. 37.

Fletcher, Carol and Perry, Tekla, Gee Whiz! Yesterday's inconceivable gizmos are fast becoming indispensable power tools. Here's futurist inventroy., Working Woman (Working Woman, Inc.), vol. 11, Nov. 1986, p. 90.

Gabel, David, Optical-disk storage; Mass storage supplement, PC Week (Ziff-Davis Pub. Co.), vol. 3, No. 24, Jun. 17, 1986, p. 24.

Malloy, Rich, A Roundup of Optical Disk Drives, B Y T E (McGraw-Hill, Inc.), May 1986, p. 215.

Desmarais, Norman, Laser Libraries, B Y T E (McGraw-Hill, Inc.), May 1986, p. 235.

Rogers, Michael, A Library on a Disc, Newsweek, United States Edition, Apr. 21, 1986, p. 73.

Free, John, Show stoppers; review of The Consumer Electronics Show, Popular Science (Times Mirror Magazines, Inc.), vol. 228, Apr. 1986, p. 26.

Betz, Dave, Atari, B Y T E (McGraw-Hill, Inc.), p. 367.

"A Library on Optical Disks?" Machine Design (Penton Pub. Co.), vol. 58, Feb. 20, 1986, p. 106.

Schiffres, Manuel, Here They Come: Smarter PC's, U.S. News and World Report, Aug. 26, 1985, p. 44.

Scibilia, Ron, CD ROM: can laser technology light new path to home market?, Consumer Electronics (International Thomson Retail Press), vol. 13, Aug. 1985, p. A1.

Schwartz, John, A Computer Encyclopedia, Newsweek, Mar. 19, 1990, p. 45.

"Discovery; 1991 Compute Choice Awards," Compute (Compute Publications International Ltd.), vol. 13, No. 1, Jan. 1991, p. 18.

"Geoworks Ensemble Takes Top Honors at SPA Awards Ceremony; Microsoft, Ashlar, Britannica, and Maxis All Multiple Honorees," PR Newswire (PR Newswire Association, Inc.), Mar. 19, 1991, Section: Financial News.

Mendrinos, Roxanne, Compton's Multimedia Encyclopedia: a powerful CD-ROM instructional tool, Electronic Learning (Scholastic Inc.), vol. 9, No. 8, May 1990, p. 34.

Machrone, Bill, 7th Annual Awards for Technical Excellence, PC Magazine (Ziff-Davis Pub. Co.), vol. 10, No. 1, Jan. 15, 1991, p. 100.

The World GeoGrpah User's Guide, Network Version for Apple Ilgs, 1988, MECC (Minnesota Educational Computing Company) (User's Guide).

The World GeoGraph Classroom Guide,Apple Ilgs, version 1.0, 1988, MECC (Classroom Guide).

Domesday Video Disc User Guide, Peter Armstrong and Mike Tibbetts, BBC Enterprises, Ltd. 1986, pp. 9-255.

"Hypertext: A Survey And Introduction", Conklin, J., Sep. 1987.

"Direct Manipulation: A Stop Beyond Programming Languages", Shneiderman, B., Aug. 1983, 16(8).

"CDROM (vol. 1)—The New Papyrus: The Current and Future State Of The Art", Steve Lambert and Suzanne Ropiequet.

Microsoft Press "CDROM (vol. 2)—Optical Publishing: A Practical Approach To Developing CD ROM Applications", Suzanne Ropiequet, John Einberger and Bill Zoelick, circa 1986-1988.

"Hypersource On Multimedia/Hypermedia Technologies", Ching-chih Chen, circa 1989.

"Hypertext and Hypermedia", Jakob Nielsen, circa 1990-1992.

"Electronic Learning", Jun. 1989, vol. 8, No. 8, p. 26, ISSN: 0278-3258; McCarthy, Robert.

"Communications of the ACM", Jul., 1988, vol. 31; No. 7; p. 856; *ISSN: 0001-0782; Campbell, Brad; Goodman, Joseph M.

"The Hypermedia Library", Jun. 1988, vol. 11; No. 3; p. 43, ISSN: 0162-4105, Franklin, Carl.

"A Hypertext Simulation", Electronic Learning, Mar. 1989, vol. 8; No. 5; p. 54, ISSN: 0278-3258; Newmark, Ami.

"CD-ROM Professional", Jul. 1991; vol. 4; No. 4; p. 123; ISSN: 1049-0833; Cavrak, Stephen J., Jr.

Goodman, Danny HyperCard Developer's Guide, c1988, Bantam Books, NY, NY.

Ertel, Monica, A Tour of the Stacks, Hypercard for Libraries, Online, Jan. 1989, pp. 45-50.

Hardman, Lynda, Evaluating the Usability of the Glasgow Online Hypertext, Hypermedia, Spring 1989, pp. 34-63, Edinburgh, Scotland.

Press, Larry, Thoughts and Observations at the Microsoft CD-ROM Conference, Communications of the ACM, Jul. 1989, pp. 784-789.

Christodoulakis, Stavros, Design and Performance Considerations for an Optical Disk-Based, Multimedia Object Server, IEEE, Dec. 1986, pp. 45-56.

DeMaria, Rusel, City to City, MacUser, Sep. 1988, pp. 57-58.

Cohen, P.S., et al., Video Disc Dictionary System, IBM Technical Disclosure Bulletin, Jan. 1983, p. 4209, vol. 25, No. 8.

Silverstone, Stuart, ABC News Stack Launches Real Multimedia Products, MacWEEK, Jul. 25, 1989, p. 45, vol. 3, No. 27.

Christodoulakis, Stavros, et al., Browsing Within Time-Driven Multimedia Documents, Conference on On Office Information Systems, Mar. 23-25, 1988, pp. 219-227, ACM Press.

Bobker, Steven, Ecology in Action, MacUser, Apr. 1989, pp. 205-206.

Zilber, Jon. Optical Horizons, With CD-ROM and WORM Drives, Brave New Worlds of Mega-Information Await, MacUser, Jun. 1988, pp. 157-167.

Morris, Sandra, Digital Video Interactive—A New Integrated Format for Multi-media Information, Microcomputers for Information Management 4(4), Dec. 1987, pp. 249-261.

Morris, Sandra, Old Ideas, New Technologies and Childhood, North-Holland Educating & Computing 3 (1987) 239-245.

Ripley, G. David, DVI-A Digital Multimedia Technology, Communications of the ACM. Jul. 1989, pp. 811-822, vol. 32, No. 7.

Urrows, Henry & Elizabeth, Exploring CD-ROM Encyclopedias, Optical Information Systems, Sep.-Oct. 1989, pp. 259-269, vol. 9, No. 5.

Ito, Russell, Video Disc-o-Tech, MacUser, Dec. 1988, pp. 209-220, vol. 4, No. 12.

Kamisher, Lisa M., The Images System: Videodisc and Database Integration for Architecture, Optical Information Systems, Nov.-Dec. 1986, pp. 501-503, vol. 6, No. 6, Meckler Pub. Corp., London, UK.

McMath, Charles F., et al., A Graphical Thesaurus-based Information Retrieval System, Int. J. Man-Machine Studies (1989) 31, 121-147, Academic Press.

Frei, H.P., et al., Graphical Presentation of Information and Services: A User-Oriented Interface, Information Technology: Research and Development (1983), pp. 23-42, Butterworth & Co. (Publishers) Ltd.

Wilson, Kathleen S., Palenque: An Interactive Multimedia Optical Disc Prototype for Children, Bank Street College of Education Center for Children and Technology, Mar. 1987, Working Paper No. 2, NY, NY.

Goodman, Danny, The Complete HyperCard Handbook, c1987, pp. 10-11, 17-21, 41-49, 56-57, 65-67, 97-99, 108-117, 161-175, 185-189, 407-411, 415-419, 469, 545, 605-607, Bantam Books, NY, NY.

Raymond, Darrell R., et al., Hypertext and the Oxford English Dictionary, Communications of the ACM, Jul. 1988, pp. 871-879, vol. 31, No. 7.

Acerson, Karen L., WordPerfect, Series 5 Edition, The Complete Reference, c1988, pp. 862-879, 942-945, Osborne McGraw-Hill, Berkeley, CA.

Williams, Howard, Indexing and Retrieval of Documents: Automated Techniques and Strategies, Content Based Systems (CBS), Jul. 1988, DEC-TR 561.

Osgood, Donna, The DIfference in Higher Education, B Y T E, Feb. 1987, pp. 175-178.

Robertson, Barbara, CD-ROM: A Young Technology With a Bright Future, Information Access Co., c1988, p. 16, vol. 4, No. 5.

Rogers, Michael, A Library on a Disc, Newsweek, Apr. 21, 1986, US Ed., p. 73 (pp. 160-162).

Yankelovich, Nicole, et al., Intermedia: The Concept and the Construction of a Seamless Information Environment, Computer, IEEE, Jan. 1988, pp. 81-96.

Van Dam, Andries, (Hypertext '87 Keynote Address), Memex and Beyond Web Site, Communications of the ACM (vol. 31, No. 7).

Goodman, Danny, Business Class, The World at Your Fingertips—User Guide, c1987, Activision, Inc., Mountain View, CA.

Spector, Greg, HyperCard Engine for Search-Retrieve Due in Sep., PC Week, Aug. 1, 1988, vol. 5, No. 31, p.8(1), Ziff-Davis Pub. Co.

Sidekick, Version 1 Owner's Handbook, Borland International, Inc. 3rd ed., c1984, p. 1, 29.

Goodman, Danny, The Complete HyperCard Handbook, Sep. 1987, pp. 13-14, 408, Bantam Books.

The New Electronic Encyclopedia, Rev. ed., Grolier, 1988, Reference Books Bulletin, Jul. 1989, pp. 1878-1879.

Fox, Edward A., Information Retrieval: Research Into New Capabilities, CD/ROM, The New Payprus, pp. 143-174, Microsoft Press, Bellevue, WA.

Cook, Peter, Mulitmedia Technology, An Encyclopedia Publisher's Perspective, Learning Tomorrow, E.R.I.C. reprint, ED302190, pp. 237-262. no date.

Crane, Gregory, et al., Perseus, An Interactive Curriculum on Ancient Greek Civilization, The Annenberg/CPB Project Full Proposal Summary Fact Sheet Demonstration/Materials Project, Sep. 23, 1986, Harvard University, Cambridge, MA.

Crane, Gregory, et al., The Perseus Project: An Interactive Curriculum on Classical Greek Civilization, Educational Technology, Nov. 1988, pp. 25-32.

Punian, Shareen, Apple Discs, CD ROM Review, Aug. 1988, pp. 30-32.

The World Book Encyclopedia, 1988 Edition, pp. 4, 492, Chicago.

Christodoulakis, Stavros, An Experimental Multimedia System for an Office Environment, Computer Systems Research Institute, Toronto, Canada, pp. 177-182, no date.

Baird, P., et al. Cognitive Aspects of Constructing Non-Linear Documents: Hypercard and Glasgow Online, University of Strathclyde, UK, pp. 207-218, no. date.

Helgerson, Linda W., Individualized Education In the 1990's With CD-ROM. CD-ROM EndUser, May 1989, vol. 1, No. 1.

Preece, Warren E., Notes Toward a New Encyclopedia II, Scholarly Publishing, Jan. 1981, pp. 141-157, University of Toronto Press.

Preece, Warren E., Notes Toward a New Encyclopedia, Scholarly Publishing, Oct. 1980, pp. 14-30, University of Toronto Press.

Salton, Gerard, The Smart Retrieval System, Experiments in Automatic Document Processing, c1971, Prentice-Hall, Inc., Englewood Cliffs, NJ, pp. 116-119, 134-137, 178-179, 182-183.

Apple's Demo Project, MacWeek, p. 42, Mar. 29, 1988.

Harmon, Amy, Granting of Broad Patent Stuns Multimedia Industry, Nov. 13, 1993, Part A, p. 1, col. 5, Times.

Eckhouse, John, Key Patent to Shake Media Industry, Nov. 15, 1993, San Francisco Chronicle, p. B1.

Peltz, James F.,Compton's Wins Patent Covering Multimedia, Nov. 16, 1993, Los Angeles Times, Business, Part D, p. 2.

Bibliofile, BiblioForum, Jan. 1991, No. 5, The Library Corp., Inwood, WV.
Bibliofile, BiblioForum, Winter 1994, No. 9, The Library Corp., Inwood, WV.
Bibliofile, The Intelligent Catalog, User's Guide, Version 7.0, Release 56, Aug. 1993, The Library Corp.
Beiser, Karl, Wilson Library Bulletin, H.W. Wilson Co., Bronx, NY, no date.
Xiphias, Tools for an Information Society, (Catalog), 1993(?).
Bibliofile Intelligent Catalog, Installation and Reference Guide, Nov. 1989, The Library Corp., Inwood, WV.
Design Document for Compton's World in a Window, Jul. 29, 1988, Encyclopaedia Britannica, Inc. and Education Systems Corp.
Lewis, Peter H., The New Patent That is Infuriating the Multimedia Industry, New York Times, Nov. 28, 1993, Sec. 3, Business, p. 10.
Bailey, Doug, CD-ROM multimedia patent draws fire, The Boston Globe, Nov. 17, 1993, p. 49.
Johnson, Laura & Juarez, Juanita, Editors, Flash Cards (Timelines), MacUser, Jan. 1988, p. 210.
Salton, G. et al., Contribution to the Theory of Indexing, Information Processing 74—North-Holland Pub. Co. (1974), pp. 584-590.
Salton, G. & Lesk, M.E., The SMART Automatic Document Retrieval System—An Illustration, Communications of the ACM, Jun. 1965, vol. 8, No. 6, pp. 391-398.
Salton, Gerard, Automatic Information Organization and Retrieval, 1968, McGraw-Hill Book Co., pp. 467-484.
Rappaport, Irving, summarizing Apple's position on the legal and procedural question raised by the notice. [Presentation of Sep. 9, 1987 at the Screen Display Hearings; attached to Aug. 26, 1987 letter to Dorothy Schrader, Esq., Copyright Office].
[Transcript] Public Hearing on the Registration and Deposit of Computer Screen Displays, Sep. 9-10, 1987, The Library of Congress Copyright Office.
Hooper, Kristina, Interactive Multimedia Design 1988, Technical Report #13, Nov. 1988, The Multimedia Lab, Apple Computer, Inc.
Florin, Fabrice, Worldview: An Electronic Atlas, Technical Report #7, Jan. 1988, The Multimedia Group, Apple Computer, Inc, no date.
Halasz, Frank G. et al., NoteCards in a Nutshell, 1987, Conference Proceedings Human Factors in Computing Systems and Graphics Interface, Apr. 5-9, 1987, Toronto, Canada, ACM-0-89791-213-6/87, pp. 45-52.
Proggio, A. et al., CCWS: A Computer-Based, Mulltimedia Information System, Oct. 1985, IEEE, pp. 92-103.
Christodoulakis, S. et al., Development of a Multimedia Information System for an Office Enivronment, Aug. 1984, Proceedings of the 10th International Conference on Very Large Databases, Singapore, pp. 261-271.
Hardman, Lynda, Hypertext Tips: Experiences in Developing a Hypertest Tutorial, Scottish HCI Centre, Heriot-Watt University, Edinburgh, UK, pp. 437-451, no date.
Barker, P.G & Hajah, M., Pictorial interfaces to data bases, International Journal of Man-Machine Studies, vol. 23, No. 4, Oct. 1985, Academic Press Inc. (London) Ltd., pp. 423-442.
Salomon, Gitta et al., Using Guides to Explore Multimedia Databases, Technical Report #15, Nov. 1988, The Multimedia Lab, Apple Computer, Inc.(Paper originally presented at The Hawaii International Conference on Systems Sciences, Jan. 3-6, 1989(?)).
Gano, Steve, The Constitution Learning System: An Electronic Museum, Technical Report #8, Jan. 1988, The Multimedia Group, Apple Computer, Inc.
Florin, Fabrice, Worldview Report, Worldview: an Electronic Atlas, 1986, with support from Apple Computer's Educational Marketing Group.
Donelson, William C., Spatial Management of Information, Computer Graphics, A Quarterly Report of SIGGRAPH-ACM, vol. 12, No. 3, Aug. 1978, (GRAPH '78 Proceedings, Aug. 23-25, 1978, Atlanta, GA), pp. 203-209.
Herot, Christopher F. et al., A Prototype Spatial Data Management System, Computer Graphics, 1980, ACM 0-89791-021-4/80/0700-0063, pp. 63-70.
Herot, Christopher F., Spatial Management of Data, ACM Transactions on Database Systems, vol. 5, No. 4, Dec. 1980, pp. 493-514.
United States Copyright Office Public Hearing on Registration and Deposit of Computer Screen Displays, Sep. 4, 1987.
Florin, Fabrice, Worldview, An Interactive Program—videotape, Mar. 1987, Apple Computer's Educational Marketing Development Group.
The New Papyrus, videotape, Microsoft, Mar. 1986, 1st International CD-ROM Conference, GMG Gardy McGrath International.
Mime Demo, videotape, Microsoft, A Multimedia Encyclopedia, 1986, GMG Gardy McGrath International.
Biblio Forum, Newsletter by and for Librarians Using Bibliofile Library Tools, Winter 1994, pp. 1-8.
Shneiderman, B., "User Interface Design For The HypertiesElectronic Encyclopedia", Proceedings Of The Hypertext '87 Workshop (ACM) Chapel Hill, NC (Nov. 13-15, 1987)pp. 189-194.
GOVA, a computer program that is believed to have been available for use by the public on a terminal displayed in an exhibition at the Smithsonian Institute in Mar. 1988.
Rose, Jeffrey J., Compton's Multimedia Patent Angers Industry, Computerlink, Nov. 23, 1993, pp. 23-24.
Compton's Patent Sparks Fear and Loathing in Las Vegas, Software Industry Bulletin, Nov. 22, 1993, vol. 9 No. 44, pp. 1-5, Digital Information Group, Stamford, CT.
Harmon, Amy, Granting of Broad Patent Stuns Multimedia Industry, Los Angeles Times, Orange County Edition, Nov. 17, 1993, pp. A1 & A28.
Encyclopedias on CD-ROM: The Market Advances, The Seybold Report on Desktop Publishing. Feb. 6, 1995, vol. 9 No. 6, pp. 3-16, ISSN: 0889-9762.
Gregor, Anne, The (Classical) Music Man, Meet Robert Winter . . . , CD-ROM Today, ca. 1994, pp. 58-61.
CompuServe Announces PNG-based Graphics Specification; Fully Open 24 Bit Graphics Capability for Electronic Graphic Exchange, PR Newswire, Jun. 15, 1995, CompuServe, Inc., Columbus, OH.
Britannica, Adieu, Ch. 5, The Home, pp. 78-93.
Ambron, S. & Hooper, K., Eds., Interactive Multimedia, c 1988, Microsoft Press, Redmond, WA.
Patricia Baird, et al., "Glasgow Online: Database Development using Apple's HyperCard", Hypertext: theory into practice, Chapter 5, pp. 75-92.
"Online Information 88, 12th International Online Information Meeting London, December 6-8, 1988", Learned Information (Europe) Ltd., Proceedings vol. 1, pp. 206-218.
Akscyn, Robert M; McCracken, Donald and Yoder, Elise A, "KMS: A distributed hypermedia system for managing knowledge in originations", in Communications of the ACM, Jul. 1988 vol. 31, No. 7, *Proceeding of the ACM conference on Hypertext* 1987, Chapel Hill, North Carolina, United States , pp. 1-20.

Akscyn, R.; Halasz, F.; Oren, T.; Riley, V.; Welch, L. Interchanging hypertexts, *Proceedings of the second annual ACM conference on Hypertext citation* 1989, Pittsburgh, Pennsylvania, United Stated 1989, pp. 379-381.

Alsop, Stewart, "Apple's CD SC Energizes A Moriburnd Medium", Comment/Analysis: Inside the Industry, P.C. Letter, vol. 4., No. 5, Mar. 14, 1988.

*Apple Introduces CD-ROM Drive*, Information Today (Apr. 1, 1988) p. 45.

"Apple's New CD-ROM Drive", Macfocus Update, Bay Area Computer Currents, Mar. 8-21.

"Apple Readies May Release of Data-Storage Unit, AppleCD SC", Computer Reseller News, Mar. 28, 1988.

"Apple Offers CD-ROM Optical Storage Device", Information Retrieval & Library Automation Newsletter, Apr. 1, 1988.

Baird, P.; Egan, D.; Kinch, W.; Smith, J.; Streitz, N. A. Cognitive aspects of designing hypertext systems, *Proceedings of the second annual ACM conference on Hypertext citation* 1989, Pittsburgh, Pennsylvania, United States 1989, pp. 397-398.

Balzer, R.; Begeman, M.; Garg, P. K.; Schwartz, M.; Shneiderman, B. Hypertext and software engineering, *Proceedings of the second annual ACM conference on Hypertext citation* 1989, Pittsburgh, Pennsylvania, United States 1989, pp. 395-396.

Barker, P., et al. "Pictorial Communication with Computers", Human-Computer Interaction-INTERACT '87 (1987), pp. 605-609.

Beeman, William O.; Anderson, Kenneth T.; Bader, Gail; Larkin, James; McClard, Anne P.; McQuillan, Patrick, Shields, Mark. Hypertext and pluralism: from lineal to non-lineal thinking, *Proceeding of the ACM conference on Hypertext* 1987, Chapel Hill, North Carolina, United States, pp.: 67-88.

Benest, I.D., G. Morgan and M.D. Smithurst. "A Humanised Interface to an Electronic Library", Human-Computer Interaction—Interact '87, ed. by H.J. Bullinger, et al. (1987), pp. 905-910.

Benning, Herman J.G.M. "Digital Maps on Compact Disc", pp. 115-120.

Berners-Lee, Tim. *Information Management: A Proposal.* CERN Mar. 1989, May 1990.

Bernstein, M., J.; Critz, N.; Mulvaney, R.; Simpson, M.-C. van Leunen. Indexing and hypertext, *Proceedings of the second annual ACM conference on Hypertext citation* 1989, Pittsburgh, Pennsylvania, United States 1989, pp.: 387-390.

Bieber, M.; Feiner, S.; Frisse, M.; Hayes, P.; Peper, G.; Scacchi, W. Expert systems and hypertext, *Proceedings of the second annual ACM conference on Hypertext citation* 1989, Pittsburgh, Pennsylvania, United States 1989, pp. 391-392.

Bigelow, James and Riley, Victor. Manipulating source code in DynamicDesign, *Proceeding of the ACM conference on Hypertext* 1987, Chapel Hill, North Carolina, United States, pp. 397-408.

Bolt, Richard A. "Spatial Data-Management", MIT (1979).

Bolter, Jay David and Joyce, Michael. Hypertext and creative writing, *Proceeding of the ACM conference on Hypertext* 1987, Chapel Hill, North Carolina, United States, pp. 41-50.

Bomstein, Howard. "CD-ROMs: Video without vision?".

Brown, P.J. Turning ideas into products: the Guide System, *Proceeding of the ACM conference on Hypertext* 1987, Chapel Hill, North Carolina, United States, pp.: 33-40.

Brown, P.J. and M.T. Russell. "A help system based on UNIX manual pages", Feb. 1987.

Brown, P. J. "GUIDE user manual", 1985.

Brown, P.J. http://www.dcs.ex.ac.uk/pjbrown/guide/.

Brown, P.J. http://www.secm.ex.ac.uk/contacts/indiv/ml.

Bryce, Daniel and Richard Hull: A Conceptual Basis for Graphics-Based Data Management. FODO 1985: pp. 346-356.

Bryce, Daniel and Richard Hull. "SNAP: A Graphics-based Schema Manager",: IEEE Computer Society, International Conference on Data Engineering, Feb. 5-7, 1986, pp. 151-164.

Bush, Vannevar, "As We May Think" The Atlantic Monthly | Jul. 1945.

Byers, T. J. (Apr. 1987). Built by association. PC World, 5, 244-251.

Campbell, Brad; Goodman, Joseph M. I. Tektronix. "HAM: A General Purpose Hypertext Abstract Machine", in Communications of the ACM, Jul. 1988 vol. 31, No. 7, pp. 856-861; *Proceeding of the ACM conference on Hypertext* 1989, Chapel Hill, North Caroline, United States, pp. 21-32.

Caplinger, M. and B. Schatz, B. "Searching in a Hyperlibrary", 5th Int'l Conference on Data Engineering Proceedings, 1989, pp. 188-197.

Card, Stuart K. and D. Austin Henderson, Jr. "CATALOGUES: A Metaphor for Computer Application Delivery", Humman-Computer Interaction—INTERACT '87, 1987, pp. 959-964.

Carmody, Steven; Gross, Walter; Nelson, Theodor H.; Rice, David; van Dam, Andries. (Apr. 1969) A Hypertext Editing System for the 1360, Center for Computer & Information Sciences, Brown University, Providence, Rhode Island, File Number HES360-0, Form AVD-6903-0, pp. 291-330.

Catlin, T.; Bush, P.; Yankelovich, N. InterNote: extending a hypermedia framework to support annotative collaboration, *Proceedings of the second annual ACM conference on Hypertext citation* 1989, Pittsburgh, Pennsylvania, United States 1989, pp. 365-378.

Charney, Davida. Comprehending non-linear text: the role of discourse cues and reading strategies, *Proceeding of the ACM conference on Hypertext* 1987, Chapel Hill, North Carolina, United Stated, pp.: 109-120.

Clitherow, P.; Riecken, D.; Muller, M. VISAR: a system for inference and navigation of hypertext, *Proceedings of the second annual ACM conference on Hypertext citation* 1989, Pittsburgh, Pennsylvania, Untied States 1989, pp. 293-304.

Collier, George H. Thoth-11: hypertext with explicit semantics, *Proceeding of the ACM conference on Hypertext* 1987, Chapel Hill, North Carolina, United States, pp. 269-289.

Conklin, Heff. Hypertext: An Lntroduction and Survey in IEEE Computer, 20(9), 17-41, Sep. 1987.

Conklin, Jeff and Begeman, Michael L. gIBIS: a hypertext tool for team design deliberation, *Proceeding of the ACM conference on Hypertext* 1987, Chapel Hill, North Carolina, United States, pp. 247-251.

Conklin, J. "A Survey of Hypertext", MCC Technical Report No. STP-356-86, Oct. 23, 1986.

Consens, M. P. and Mendelzon, A. O . Expressing structural hypertext queries in graphlog, *Proceedings of the second annual ACM conference on Hypertext citation* 1989, Pittsburgh, Pennsylvania, United Stated 1989, pp. : 269-292.

Cooke, Donald F. "Vehicle Navigation Appliances", Graphic Data Technology, Inc.

Costanzo, Daniel J. "Mapping Applications of Video Disc Technology". Presented at the Defense Computer Graphics Conference, Chicago IL (1983).

Crane, Gregory. (1988). Extending the boundaries of instruction and research. T.H.E. Journal (Technology Horizons in Education), Macintosh Special Issue, 51-54.

Crane, Gregory. From the old to the new; integrationg hypertext into traditional scholarship, *Proceeding of the ACM conference on Hypertext* 1987, Chapel Hill, North Carolina, United States, pp.: 51-55.

Croft, W. B. and Turtle, H. A retrieval model incorporating hypertext links, *Proceedings of the second annual ACM conference on Hypertext citation* 1989, Pittsburgh, Pennsylvania, United States 1989, pp. 213-224.

Crouch, D. B.; Crouch, C. J.; Andreas, G. The use of cluster hierarchies in hypertext information retrieval, *Proceedings of the second annual ACM conference on Hypertext citation* 1989, Pittsburgh, Pennsylvania, United States 1989, pp. 225-237.

Delisle, NM; Schwartz, MD. Collaborative writing hypertext.—IEEE Transactions on Professional Communication, 1989, pp. 183-188.

Delisle, NM; Schwartz, MD—Contexts—a partitioning concept for hypertext. ACM Trans. Office Info. Syst., 1987, pp. 168-186.

Denso. "R&D Background of MAPIX", MAPIX Introduction at Tokyo Motor Show, Oct. 1981.

DeRose, S. J. Expanding the notion of links, *Proceedings of the second annual ACM conference on Hypertext citation* 1989, Pittsburgh, Pennsylvania, United States 1989, pp. 249-257.

DeWitt, Philip Elmer. "The World on a Silver Platter", Time, Apr. 11, 1988.

DeYoung, L. Hypertext challenges in the auditing domain, *Proceedings of the second annual ACM conference on Hypertext citation* 1989, Pittsburgh, Pennsylvania, United States 1989, pp. 169-180.

Egido, Carmen and John Patterson. "Pictures and Category Labels as Navigational Aids for Catalog Browsing", CHI '88 Conference Proceedings, Human Factors In Computing Systems May 15-19, 1988, pp. 127-132.

Engelbart, Douglas C. (1 962). "Augmenting Human Intellect: A Conceptual Framework". AFOSR-3233 Summary Report, SRI Project No. 3579, pp. 1-133.

Engelbert, Douglas (ed.). Fall Joint Computer Conference—FJCC 1968—A research center for augmenting human intellect, Fall 1968, San Francisco, CA, USA, pp. 395-410.

Englebart, Douglas, NLS (oNLine System).

Ehrmann, S. C.; Erde, S.; Morrell, K.; Weissman, R. F. E. Hypertext and higher education: a reality check, *Proceedings of the second annual ACM conference on Hypertext citation* 1989, Pittsburgh, Pennsylvania, United States 1989, p. 393.

Fischer, G., R.; McCall, A. Morch. JANUS: integrating hypertext with a knowledgebased design environment, *Proceedings of the second annual ACM conference on Hypertext citation* 1989, Pittsburgh, Pennsylvania, United States 1989, pp. 105-117.

Flynn, Laurie. "Potential Customers Weigh CD SC Pros Cons", Macintosh News, vol. 40, Mar. 21, 1988.

Flynn, Laurie. "Arthur Young to Challenge CD ROM Frontier", Macintosh News, vol. 40, Mar. 21, 1988.

Frank, GH. Reflections on Notecards: seven issues for the next generation of hypermedia systems.—Communications of the ACM, 1988, pp. 836-852.

Friedlander, Larry. "The Shakespeare Project: Experiments in Multimedia Education." *Academic Computing* 2.7 (May/Jun. 1988): 26-68.

Frisse, M. E. and Cousins, S. B. Information retrieval from hypertext: update on the dynamic medical handbook project, *Proceedings of the second annual ACM conference on Hypertext citation* 1989, Pittsburgh, Pennsylvania, United States 1989, pp. 199-212.

Furuta, R. and Stotts, P. D. Programmable browsing semantics in Trellis, *Proceedings of the second annual ACM conference on Hypertext citation* 1989, Pittsburgh, Pennsylvania, United States 1989, pp. 27-42.

Garg, Pankaj K. Abstraction mechanisms in hypertext, *Proceedings of the ACM conference on Hypertext* 1987, Chapel Hill, North Carolina, United States, pp. 375-395.

Garg, Pankaj K. and Scacchi, Walt. On designing intelligent hypertext systems for information management in software engineering, *Proceedings of the ACM conference on Hypertext* 1987, Chapel Hill, North Carolina, United States, pp. 409-432.

Glick, Barry J. and Timothy R. Johnson. "Cartographic Database Requirements for Land Vehicle Navigation", IEEE (1984), pp. 25-31.

Glushko, R. J. Design issues for multi-document hypertexts, *Proceedings of the second annual ACM conference on Hypertext citation* 1989, Pittsburgh, Pennsylvania, United States 1989, pp.51-60.

Goll, David. "Vendors Target CD-ROM market", Macintosh Today.

Halasz, Frank G. Reflections on Notecards: Seven issues for the next generation of hypermedia systems, Hypertext '87 Papers, Nov. 13-15, 1987, pp.: 345-365.

Hammwohner, Rainer and Thiel, Ulrich. Content oriented relations between text units—a structural model for hypertexts, *Proceedings of the A CM conference on Hypertext* 1987, Chapel Hill, North Carolina, United States, pp.: 155-174.

Hayes, P. and Pepper, J. Towards an integrated maintenance advisor, *Proceedings of the second annual ACM conference on Hypertext citation* 1989, Pittsburgh, Pennsylvania, United States 1989, pp. 119-127.

Henderson, D., Stuart Card, Rooms: the use of multiple virtual workspaces to reduce space contention in a window-based graphical user interface, ACM Transactions of Graphics (TOG), v.5 n.3, p. 211-243, Jul 1986.

Darlington, Jeffrey et al. "Domesday Redux: The Rescue of the BBC Domesday Project Videodiscs." http://www.ariadne.ac.uk/issue36/tna.

"Domesday: The Domesday Project—Nov. 1986." http://www.atsf.co.uk/dottext/domesday.

"BBC Domesday." http://www.si.umich.edu/CAMILEON/domesday/domesday.

Ikeda, M., H. Fukaya and T. Tabe. "New Navigation System, MAPIX-III", (1987).

Intermedia: THe Architecture and Construction of an Object-Oriented Hypermedia System and . . . NK Meyrowitz—OOPSLA, 1986, pp. 186-201.

Jarvis, Mark W. and Richard C. Berry. "Cathode-Ray Tube Information Center with Automotive Navigation", SAE Technical Paper Series. International Congress & Exposition, Detroit, MI (1984), pp. 123-137.

Jones, Henry W. 111. Developing and distributing hypertext tools: legal inputs and parameter, *Proceeding of the ACM conference on Hypertext* 1987, Chapel Hill, North Carolina, United States, pp.: 367-374.

Jordan, D. S.; Russell, D. M.; Jensen, A.-M. S.; Rogers, R. A. Facilitating the development of representations in hypertext with IDE, *Proceedings of the second annual ACM conference on Hypertext citation* 1989, Pittsburgh, Pennsylvania, United States 1989, pp. 93-104.

Joyce, M.; Kaplan, N.; McDaid, J.; Moulthrop, S. Hypertext, narrative, and consciousness, *Proceedings of the second annual ACM conference on Hypertext citation* 1989, Pittsburgh, Pennsylvania, United States 1989, pp. : 383-384.

Komatsu, Shigeru, Tohru Sampei, Toyotaroo Nishihara, Testuo Furuya and Yoshihiro Yamada. "The Multi-Media CD-ROM System for Educational Use", IEEE Transactions on Consumer Electronics vol. CE-33, No. 4 (Nov. 1987), pp. 531-538.

Landow, George P. Relationally encoded links and the rhetoric of hypertext, *Proceeding of the ACM conference on Hypertext* 1987, Chapel Hill, North Carolina, United States, pp.: 331-343.

Lesk, M. What to do when there's too much information, *Proceedings of the second annual ACM conference on Hypertext citation* 1989, Pittsburgh, Pennsylvania, United States 1989, pp.: 305-318.

Lesniewski, A., et al. "Designing an User-Oriented Interface to a Document Management System", Human-Computer Interaction-INTERACT '87, 1987, pp. 541-546.

Licklider, J.C.R., "Man Computer Symbiosis".

Lippman, Andrew. "Movie-Maps: An Application of the Optical Videodisc to Computer Graphics", Computer Graphics, SIGGRAPH '80 Conference Proceedings, Jul. 14-18, 1980, pp. 32-42.

Marshall, Catherine C. Exploring representation problems using hypertext, *Proceeding of the ACM conference on Hypertext* 1987, Chapel Hill, North Carolina, United States, p.: 253-268.

Marshall, C.C. and Irish, P. M. Guided tours and on-line presentations: how authors make existing hypertext intelligible for readers, *Proceedings of the second annual ACM conference on Hypertext citation* 1989, Pittsburgh, Pennsylvania, United States 1989, pp. 15-26.

Meyrowitz, Norman et al. "Issues, Strategies, and Tactics." *Intermedia*, Brown University. Institute for Research in Information and Scholarship. pp. 163-174.

Moulthrop, S. Hyertext and "The Hyperreal", *Proceedings of the second annual ACM conference on Hypertext citation* 1989, Pittsburgh, Pennsylvania, United States 1989, pp.: 259-267.

Nelson, Ted. "A File Structure for the Complex, the Changing and the Indeterminate", *proceedings of the ACM 20th national conference* 1965, pp. 84-100.

Nelson, Ted. "Las Vegas Confrontation Sit-Out: A CAI Radical's View from Solitary", *Interface* vol. 4, #5. Oct. 1970. pp. 2-8.

DeFanti, Tom, Dan Sandin, and Ted Nelson. "Computer Graphics as a Way of Life", *proceedings of the first SIGGRAPH conference* 1974

Neuwirth, Christine; Kaufer, David; Chimera, Rick; Gillespie,Terilyn. The Notes program: a hypertext application for writing from source texts, *Proceeding of the ACM conference on Hypertext* 1987, Chapel Hill, North Carolina, United States, pp.: 121-141.

Neuwirth, C. M. and Kaufer, D. S. The role of external representation in the writing process: implications for the design of hypertext-based writing tools, *Proceedings of the second annual ACM conference on Hypertext citation* 1989, Pittsburgh, Pennsylvania, United States 1989, pp.: 319-341.

Nielson, J. The matters that relly matter for hypertext usability, *Proceedings of the second annual ACM conference on Hypertext citation* 1989, Pittsburgh, Pennsylvania, United States 1989, pp. 239-248.

O'Reilly, Richard. "Apple Polishes Image With Schools", *Los Angeles Times*, Mar. 17, 1988.

Oren, Tim. The architecture of static hypertexts, *Proceeding of the ACM conference on Hypertext* 1987, Chapel Hill, North Carolina, United States, pp.: 291-306.

OWL at Purdue University: Using Modern Language Association (MLA). http://owl.english.purdue.edu/handouts/research/r_mla.

OWL Web Ontology Language Reference. http://www.daml.org/2002/06/webont/owl-ref-proposed.

Parunak, H. Van Dyke. Hypermedia topologies and user navigation, *Proceedings of the second annual ACM conference on Hypertext citation* 1989, Pittsburgh, Pennsylvania, United States 1989, pp. 43-50.

Parvianien, Jouko A., R.L. French and H.T. Zwahlen. "*Mobile Information Systems Impact Study*" (1988).

Pearl, A. Sun's Link Service: a protocol for open linking, *Proceedings of the second annual ACM conference on Hypertext citation* 1989, Pittsburgh, Pennsylvania, United States 1989, pp. 137-146.

Perlman, G. Asynchronous design/evaluation methods for hypertext technology development, *Proceedings of the second annual ACM conference on Hypertext citation* 1989, Pittsburgh, Pennsylvania, United States 1989, pp. 61-81.

Quint, V., et al. "An Abstract Model for Interactive Pictures", *Human-Computer Interaction-INTERACT '87*, 1987, pp. 643-647.

Raskin, Jef. The hype in hypertext: a critique, *Proceeding of the ACM conference on Hypertext* 1987, Chapel Hill, North Carolina, United States, pp.: 325-330.

Raymond, Darrell R. and Tompa, Frank Wm. Hypertext and the new Oxford English Dictionary, *Proceeding of the ACM conference on Hypertext* 1987, Chapel Hill, North Carolina, United States, pp.: 143-153.

Remde, Joel R.; Gomez, Louis M., Landauer, Thomas K. SuperBook: an automatic tool for information exploration-hypertext?, *Proceeding of the ACM conference on Hypertext* 1987, Chapel Hill, North Carolina, United States, pp.: 175-188.

Rosenthal, Steve. "Mass of Info on Disc Will Lead Hardware", *MacWEEK*, vol. 40, Mar. 29, 1988.

Rous, B.; Shneiderman, B.; Yankelovich, N; Yoder, E. Lessons learned from the ACM hypertext on hypertext project, *Proceedings of the second annual ACM conference on Hypertext citation* 1989, Pittsburgh, Pennsylvania, United States 1989, pp.: 385-386.

Schatz, B. (1987) Telesophy: A System for Manipulating the Knowledge of a Community, *Proc IEEE Globecom '87 Conference Proceedings*, Tokyo (Nov.), 1181-1186.

Schnase, J. L. and Leggett, J. J. Computational hypertext in biological modeling, *Proceedings of the second annual ACM conference on Hypertext citation* 1989, Pittsburgh, Pennsylvania, United States 1989, pp. 181-194.

Schwartz, David. "Microsoft's CD-ROM Conference: The Industry Emerges", *HyperMedia*, Summer '88.

Shipman, F. M.; Chaney, R. J.; Gony, G. A. Distributed hypertext for collaborative research: the virtual notebook system, *Proceedings of the second annual ACM conference on Hypertext citation* 1989, Pittsburgh, Pennsylvania, United States 1989, pp. 129-135.

Smith, JOB. and Weiss, S.F., "An Overview of Hypertext", in *Communications of the ACM*, Jul. 1988 vol. 31, No. 7, and other articles in the same special "Hypertext" issue.

Smith, John B.; Weiss, Stephen F.; Ferguson, Gordon J. A hypertext writing environment and its cognitive basis (panel session), *Proceedings of the ACM conference on Hypertext* 1987, Chapel Hill, North Carolina, United States, pp.: 195-214.

Smolensky, Paul, Bell, Brigham; Fox, Barbara ; King, Roger; Lewis, Clayton. Constraint-based hypertext for argumentation, *Proceedings of the ACM conference on Hypertext* 1987, Chapel Hill, North Carolina, United States, pp.: 215-245.

Streitz, N. A.; Hannemann, J.; Thiiring, M. From ideas and arguments to hyperdocuments: travelling through activity spaces, *Proceedings of the second annual ACM conference on Hypertext citation* 1989, Pittsburgh, Pennsylvania, United States 1989, pp.: 343-364.

Sugie, M., O. Menzilcioglu and H.T. Kung. "CARGuide-On-Board Computer for Automobile Route Guidance", *AFIPS Conference Proceedings*, National Computer Conference (1984), pp. 695-706.

The Apple Learning Disc, 1988.

The IDG Report on CD-ROM (1988).

Thoone, Martin L.G. and Ron M.A.M. Breukers. "Application of the Compact Disc in Car Information and Navigation Systems", *SAE Technical Paper Series*. International Congress & Exposition, Detroit, MI ( 1 984), pp. 105-111.

Totani, Shinzo, Takaaki Kato and Kazuo Muramoto. "Automotive Navigation System", *Proceedings of the 2nd Int'l Pacific Conference on Automotive Engineering*, "Motor Vehicle Technology: Progress and Harmony" Nov. 1983, pp. 469-477.

Travers, M. A visual representation for knowledge structures, *Proceedings of the second annual ACM conference on Hypertext citation* 1989, Pittsburgh, Pennsylvania, United States 1989, pp. 147-158.

Trigg, Randall H. and Irish, Peggy M. Hypertext habitats: experiences of writers in Notecards, *Proceedings of the ACM conference on Hypertext* 1987, Chapel Hill, North Carolina, United States, pp. : 89-108.

Van Dam, Andries. "Computer and Information Sciences Program for High School Students" (with D. Ashler and D. Prenner), in *Proceedings ACM 19th Annual Conference* (1964) pp. K1.3-1-K1.3-5.

Van Dam, Andries. "The Brown University Student Operating System "(with D. Wile and R. Munck), in *Proceedings 1967 National ACM Conference* (1967).

Van Dam, Andries. "A Hypertext Editing System for the /360" (with S. Carmody, W. Gross, T. H. Nelson and D. Rice), in *Proceedings of the Second University of Illinois Conference on Computer Graphics*, University of Illinois (1969).

Van Dam, Andries. "On-Line Text Editing: A Survey" (with D. Rice), in *ACM Computing Surveys* (Sep. 1971) pp. 93-144.

Van Dam, Andries. "Language for Systems Development" (wtih D. Bergeron), in *ACM SIGPLAN Symposium on Languages for Systems Implementation* (Oct. 1971) pp. 50-72.

Van Dam, Andries. "A Survey of Introductory and Advanced Programming Courses" (with C. McGowan, J. Morse and C. Strauss), in *4th Technical Symposium on Computer Science Education of the ACM SIGCSE* (Feb. 1974).

Van Dam, Andries. "Experience with Distributed Graphics Processing on a Host-Satellite System" (with J. Michel), in *Proceedings ACM SIGGRAPH* 76 (Jun. 1976) pp. 190-195.

Van Dam, Andries. "Structured Programming in Assembly Language" (with J. Dill, D. Dixon and D. Notkin), in *SIGCSE Bulletin* (Dec. 1976) pp. 53-67.

Van Dam, Andries. "GPGS A Device-Independent General-Purpose Graphics System for Stand-Alone and Satellite Graphics" (with L. Caruthers and J. van den Bos), in *Proceedings ACM SIGGRAPH 77*, San Jose, California (Jul. 1977) pp. 112-119.

Van Dam, Andries. "GPGS A Device-Independent General-Purpose Graphics System for Stand-Alone and Satellite Graphics" (with L. Caruthers and J. van den Bos), in *Proceedings ACM SIGGRAPH* 77 , San Jose, California (Jul. 1977) pp. 112-119.

Van Dam, Andries. "Distributed Processing" (with J. Stankovic), in *IEEE Computer* (Jan. 1978) (special issue on Distributed Processing, guest editor with J. Stankovic) pp. 10-11.

Van Dam, Andries. "Vertical Migration of Performance Enhancement in Layered Hardware/Firmware/Software Systems" (with J. Stockenberg), in *IEEE Computer* (May 1978) (special issue on Firmware Engineering) pp. 35-50.

Van Dam, Andries. "Recent Efforts Towards Graphics Standardization" (with W. Newman), in *ACM Computing Surveys* (Dec. 1978) (special issue on Computer Graphics, guest editor with D. Bergeron and J. Foley) pp. 365-380.

Van Dam, Andries. "A Functional Overview of the Core System with Glossary" (with J. Michener), in *ACM Computing Surveys* (Dec. 1978) (special issue on Computer Graphics, guest editor with D. Bergeron and J. Foley) pp. 381-387.

Van Dam, Andries. "Research Directions in (Cooperative) Distributed Processing" (with J . Stankovic), in *Research Directions in Software Technology*, ed. P. Wegner, M.I.T. Press (1979) pp. 611-638.

Van Dam, Andries. Architectural Considerations for a Microprogramming Emulating Engine Using Bit-Slices (with C. Halatsis, J. Joosten and M. Letheren), in *Proceedings 7th International Symposium on Computer Architecture*, La Baule, France (May 1980) pp. 278-291.

Van Dam, Andries. "BUMPS: A Program for Animating Projections" (with R. Gurwitz, R. Thorne and I. Carlbom), in *Proceedings ACM SIGGRAPH* 80 (1980) pp. 231-237.

Van Dam, Andries. MIDAS: A Microprocessor Instructional Display and Animation System (with R. Gunvitz and R. Fleming), in *IEEE Transactions of Education* (May 1981) pp. 126-133.

Van Dam, Andries. "An Integrated System for Creating and Presenting Complex Computer-Based Documents" (with S. Feiner and S. Nagy), in *Lausanne Conference on Document Preparation Systems*, Lausanne, Switzerland (Mar. 1981), in Proceedings ACM SIGGRAPH 81 (1981) pp. 181-189.

Van Dam, Andries. "Vertical and Outboard Migration: A Progress Report" (with A. Heller), in *NCCC Proceedings* (May 1981) (special session on Firmware Engineering) pp. 69-74.

Van Dam, Andries. "Simulation of a Horizontal Bit-Sliced Processor Using the ISPS Architecture Simulation Facility" (with M. Barbacci, C. Halatsis, J. Joosten and M. Letheren), in *IEEE Transactions on Computers* (1981) (special issue on Firmware Engineering) pp. 513-519.

Van Dam, Andries. "Interactive Editing Systems: Part I and Part 1 1" (with N. Meyrowitz), in *ACM Computing Surveys* 14 (3) (1982) pp. 321-352.

Van Dam, Andries. "Personal Computer Networks and Graphical Animation: Rationale and Practice for Education" (with M. Brown and N. Meyrowitz), in *ACM SIGCSE 14th Annual Technical Symposium on Computer Science Education* (1983) pp. 296-307.

Van Dam, Andries. "Networks of Scholar's Workstations in a University Community" (with N. Meyrowitz and W.S. Shipp), in *IEEE Compcon* (1983) pp. 108-112.

Van Dam, Andries. The Electronic Classroom: Workstations for Teaching, in *International Journal of Man-Machine Studies* 20 (1) (1984) pp. 59-60.

Van Dam, Andries. "Meeting the Crisis in Computer Science" (with S. Yau, R. Ritchie, W. Semon, J. Traub and S. Winkler), in *Communications of the ACM* 26 (12) (1984) pp. 1046-1050.

Van Dam, Andries. An Interview with Andries van Dam, in *Communications of the ACM* 27 (7) (1984) pp. 638-648.

Van Dam, Andries. Computer Software for Graphics, in *Scientific American* 25 1 (3) (Sep. 1984) pp. 146-159.

Van Dam, Andries. Computing in 1984, in *Electrical Engineering: The Second Century Begins*, ed. Harlow Freitag, IEEE Press (1986) pp. 117-121.

Van Dam, Andries. Solids Modeling and Rendering on Workstations—A Pictorial Overview, in *Computer Physics Communications* #45, North-Holland Publishing Company (1987) pp. 169-174.

Van Dam, Andries. IIPHIGS+ Functional Description, Report of PHIGS+ Committee, van Dam, chairman, in *Computer Graphics* (Jul. 1988) pp. 125-218.

Van Dam, Andries. "The Application Visualization System: A Computational Environment for Scientzfic Visualization" (with C. Upson, T. Faulhaber, Jr., D. Kamins, D. Laidlaw, D. Schlegel, J. Vroom, and R. Gurwitz), *IEEE Computer Graphics and Applications* (Jul. 1989) pp. 30-42.

Walker, Janet H. Document Examiner: delivery interface for hypertext documents, *Proceeding of the ACM conference on Hypertext* 1987, Chapel Hill, North Carolina, USA, pp. 307-323.

Weiss, Jim. "Hypercard program Electric Cadaver aids medical students in the study of anatomy", *MacWeek*, vol. 46, Mar. 29, 1988.

West, Janine L., ed. "Fresh Produce—The Mac Marketplate", *Macintosh Horizons*, Apr. 1, 1988.

Whitby, Max. "Inventing the Future", *Interactive Multimedia, MacUser*, Oct. 1988, pp. 39-43.

Whitmer, Clair. "KnowledgeSet plans Hypercard search engine", *MacWEEK*, Apr. 5, 1988.

Whitmer, Clair. "CD-ROM audio confusion", *MacWEEK*, vol. 14, Mar. , 19 .

Wilson, K. "Palenque An Interactive Multimedia Optical Disk Prototype for Children."

Woods, Wendy. "Microsoft's CD-ROM Conference: Apple Breaks Ice with CD-ROM Drive", *News & Industry Current*.

Yankelovich, Nicole; Landow, George P. and Cody, David. (1987). Creating hypermedia materials for English literature students. *SIGCUE Outlook*, 20(3).

Yoder, E. and Wettach, T. C. Using hypertext in a law firm, *Proceedings of the second annual ACM conference on Hypertext citation* 1989, Pittsburgh, Pennsylvania, United States 1989, pp. 159-167.

Zavoli, Walter B. and Stanley K. Honey. "MAP Matching Augmented Dead Reckoning", *IEEE* (1986), pp. 359-362.

Zellweger, P. T. Scripted documents: a hypermedia path mechanism, *Proceedings of the second annual ACM conference on Hypertext citation* 1989, Pittsburgh, Pennsylvania, United States 1989, pp. 1-14.

Bolt, Richard A. "Spatial Data-Management", Rapid Service Press (1978).

Brown, P.J. "Linking and Searching within Hypertext", Oct. 1987.

CERN (European Organization for Nuclear Research).

Engel, F.P. JOTS-a military C3D2 core operating system and development environment for distributed decision making. Information-Decision-Action Systems in Complex Organisations, 1992., International Conference on Publication Date: Apr. 6-8, 1992.

Evenson, S.; Rheinfrank, J.; RichardsonSmith, F.; Wulff, W. Towards a design language for representing hypermedia cues, *Proceedings of the second annual ACM conference on Hypertext citation* 1989, Pittsburgh, Pennsylvania, United States 1989, pp. 83-92.

Fedida, Sam. Viewdata (or Videotex), British Telecom, (1975).

FRESS (File Retrieval and Editing System), Brown University.

Friedlander, Larry. "The Shakespeare Project." *Learning Tomorrow*3, Journal of the Apple Education Advisory Council, Spring 1987, pp. 123-152.

Goodman, D. "Buisness Class—User Guide", Bantam Books, 1987.

Heim, Michael. (1987). Electronic Language: A Philosophical Study of Word Processing. New Haven: Yale University Press.

HES (Hypertext Editing System), by Andries van Dam & Ted Nelson, Brown University (1967).

Intermedia: issues, strategies, and tactics in the design of a hypermedia document system. LN Garrett, KE Smith, N Meytowitz—Proceedings of the 1986 ACM conference on Computer-supported . . . , 1986.

Koscheka, D. "HyperChatB XCMD Corner", MacTutor, vol. 4, No. 9, Sep. 1988, pp. 24-30.

Liebhold, M. "A Layered Theory of Design for Optical Disc Software", Learning Tomorrow: Journal of the Apple Education Advisory Council, Spring 1987, pp. 291-298.

Liebhold, Mike. "A Layered Theory of Design for Optical Disc Software", Learning Tomorrow. pp. 331-337.

Lippman, Andrew, *The Aspen Movie Map*, MIT ARPA (1978).

*Mac Kicks Off CD-ROM*, MacWEEK (Mar. 8, 1988).

Moline, J. et. al. (ed.) Proceedings of the Hypertext Standardisation Workshop Jan. 16-18, 1990, National Institute of Standards and Technology, pub. U.S. Dept. of Commerce.

Nelson, Ted. "The Hypertext", *proceedings of the World Documentation Federation* 1965.

Nelson, Ted. "Suggestion for an On-Line Braille Display", *proceedings of the Society for Information Display autumn* 1965.

Nelson, Ted. "Computer-Indexed Film Handling", *SMPTE conderence preprint autumn* 1965.

Nelson, Ted. "New Media and Creativity Systems", *graphical brochure intended to expound computer graphics and related concepts circa* 1966.

Nelson, Ted. "Hypertext Notes", *ten brief essays on hypertext forms circulated in manuscript circa* 1966.

Nelson, Ted. "Getting It Out of Our System", pp. 191-210 in George Schecter (editor), "Information Retrieval: A Critical View", Thompson Books (Washington D.C.) 1967.

Nelson, Ted. "Nelson's the Name, and What He Proposes Could Outdo Englebart", Electronics Magazine, Nov. 24, 1969.

Nelson, Ted. "A Hypertext Editing System for the 360", Steven Cannody et al., in Faiman and Nievergelt (editors), "Pertinent Concepts in Computer Graphics", University of Illinois Press 1969.

Nelson, Ted. "No More Teacher's Dirty Looks", Computer Decisions Sep. 1970 Partially reprinted in Les Brown and Serna Marks, "Electric Media", Harcourt 1974 Fully reprinted in Ted Nelson, "Computer Lib" 1974.

Nelson, Ted. "Bamum-Tronics", Swarthmore College Alumni Bulletin Dec. 1970.

Nelson, Ted. "As We Will Think", proceedings of the Online '72 International Conference on Online Interactive Computing, Brunel University, Uxbridge England 1973. Reprinted In: Nyce, James / Kahn, Paul (eds): From Memex to Hypertext : Vannevar Bush and the Mind's Machine. p. 245. Academic Press, Boston, MA, 1991.

Nelson, Ted. "A Conceptual Framework for Man-Machine Everything", National Computer Conference and Exposition, June 4-8, 1973, New York , NY, proceedings of the AFIPS National Joint Computer Conference 1973 vol. 42 (pp. M22-M23). Montvale, NJ: AFIPS Press.

Nelson, Ted. "Computer Lib/Dream Machines", Mindful Press 1974; Distributors, South Bend IN, 1974.

Nelson, Ted. "Computopia and Cybercrud", in Levein (editor), "Computers in Instruction", The Rand Corporation 1974.

Nelson, Ted. "Data Realms and Magic Windows", proceedings of ACPA-5 Association of Computer Programmers and Analysts 1975.

Nelson, Ted. "A Dream of Irving Snerd", pp. 79-81, Creative Computing Magazine vol. 3 #3 May-Jun. 1977.

Nelson, Ted. "Electronic Publishing and Electronic Literature", in Edward DeLand (editor), "Information Technology in Health Science Education", Plenum Press 1978.

Nelson, Ted. "Replacing the Printed [Written??] Word: A Complete Literary System", proceedings of the 1980 IFIP World Computer Computer Conference, pp. 8, 101 3-1 023, Simon H. Lavington (editor), "Information Processing 80", North Holland Publishing Company, Amsterdam, 1980.

Nelson, Ted. "Interactive Systems and the Design of Virtuality", Creative Computing Magazine 6(11 & 12) Nov. & Dec. 1980.

Nelson, Ted. "Literary Machines", self-published, Swathmore, PA. 1981.

Nelson, Ted. "The Magicians, the Snark and the Camel", pp. 128-156, Creative Computing Magazine vol. 7 #11 Nov. 1981.

Nelson, Ted. "A New Home for the Mind", pp. 169-180, Datamation Magazine Mar 1982.

Nelson, Ted. "The Prophet from Xanadu", Clifford Barney, PC World Magazine vol. 1 #3 circa Jun. 1983.

Nelson, Ted. "Computopia Now!", pp. 349-351 in Steve Ditlea (editor), "Digital Deli", Workman Publishing Sun Francisco 1984.

Nelson, Ted. "Tools for Thought: The People and Ideas behind the Next Computer Revolution", Howard Rheingold, Simon and Schuster 1985 (p. 24 and pp. 295-305.).

Nelson, Ted. "Engines of Creation: Challenges and Choices of the Last Technological Revolution", K. Eric Drexler, Anchor/Doubleday 1986 (pp. 220-230).

Nelson, Ted. Article in The Economist (London) Aug. 23, 1986.

Nelson, Ted. "A Vision of the Future", Publishers Weekly Nov. 23, 1986.

Nelson, Ted. "The Tyranny of the File", Datamation Magazine Dec. 15, 1986.

Nelson, Ted. "Computer Lib/Dream Machines", second edition Microsoft Press 1987.

Nelson, Ted. Literary Machines 87.1 , self-published 1987.

Nelson, Ted. "Literary Machines", electronic edition OWL International, Inc. Bellevue Washington 1987.

Nelson, Ted. "All for One and One for All", proceedings of the ACM conference on Hypertext 1987, Chapel Hill, North Carolina, United States, Nov. 1987.

Nelson, Ted. "Hypertext Publishing and the Evolution of Knowledge", K. Eric Drexler, pp. 87-120, Social Intelligence vol. 1 #2.

Nelson, Ted. "Managing Immense Storage", pp. 225-238, BYTE magazine vol. 13(1):225-233, Jan. 1988.

Nelson, Ted. "To Strike the Lightning", HyperAge Feb.-Mar. 1988.

Nelson, Ted. "The Call of the Ocean: Hypertext Universal and Open", HyperAge May-Jun. 1988.

Nelson, Ted. Literary Machines 88.1, self-published 1988.

Nelson, Ted. Hypertext '87 keynote address, Andries van Dam, pp. 887-895, CACM vol. 31 #7 Jul. 1988.

Nelson, Ted. "Information Management: A Proposal", Tim Berners-Lee, CERN Mar. 1989, May 1990.

Nelson, Ted. "Two Men, Two Visions of One Computer World, Indivisible", Andrew Pollac.

Nelson, Ted. Media 72 (unpublished), 1967.

Nelson, Ted. Computopia and Cyercrud. In: Roger Levien (ed.): Computers in Introduction. Rand Corporation, 1971.

Nelson, Ted. The Home Computer Revolution, 1977.

Nelson, Ted. "Project Xanadu".

Nelson, Ted, ELF (Evolutionary File Stucture).

Nelson, Ted. "Getting it out of our system" in "Information Retrieval: A Critical Review", G. Schechter, ed. Thomson Books, Washington D.C., 1967, 191-210.

OWL: Handouts: Research and Documenting Sources. http://owl.encrlish.purdue.edu/handouts/research/index.

Patterson, John F., Egido, Carmen (1987): Video Browsing and System Response Time. In: Carroll, John M., Tanner, Peter P. (ed.): Proceedings of the ACM CHI 87 Human Factors in Computing Systems Conference. Apr. 5-9, 1987, Toronto, Canada. p. 189-198.

Personalized Retrieval, Indexing, and Documentation Evolutionary (PRIDE).

Ropiequet, S. "The Microsoft Multimedia Encyclopedia", Learning Tomorrow: Journal of the Apple Education Advisory Council, Spring 1987, pp. 303-320.

Schatz, B. (1985) Telesophy, Bellcore Technical Memo, TM-ARH-002487 (Aug.),76 pp.

Schwerin, J. Report on the 3rd International Microsoft CD-ROM Conference held Mar. 1-3, 1998, Seattle Washington, USA, Electronic and Optical Publishing Review, vol. 8, No. 1, Mar. 1988.

Sutherland, I.E. "Sketchpad: A Man-Machine Graphical Communication System," in Proceedings of the Spring Joint Computer Conference, Spartan Books, Baltimore, MD, 1963.

Sutherland, I.E. "The Ultimate Display," *Proceedings of the 1965 IFIP Congress*, 2, 1965, pp. 506-508.
"The Dawn of Laser Storage", *Macworld* (Apr. 1, 1988).
USN: Joint Operational Tactical System, (JOTS).
USN: Navy Tactical Data System (NTDS).
USN: Joint Information Management Center (JIMC).
USN: Aegis Combat System.
USN: E2-C Hawkeye.
USN: USS Alabama (SSBN-731).
USN: USS Dallas (SSN-700).
USN: USS Arleigh Burke (DDG-51).
USN: USS Bunker Hill (CG-52).
USN: USS Princeton (CG-59).
USN: USS Chancellorsville (CG-62).
USN: USS Chosin (CG-65).
USN: USS Nimitz (CVN-68).
USN: USS Norton Sound (AVM-1).
Van Dam, Andries. "SHIRTDIF—A System for the Storage Handling and Retrieval of Technical Data in Image Format" (With D. Evans), in *Proceedings American Documentation Institute* (1964).
Van Dam, Andries. Teacher Training for the Age of Automation, in *Automation Yearbook* (1965).
Van Dam, Andries. "Computer-Driven Displays and Their Use in Man/Machine Interaction," in *Advances in Computers*, Academic Press (1966).
Van Dam, Andries. "A Compact Data Structure for Storing, Retrieving and Manipulating Line Drawings" (with D. Evans), in *Proceedings 1967 Spring Joint Computer Conference* (1967).
Van Dam, Andries. "Hardware Developments and Product Announcements" (with J. Michener), in *Second Annual Review of Information Science and Technology*, John Wiley & Sons (1967).
Van Dam, Andries. "Data Structure Programming System" (with D. Evans), in *Proceedings IFIP Congress*, Edinburgh (1968).
Van Dam, Andries. "Computers" (with P. Sullivan), in *Encyclopedia Puritanical Yearbook of Science and Technology* (1969).
Van Dam, Andries. "Computers and Publishing: Writing, Editing and Printing" (with D. Rice), in *Advances in Computers* 10, Academic Press (1970).
Van Dam, Andries. "Software Capabilities of the Adage Graphics Terminal" (with D. Bergeron), in *Proceedings Computer Graphics 70*, Brunel University, England (1970).
Van Dam, Andries. Human Factors of Computer Input and Output Devices, in *Proceedings SID Symposium* (Jun. 1970).
Van Dam, Andries. Introduction to Picture Modeling (Data Stuctures), in *Proc. SPSE-NMA-SID Seminar on Computer Handling of Graphical Information* (Aug. 1970).
Van Dam, Andries. An Introduction to Interactive Computer Graphics, in *Proceedings Delft Symposium on Interactive Computer Graphics* (Oct. 1970).
Van Dam, Andries. Satellite Computer Graphics, in *Proceedings 1971 SEAS Conference*, Pias, Italy (Sep. 1971).
Van Dam, Andries. Microprogramming for Computer Graphics, in *ACM SIGGRAPH* 7(3) (Winter 1971).
Van Dam, Andries. "Computer-Assisted Tracing of Text Evolution" with W. Elliott and W. Potas), in *Proceedings 1971 Fall Joint Computer Conference* (1971).
Van Dam, Andries. "Software Data Paging and Segmentation For Complex Systems" (with F. Tompa), in *Information Processing Letters* 1 (3), North-Holland Publishing Company (Feb. 1972).
Van Dam, Andries. "Some Implementation Issues Relating to Data Structures for Interactive Graphics", in *International Journal of Computer and Information Sciences*, Plenum Press (Aug. 1972).
Van Dam, Andries. "Systems Programming Languages" (with D. Bergeron, J. Gannon, D. Shecter and F. Tompa), in *Advances in Computers* 12, Academic Press (Oct. 1972).
Van Dam, Andries. "An Introduction to Information Structures and Paging Considerations for On-line Text Editing Systems" (with D. Rice), in *Advances in Information Systems Science* 4, Plenum Press (1972).
Van Dam, Andries. Intelligent Satellites for Interactive Graphics (with G. Stabler), in Proceedings 1973 National Computer Conference and Exposition (Jun. 1973). With G. Stabler and Richard J. Harrington), in *Proceedings of the IEEE* 62(4) (Apr. 1974).
Van Dam, Andries. Computer Architecture and Instruction Set Design (with P. Anagnostopoulos, M. Michel, G. Sockut and G. Stabler), in *Proceedings 1973 National Computer Conference and Exposition* (Jun. 1973).
Van Dam, Andries. "Operating System Design Considerations for Microprogrammed Minicomputer Satellite Systems" (with P. Anagnostopoulos, R. Johnson, R. Munck, J. Stockenberg and G. Stabler), in *Proceedings 1973 National Computer Conference and Exposition* (Jun. 1973).
Van Dam, Andries. "Some Aspects of Satellite Graphics" (with G. Stabler), in *Proceedings IEEE NEREM Conference* (Nov. 1973).
Van Dam, Andries. "Design Considerations for Microprogramming Languages"(with G. Lloyd), in *Proceedings 1974 National Computer Conference and Exposition* (May 1974).
Van Dam, Andries. "Towards the Development of Machine-Independent Systems Programming Languages" (with K. Magel and M. Michel), in *Proceedings 1974 National Computer Conference and Exposition* (May 1974).
Van Dam, Andries. "STRUCT Programming Analysis System" (with J. Stockenberg), in *IEEE Transactions on Software Engineering* (Dec. 1975).
Van Dam, Andries. "A Multi-Microprocessor Implementation of a General-Purpose Pipeline CPU" (with R. Ramseyer), in *Proc. 4th Annual Symposium on Computer Architecture (ACM and IEEE)*, Silver Spring Maryland (Mar. 1977).
Van Dam, Andries. "Trends in Distributed Data Processing in North America" (with J. Stankovic and L. DeNoia), in *Proceedings of SEAS Spring Technical Meeting*, Baden, Austria (Apr. 1977).
Van Dam, Andries. "Status Report of the Graphics Standards Planning Committee of ACM SIGGRAPH (Part 11: General Methodology and Proposed Standard)" (with D. Bergeron, J. Foley, P. Bono, I. Carlbom, T. Dreisbach, J. Michener and E. Sonderegger), in *Proceedings ACM SIGGRAPH 77*, San Jose, California (Jul. 1977).
Van Dam, Andries. Evaluation of Performance Improvement in a Host-Satellite Distributed Processing System (with J. Michel), in *Second Distributed Processing Workshop*, Brown University (Aug. 1977).
Van Dam, Andries. "Solving Signal Processing Algorithms with a Multi-Microprocessor Network" (with R. Ramseyer and S. Morgera), in *Proceedings Oceans '77 International Conference, Marine Technical Society and IEEE*, Los Angeles (Oct. 1977).

Van Dam, Andries. Vector Graphics Today, in *Proceedings SEAS Spring Technical Meeting*, Nijmegen, Netherlands (Apr. 1979).
Van Dam, Andries. Graphics Standards and Standard Packages, in *Proceedings SEAS Spring Technical Meeting*, Nijmegen, Netherlands (Apr. 1979).
Van Dam, Andries. Interactive Editing Systems (with N. Meyrowitz), in *Document Preparation Systems*, North-Holland Publishing Company (1983).
Wilson, K.S. The Palenque Optical Disc Prototype: Design of Multimedia Experiences for Education and Entertainment in a Nontraditional Learning Context. *Technical Report #44*. Bank Street College of Education, Center for Children and Technology, New York, 1987.
Woram, John. "CD-ROM Update—Curling Up with Amdek's Laserdrive 1 and a Good Book", *HyperMedia*, Summer '88.
World GeoGraph Software Program.
Nelson, Ted. "Electronic Publishing and Electronic Literature", in Edward DeLand (editor), "*Information Technology in Health Science Education*", Plenum Press 1978. pp. 211-216
Schwerin, J. Report on the 3rd International Microsoft CD-ROM Conference held Mar. 1-3, 1998, Seattle Washington, USA, *Electronic and Optical Publishing Review*, vol. 8, No. 1, Mar. 1988. pp. 14-44.
Meng, Brita. "The Dawn of Laser Storage", *Macworld* (Apr. 1, 1988). pp. 155-161.
Van Dam, Andries. "SHIRTDIF—A System for the Storage, Handling and Retrieval of Technical Data in Image Format" (with D. Evans), in *Proceedings American Documentation Institute* (1964). pp. 323-329.
Van Dam, Andries. "Computer-Driven Displays and Their Use in Man/Machine Interaction," in *Advances in Computers*, Academic Press (1966). pp. 239-290.
Van Dam, Andries. "Data Structure Programming System" (with D. Evans), in *Proceedings IFIP Congress*, Edinburgh (1968). pp. 557-564.
Van Dam, Andries. "Computers and Publishing: Writing, Editing and Printing" (with D. Rice), in *Advances in Computers* 10, Academic Press (1970). pp. 145-174.
Van Dam, Andries. "Software Data Paging and Segmentation for Complex Systems" (with F. Tompa), in *Information Processing Letters* 1 (3), North-Holland Publishing Company (Feb. 1972). pp. 80-86.
Van Dam, Andries. "Some Implementation Issues Relating to Data Structures for Interactive Graphics", in *International Journal of Computer and Information Sciences*, Plenum Press (Aug. 1972). pp. 287-314.
Van Dam, Andries. "Systems Programming Languages" (with D. Bergeron, J. Gannon, D. Shecter and F. Tompa), in *Advances in Computers* 12, Academic Press (Oct. 1972). pp. 175-284.
Van Dam, Andries. "An Introduction to Information Structures and Paging Considerations for On-line Text Editing Systems" (with D. Rice), in *Advances in Information Systems Science* 4, Plenum Press (1972). pp. 93-159.
Van Dam, Andries. Intelligent Satellites for Interactive Graphics (with G. Stabler), in Proceedings 1973 National Computer Conference and Exposition (Jun. 1973). With G. Stabler and Richard J. Harrington), in *Proceedings of the IEEE* 62(4) (Apr. 1974). pp. 229-238.
Van Dam, Andries. Computer Architecture and Instruction Set Design (with P. Anagnostopoulos, M. Michel, G. Sockut and G. Stabler), in *Proceedings 1973 National Computer Conference and Exposition* (Jun. 1973). pp. 519-527.
Van Dam, Andries. "Operating System Design Considerations for Microprogrammed Mini-computer Satellite Systems" (with P. Anagnostopoulos, R. Johnson, R. Munck, J. Stockenberg and G. Stabler), in *Proceedings 1973 National Computer Conference and Exposition* (Jun. 1973). pp. 555-562.
Van Dam, Andries. "Some Aspects of Satellite Graphcis" (with G. Stabler), in *Proceedings IEEE NEREM Conference* (Nov. 1973). pp. 88-111.
Van Dam, Andries. "Design Considerations for Microprogramming Languages" (with G. Lloyd), in *Proceedings 1974 National Computer Conference and Exposition* (May 1974). pp. 537-543.
Van Dam, Andries. "Towards the Development of Machine-Independent Systems Programming Languages" (with K. Magel and M. Michel), in *Proceedings 1974 National Computer Conference and Exposition* (May 1974). pp. 653-658.
Van Dam, Andries. "STRUCT Programming Analysis System" (with J. Stockenberg), in *IEEE Transactions of Software Engineering* (Dec. 1975). pp. 384-389.
Van Dam, Andries. "Solving Signal Processing Algorithms with a Multi-Microprocessor Network" (with R. Ramseyer and S. Morgera), in *Proceedings Oceans '77 International Conference, Marine Technical Society and IEEE*, Los Angeles (Oct. 1977). pp.31A-1-31A-6.
Van Dam, Andries. Interactive Editing Systems (with N. Meyrowitz), in *Document Preparation Systems*, North-Holland Publishing Company (1983). pp. 21-132.
"A Brief Characterization of Written, Printed, Electronic, and Hyper Texts." *Hypertext '89 Proceedings*. Nov. 1989. pp. 85-92.
Press, Larry. "Thoughts and Observations at the Mocrosoft CD-ROM Conference." Communications of the ACM. vol. 32, No. 7, Jul. 1989. pp. 784-788.
Eckhouse, Richard et al. "Issues in Distributed Processing—An Overview of Two Workshops." *Computer Magazine*. Jan. 1978. pp. 22-26.
Norman, Alan et al. "Integrating Business Listings with Digital Maps for Ue in Vehicles." Vehicle Information Systems and Electronic Display Technology. Society of Automotive Engineers: Warrendale, PA. Feb. 1991. pp. 17-21.
Rilings, James H. et al. "An Advanced Driver Information System for North America." pp. 85-94.
Rilings, James H. et al. "Advanced Driver Information Systems." *IEEE Transactions on Vehicular Technology*, vol. 40, No. 1, Feb. 1991. pp. 31-40.
Honey, Stanley K. et al. "A Novel Approach to Automotive Navigation and Map Display." IEEE 1986. pp. 480-484.

* cited by examiner

MULTIMEDIA SEARCH SYSTEM

CROSS-REFERENCE TO RELATED APPLICATIONS

This application is a continuation of U.S. application Ser. No. 10/103,814, filed Mar. 25, 2002, which is a continuation of U.S. application Ser. No. 08/202,985, filed Feb. 28, 1994, now U.S. Pat. No. 6,546,399, issued Apr. 8, 2003, which is a continuation of application Ser. No. 08/113,955, filed Aug. 31, 1993, now abandoned, which is a continuation of U.S. application Ser. No. 07/426,917, filed Oct. 26, 1989, now U.S. Pat. No. 5,241,671, the disclosures of which are incorporated herein by reference in their entireties.

The combination of search strategies to uncover graphical and related textual information or visa versa. Other limitations exhibited by some software products include the lack of interactive search tools adapted for non-expert users, and the lack of interactive search tool that fully explore and exploit the full capabilities of a CD-ROM database.

An example of some of the above limitations is demonstrated by the Grolier CD-ROM based encyclopaedia. The Grolier product provides an interactive search tool that allows for the access of textual data through four search modes. The first search mode involves a Browse capability where the user types in the first few letters or words of a particular topic and the software then displays a menu listing the article titles that are closest in the alphabet to the search terms. The user can then scan forward or backward through the alphabetically arranged titles until an article of interest is found.

The second search mode is known as the Browse Word Index. In this mode, the user selects the word occurring in any of the articles in the display. The software then sorts entries in descending order of the words, based upon the number of times that the specific search word occurs in the text. A third search mode involves expanding the Browse Word Index Mode to combine Boolean operators such as "and", "or", or "not", and the fourth search mode involves linking terms appearing in the articles that are designated by capital letters. In particular, by depressing the RETURN key while the cursor is located on the linking word, the search software will retrieve a menu of article titles centered on that linked term.

However, the Grolier system only accesses textual data by means of text-based entry paths. No facility exists for taking advantage of the CD-ROM's capacity to store pictures, sound, or video information.

This shortcoming of a full text/graphics interactive search system is not overcome by those products that are directed to searching graphical databases. That is because the graphics oriented systems fail to either include any text-based entry paths or text entry paths that would enable the user to employ the full capacity of the CD-ROM.

For example, The World GeoGraph computer program provides a graphics based atlas exploration program where a user can search through multiple layers (each layer having a greater degree of detail) of an on-screen map. The GeoGraph database is also integrated with information relating to each country of the atlas and the search program includes a feature for using plain English selection rules contained in dialogs to search and sort information pertaining to the maps. The World GeoGraph program, however, pertains to a textual search of only that textual information that explains the graphical database and the text information is retrieved only by means of a single entry path. World GeoGraph thereby does not appear to provide full textual search capabilities of an entire textual database that is distinct from the graphical database.

SUMMARY AND OBJECTS OF THE INVENTION

In view of the foregoing, it should be apparent that a need still exists for a database search system that retrieves multimedia information in a flexible, user friendly system. It is, therefore, a primary object of the invention to provide a search system in which a multimedia database consisting of text, picture, audio and animated data is searched through multiple graphical and textual entry paths.

It is a further object of the invention to provide for a search system wherein both the textual and graphical entry paths are interactive.

It is yet an additional object of the invention to provide for a search system where the textual and graphical entry paths are interrelated such that textual information is fully accessible from the graphical entry paths and graphical information is fully accessible from the textual entry paths.

It is still an additional object of the invention to provide for a search system where the graphical and textual information are contained in a single database and the information consists of words, phrases, numbers, letters, maps, charts, pictures, moving images, animations and audio information.

It is yet an additional object of the invention to provide for a search system which is stored on a CD-ROM disc.

It is yet a further object of the invention to provide for a search system which is adapted to operate on a microcomputer in either a stand-alone capacity or on a network.

It is still a further object of the invention to provide for a search system where one of the graphical entry paths involves interactively narrowing a search of graphical images to a point in which related textual information about each image becomes accessible.

It is still an additional object of the invention to provide for a search system wherein the textual search can be narrowed to a point where graphical information related to the uncovered text is accessible.

It is a further object of the invention to provide for a search system where both textual and graphical entry paths include functions which enhance the efficacy of the searches and the accessibility of information retrieved from those searches.

It is also an object of the invention to provide for a search system in which an idea search entry path is provided which can retrieve textual information stored in stem indexes in the database.

It is yet a further object of the invention to provide for a search system that compares misspelled search terms with definitions stored in a database dictionary. The search system then automatically suggests alternative spellings to the user.

It is an additional object of the invention to provide for a new list function if the initial information uncovered by the search does not meet the user's expectations The system will then suggest alternative terms for ambiguous search terms.

It is a further object of the invention to provide for a search system where phrases, paragraphs or sentences can be entered by the user to be searched. The entered search terms are then compared to a list of stop words, and those stop words are then automatically eliminated, such that a search is performed only on particular terms occurring in the phrases, sentences or paragraphs.

It is still a further object of the invention to provide for a search system whereby phrases can be searched together rather than being broken up as a group of individual searches for key terms.

It is yet an additional object of the invention to provide for a system whereby the graphical and textual information comprise an encyclopaedia. The textual information of the database also includes a dictionary, a thesaurus, a glossary and a stored fact index.

It is still another object of the invention to provide for a search system where one of the textual entry paths consists of a title finder search.

It is a further object of the invention to provide for a search system where one of the textual entry paths consists of a topic tree program that divides all textual information into topics, sub-topics and so on, in order to assist a user in finding an article of interest.

It is yet a further object of the invention to provide for a picture explorer entry path which enables a user to find pictures and then retrieve related textual information for each picture.

It is yet a further object of the invention to provide for a search system where one of the textual entry paths consists of a history timeline search program.

It is an additional object of the invention to provide for a search system wherein a portion of the graphical and textual entry paths consist of a world atlas entry path.

It is still a further object of the invention to provide for a textual entry path which highlights particular feature articles. This entry path takes a user directly to one of a plurality of articles located in the search system.

It is also an object of the invention to provide for a search system where one of the textual entry paths consists of a researcher's assistant program.

Briefly described, these and other objects of the invention are accomplished by providing a search system for retrieving information comprising multiple textual entry paths for searching textual information and multiple graphical entry paths for searching graphical information such that the search system retrieves information through both the textual and graphical entry paths.

The textual and graphical entry paths are made up of eight separate and interrelated entry paths such that textual information is fully accessible from the graphical entry paths and graphical information is fully accessible from the textual entry paths. A first textual entry path consists of the Idea Search entry path which retrieves textual information stored in the stem indexes in the database. Each stem is identified with a root and stems are linked to each root so that they represent all related endings for that root. Each stem is related to units of textual information in the database. Stem terms are then concatenated by the Idea Search in order to map the stems to the same idea. The concatenation step involves linking the stems together based on grammatical linkages and based on thesaurus linkages. Information retrieved from the Idea Search is then ranked based upon two coefficients: exhaustivity and exclusivity. Exhaustivity measures the number of occurrences for that stem in the database. The exclusivity coefficient measures the degree to which that stem is related to the idea. The exclusivity and exhaustivity coefficients are then calculated, combined with other stems and calculated for each article. A list of articles is then ranked based upon the coefficients in order of relevance to the search terms.

Another textual entry path consists of a title finder search. The title finder assists the user in uncovering articles stored in the search system. Those article titles are uncovered either by moving through an alphabetical list of article titles until a desired title is located, clicking a letter tab for the first letter of the subject so that a list of article titles having the first letter is provided, or typing in the article title name such that the page listing the article title is then displayed.

One of the graphical entry paths consists of the picture explorer which enables the user to find pictures and then retrieve related textual information for the picture. In operation, the picture explorer is provided in three modes: a picture tour mode where pictures are presented in random order, a picture finder mode which allows the user to select from a list of alphabetically ordered pictured captions, or a picture search mode where the user searches picture captions by entering search terms and having the computer search those entered search terms. A further textual entry path consists of a history timeline program. The timeline displays events on a graphical timeline in order that a user may select an event and retrieve further information about that event. The timeline is divided into a year interval bar, major event boxes, and a president's bar. Any one of the elements on the bars are activated by a user in order to retrieve related textual information.

A further entry path which is graphically and textually based is the world atlas entry path. This program enables the user to search maps of an atlas. The atlas can be searched by having the user either identify a place name, or by scanning, or rotating the atlas. If the place name search is implemented, the program draws a corresponding map around the specified place. The atlas can then be viewed at multiple levels of increasing detail for any part of the atlas. Textual information related to any place labeled on the atlas is then retrieved.

A further entry path consists of the researcher's assistant program. The researcher's assistant contains subject matter categories divided into topics and the topics are then divided into assignments. Each assignment is then ranked by its level of difficulty.

Finally, the invention includes a textual entry path which highlights particular feature articles. This entry path is designed to take the user directly to one of a plurality of articles located in the database.

With these and other objects, advantages and features of the invention that may become hereinafter apparent, the nature of the invention may be more clearly understood by reference to the following detailed description of the invention, the appended claims and to the several drawings attached herein.

DETAILED DESCRIPTION OF THE INVENTION

In the context of this disclosure and the claims appended hereto, references to an information database can apply to any type of data, any type of data format, or any type of storage medium. A preferred embodiment of this invention involves CD-ROM technology. However, the system can also include DVI, CD-I, or any other suitable optical memory devices. The system is adapted to run on any computer device. As an example, the system may run on an IBM AT or other 286, 386 or 486 based computer having similar characteristics as a stand-alone unit. In a network environment, for example, the preferred embodiment can run on an IBM host and on a Novell communications network. However, any computer having sufficient processing speed and memory capability can be employed.

That system also may include a VGA card and a VGA or multi-sync type monitor, a 20 MB Hard Disk Drive, a Speech Adaptor and Card and a mouse with related software. Other features for the preferred hardware can include a computer with at least 1 MB RAM, a DOS Version 3.3 (or later release) and a CD-ROM drive with a controller card. Compatible CD-ROM drives include the CD V100 by Sony Corp., or models by Hitachi or AMDEK. Any other compatible CD-ROM drives must use the MS-DOS standards (CCD-ROM extension).

Although the system forming the present invention can be used for any application, a preferred embodiment is as a multimedia encyclopaedia database and search system. The database for the preferred embodiment consists of approximately 8.8 million words, 5,200 articles, 26,023 concise capsule articles, 63,503 entries in a Fact-Index, 65,000 entries in a full database dictionary, 1500 glossary terms, and a thesaurus.

The database also consists of 15,000 graphics comprising photographs/charts/diagrams and animations. Those graphics can include low resolution images, depending on the capabilities of the hardware. Supported graphic standards include VGA (640×480 ×16 colors) and super VGA images (640×480×256 colors), though standards within or beyond these are also envisioned for this product. Nothing contained herein precludes the possibility of releasing this invention on computers which support different graphics standards. The preferred embodiment includes 60 minutes of audio, including 1,500 glossary terms, and other audio selections, and some 45 animation sequences. The amount of audio and animation is expected to increase depending on the hardware and software capabilities.

Figure 1:
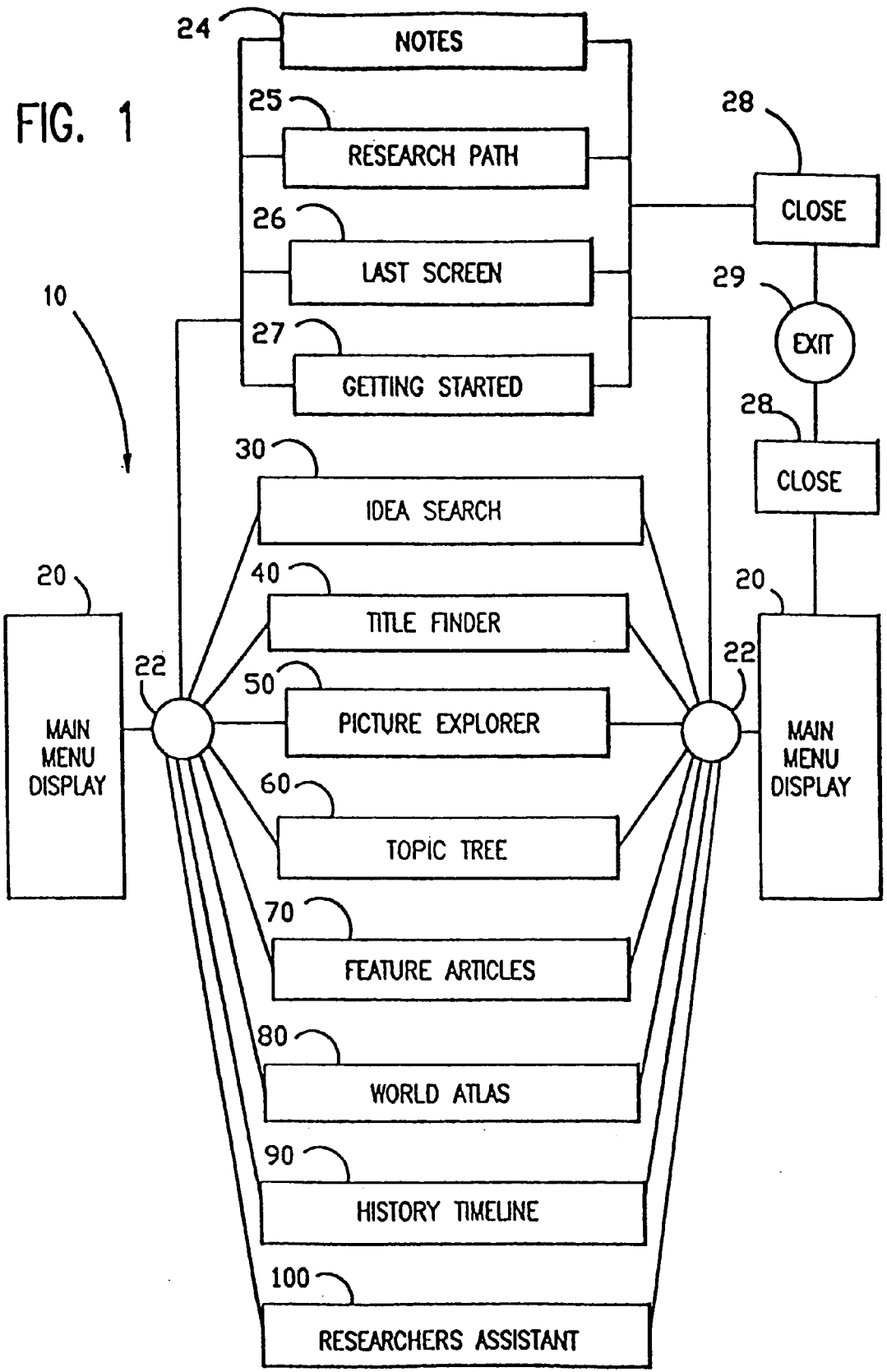
FIG. 1 is a functional flow chart showing the logical operations of the Main Menu program of the present invention.
Figure 2:
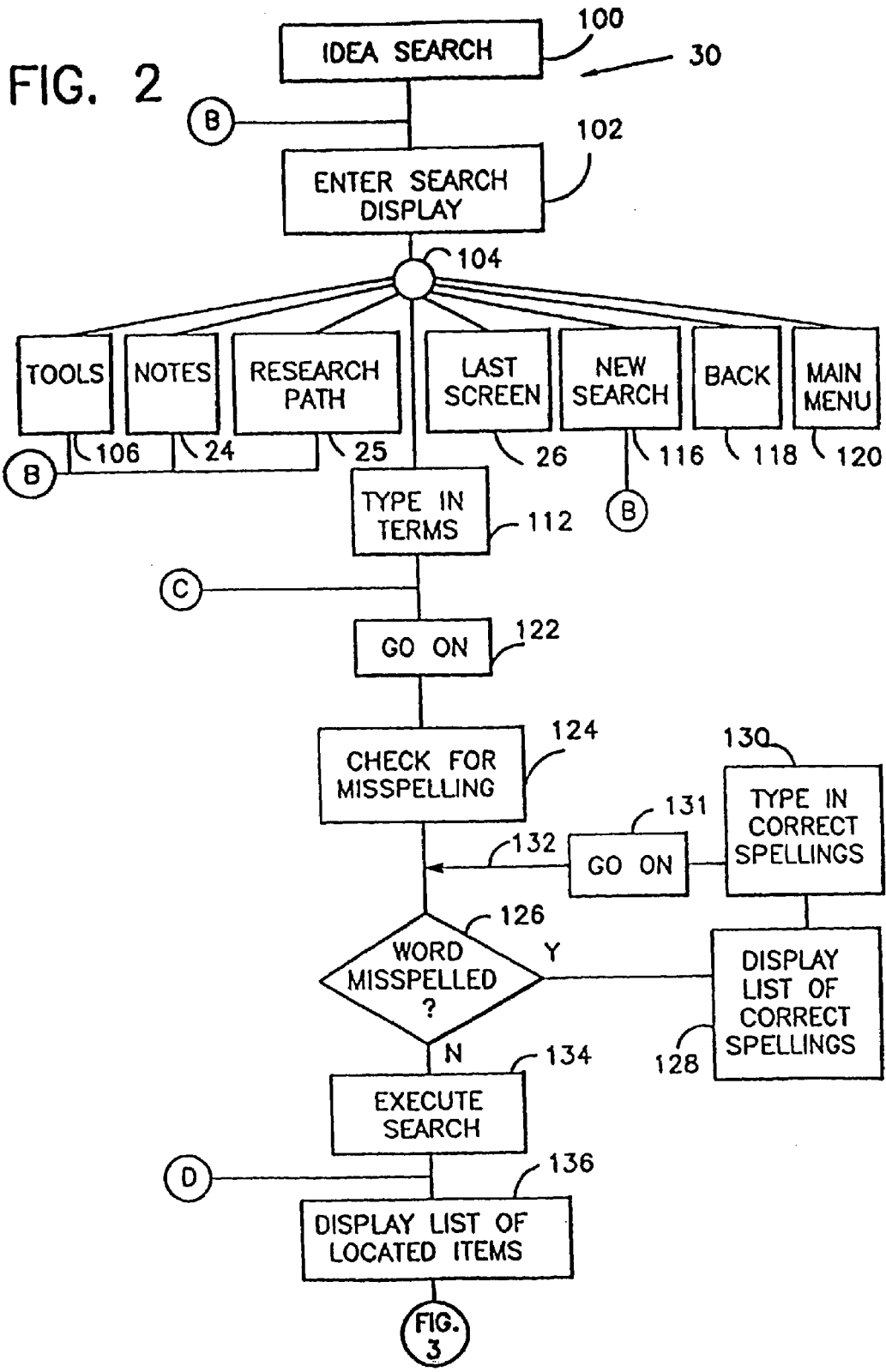
FIG. 2 is a flow chart of the logic operations of the Idea Search entry path of the present invention.

Referring to the Figures, wherein like references refer to like elements, FIG. 1 illustrates a functional flow chart of the logical operations of the Main Menu program 10. It is from the Main Menu 10 that a user can enter the multimedia database in order to view articles, pictures, illustrations and other special features including sound and moving pictures.

There are eight entry paths available from the Main Menu program 10 into the database. Those paths include the Idea Search 30, the Title Finder 40, the Picture Explorer 50, the Topic Tree 60, the Feature Articles 70, the World Atlas 80, the History Timeline 90 and the Researcher's Assistant 100. Additionally, upon turning on the Main Menu program 10, various functions become available to the user. Those functions include a Notes function 25, a Close command 28 and a Help function (not illustrated). Brief descriptions of each of the entry paths are provided below.

The Idea Search entry path 30 assists the user in finding information regarding any topic for exploration. In this entry path 30, the user types in words, questions or descriptions for the search, causing the computer to search for any articles related to that search request.

The Title Finder 40 provides the user with an alphabetical list of all articles in the database. The user can then choose the title of an article that he wants to review by either scrolling through a title list, typing in a desired title or browsing through the title list after choosing a letter tab.

The Picture Explorer entry path 50 allows the user to view pictures that are stored in the database. The Picture Explorer accesses information in three modes: (1) by allowing a user to randomly browse through a collection of pictures, (2) by displaying a list of captions and enabling a user to select corresponding pictures or, (3) by allowing a user to enter a description of the picture which then triggers the entry path to automatically search the terms of that description for corresponding picture captions.

The Topic Tree entry path 60 provides the user with both a means for browsing through a list of topics and sub-topics and also for iteratively refining the topical subject matter. Specifically, Topic Tree divides all of the information in the database into lists of topics and sub-topics so that by browsing through successive lists, the user can iteratively narrow his search until he finds an article of interest.

The Feature Articles entry path 70 provides a selection of special interest or focus articles for the user. The user then picks one of the article titles in the menu in order to be taken directly to the article.

The World Atlas entry path 80 draws maps of the earth after interactive selection by the user. The maps can be enlarged or contracted, rotated or viewed along longitudinal and latitudinal lines. Moreover, a place finder function is available which helps the user choose a place on the map. Once that place name is selected, the computer will then draw a map around the selected location. By then clicking a place label with a mouse on the map, an article corresponding to that label can be accessed from the database.

The History Timeline entry path 90 enables the user to browse through a timeline containing references to historical events. Choosing any of those events will cause the system to provide a summary of the event and then list articles related to that event, historical person, etc.

The Researcher's Assistant entry path 100 contains a set of research categories and sub-topics. Each topic, in turn, includes three assignments which are classified according to level of difficulty. The user may then choose one of those assignments which then refers him to the Main Menu to complete his research.

The Main Menu 10 also includes several functions. The functions are Notes 24, which allows the user to take notes; the Research Path function 25 which opens a window on the screen displaying a list of previous steps that the user has taken in his searches; the Last Screen function 26 which backs-up along the research path one step to return the user to the last screen he saw; and the Getting Started function 27 which provides a step-by-step tutorial that guides the user through the multimedia database. A Close command 28 also is available in order to exit the system.

When turning the system on, the Main Menu display 20 is shown. The user may then select at step 22 any of the above identified entry paths or functions. The selection activates the designated function or entry path program.

Upon exiting from a selected entry path or function, the user can return to the Main Menu display 20. Upon choosing the Close command 28, the user exits the system at step 29. The Close command 28 is always available as an option in the Main Menu display. Hence, the program can always be exited at any time the Main Menu display is available.

FIGS. 2–5 illustrate the Idea Search entry path 30. As previously noted, the function of the Idea Search 30 is to aid the user in finding information about any topic he wishes to explore in the database. The Idea Search entry path 30 is based upon a term based search that responds to user entered search information. The computer then isolates "legal" search terms and searches through the database. Following the search, a list of article titles ordered by relevance to the search request are then provided by the computer.

The Idea Search 30 is entered by clicking a mouse over an associated icon in the Main Menu display 20 (FIG. 1). A call to the Idea Search program 100 raises the Idea Search entry screen 102. The Idea Search entry display 102 includes a number of functions located on a prompt line at the bottom of the screen. Those functions include Tools 106, Notes 24, Research Path 25, Last Screen 26, New Search 116, Back 118 and Main Menu 120. Some of the functions, as denoted by the letter "B", return the user directly back to the search display when completed. Others, however, do not. A description of each of the functions will be provided in more detail below.

After the user has made a selection 104 to enter search terms 112, the user then types in those terms in a window on the display. The search terms can be entered as words, phrases, whole sentences or entire paragraphs. The only limitation is that these terms describe the topic or question to be searched. The user then clicks the mouse on the icon for the Go On command 122 which tells the computer to begin searching. If a search word is misspelled, the computer will then access an internal dictionary and an internal thesaurus stored in the database if it does not recognize the misspelled word. A check for misspelling thus occurs in step 124. If the word is found to be misspelled at step 126, then the Idea Search will display a list of other spellings 128 that closely approximate the misspelled word. The user may then use a mouse, for example, to click the proper word on the list which automatically makes the correction 130. The user then actuates the Go On command 131 which causes the properly spelled word to be returned to the list of search terms at step 132 and the system to execute the search on the correctly spelled word. The correctly spelled term will then be displayed in a list of the located items 136 following their search at step 134. Details regarding step 134 are provided in FIGS. 4–5.

Items on the displayed list, for example, can be titles to articles containing the search terms. It is contemplated, however, that any information representing the search term can be represented in this list.

More particularly, in addition to the items of the list, the display screen 136 shows search words that have actually been searched. Those words are highlighted to set them off from the non-searched terms. The Idea Search 20 entry path automatically decides which terms to highlight and which terms not to search, based on a review of stop terms stored in the database. Examples of stop terms include "what", "the", "and", "or", punctuation, etc. The items listed also are arranged in the display 136 in order of relevance to the entered search terms. A further description of the relevance ranking algorithm is provided.

Some of the items listed are preceded by one or more asterisks. The asterisk(s) indicate that the adjacent item in the list is likely to contain highly relevant information. In order to choose the item, the user can then move through the list using Up and Down arrow keys located on the display adjacent to the list. When a user sees the article that he wants, he then clicks that article that is likely to have the best information about the search word.

Figure 3:
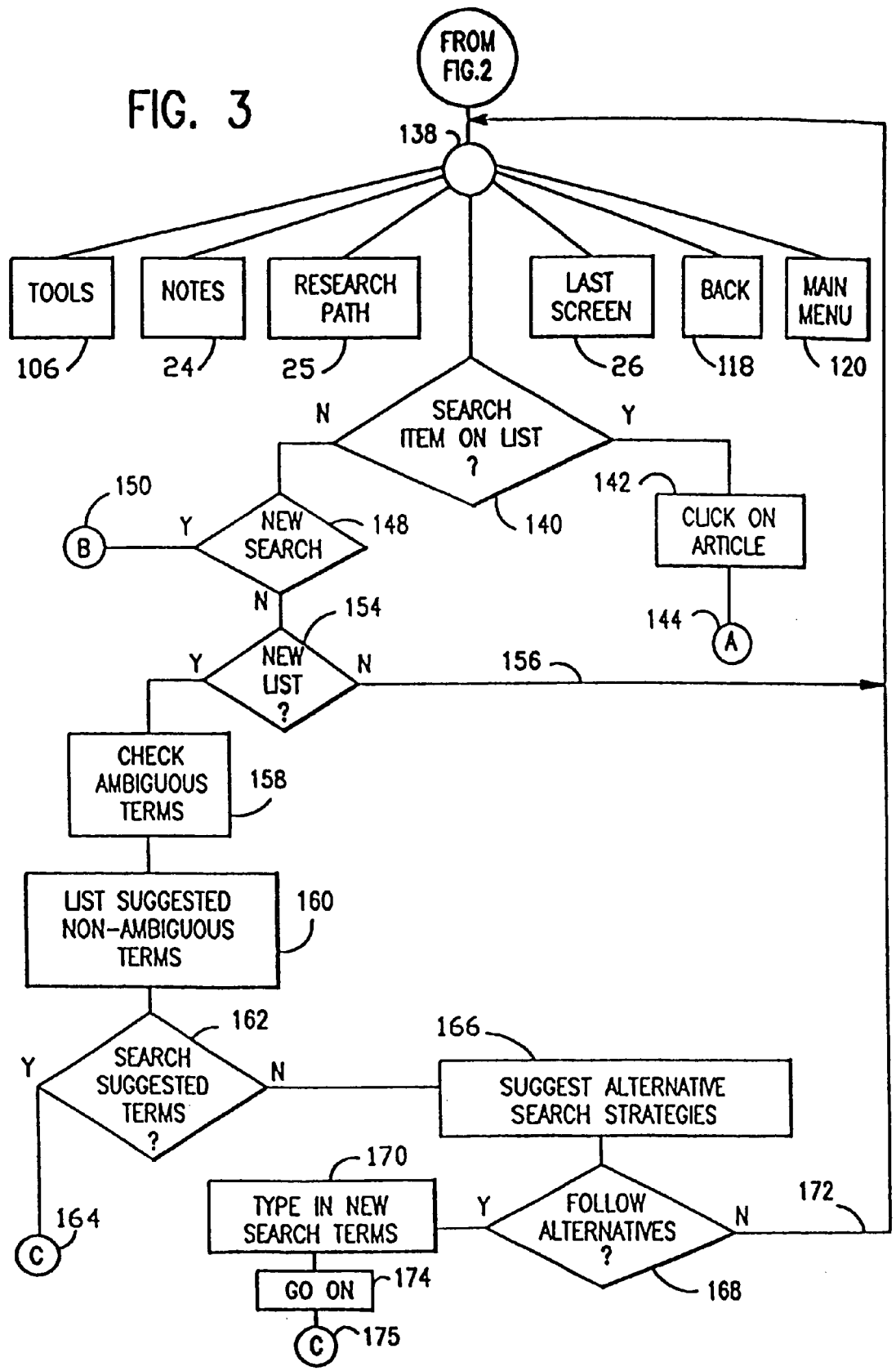
FIG. 3 is a first flow chart of the logic operations of the Idea Search entry path.

Referring now to FIG. 3, further details regarding the Idea Search 30 are shown. In particular, a screen 136 is presented along with icons for several functions located on the prompt bar. The user selects any one of the functions by clicking a mouse on an appropriate icon representing that function. Those functions include Tools 106, Notes 24, Research Path 25, Last Screen 26, Back 118 and Main Menu 120. A description for each function is provided with reference to FIGS. 8–12.

If the user is interested in looking at the items on the list at step 140, he can then move through the list of items, as previously described, and click the mouse on a desired item at step 142. As a result, the user goes into the (article) program at step 144. If, however, the user does not see an item that he desires, or wishes to search for different terms, he branches at step 146 to select the New Search mode 148. If the user then decides to pursue a new search he branches to the beginning of the Idea Search program 150. If, however, the user is only interested in improving his original search request, he then clicks the icon representing the New List function 155.

The New List function 155 improves the original search request by either providing non-ambiguous alternate search terms 158 or by suggesting alternate search strategies.

The ambiguous term check 158 acts like a thesaurus. For example, should the user type in the word "rain," alternate search terms for that word (e.g. "rainfall", "snow", "storm", "water", "weather") would be listed on the display at step 160. The user may then click the desired non-ambiguous terms in the list, or enter the non-ambiguous terms in the Idea Search window 162, and then search for non-ambiguous search terms 164 (see FIG. 2). Following the ambiguous term search, the program then automatically returns the user to a new display list of the located non-ambiguous terms 136 (see FIG. 2).

However, if none of the listed non-ambiguous alternate search terms presents a viable alternative, the computer will then display the original search request and will also suggest ways to modify that request at step 166. To modify the search, the user then retypes new search words 170, 173 that conform to the alternate strategies. The Go On command 174 is then activated to generate a new search 175 (see FIG. 2).

The ambiguity check feature operates as follows: suppose this search involves different forms of "rainfall" and the user types in the word "rain". The list generated from the Idea Search might then include a list of articles entitled CLOUD, MISSISSIPPI, TENNESSEE, ENGLAND and KANSAS. Although the search concerned "rain", the last four articles were included on the list because those articles contain sections on climate and weather. To improve upon that search, therefore, the New List function 154 is selected.

The original request for rain, will then reappear but will not be highlighted. The user can then move the cursor over the "r" in rain and click the mouse. As a result, non-ambiguous suggestions for the term "rain" will be presented. To improve the search, one suggestion would be to change "rain" to "forms of rain". Once the mouse is clicked over this suggestion and then the Go On is clicked, the computer will begin a search for new articles which may relate more closely to "rainfall".

Figure 4:
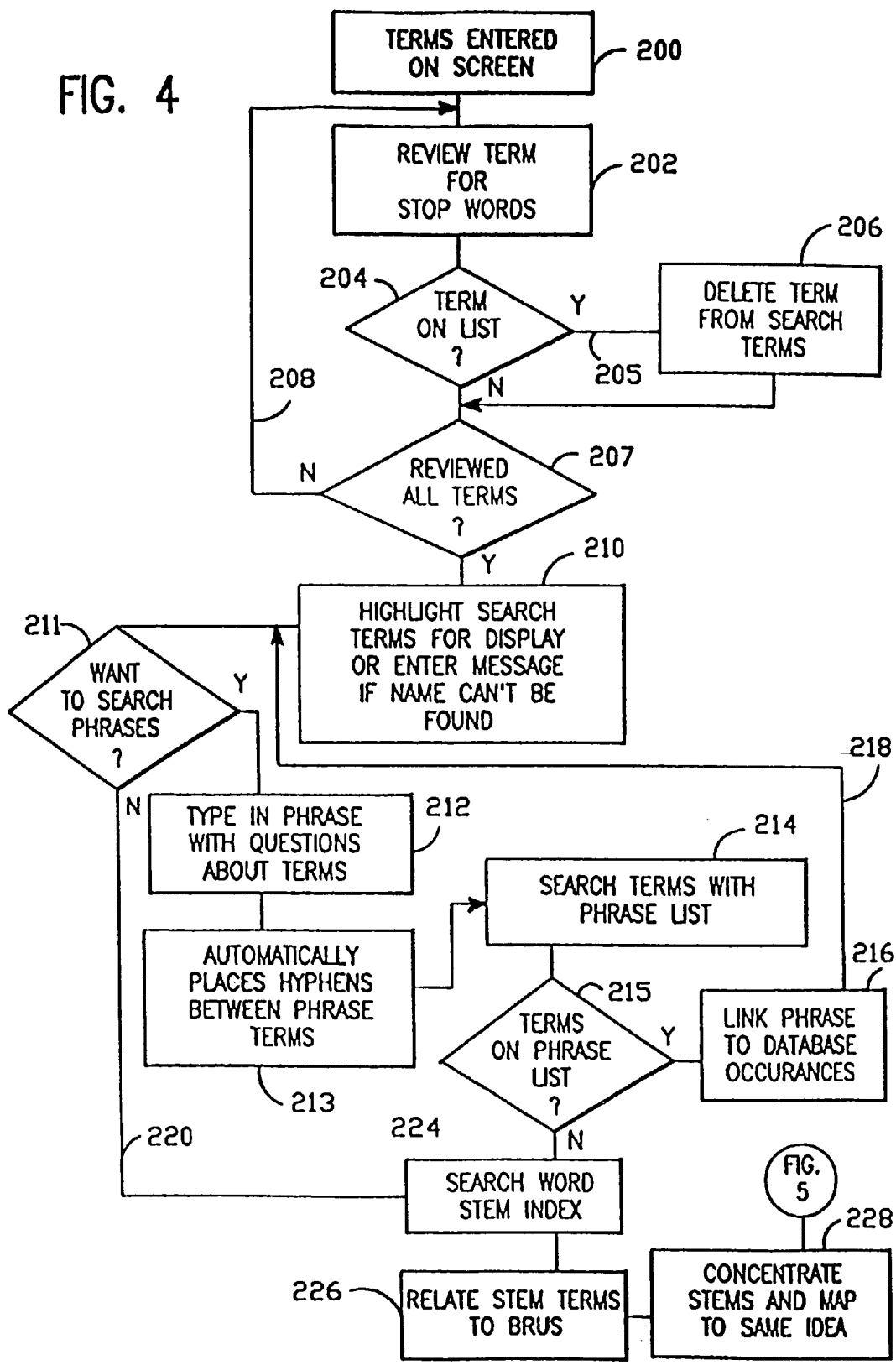
FIG. 4 is a second flow chart of the logic operations of the Idea Search entry path.

FIG. 4 illustrates further details of the Idea Search 30. More particularly, FIG. 4 is an expanded logical flow chart of the Execute Search step 134 shown in FIG. 2. When the terms are entered onto the screen, as described previously, at step 200, the Idea Search program then reviews those terms against a list of stop words 202. As previously described, stop words consist of terms such as "the", "a", punctuation and other terms normally deemed non-essential. The existence of the stop list allows the user to type in entire sentences or paragraphs of search information which will then be reviewed and edited so as to avoid inefficient searches.

If a term appears on the stop list in step 204, then that term is deleted from the legal search terms actually searched by the computer at step 206. The computer then determines if all of the search terms have been reviewed by the stop list at step 207. If not, it loops back for further stop checks at step 208. Once the entire search inquiry is reviewed and all the stop terms removed, then the search terms are appropriately highlighted for subsequent display 210 (see FIG. 2, 136) If a search term is not found in the stop list or in the database, an appropriate message is generated. The non-existent term is also excluded from the search inquiry.

The entered search terms are then compared to a phrase list 211. The purpose of the phrase list is to avoid inefficient search strategies for terms that have a unique meaning when combined in a phrase. For example, if the user wishes to search the phrase "German Shepherd" a database search of the individual terms would bring up information on the country Germany, or men who watch flocks of sheep. Articles involving dogs would likely be ranked towards the bottom of the list. However, if the phrase itself were searched, the search may be more efficiently accomplished and more accurate results provided.

The phrase search is entered only when the software finds a phrase that matches phrases stored in an internal phrase list. The phrase search program then inquires; do you want this (display phrase terms) phrase searched? If the user answers yes, then the system internally links the terms together by placing hyphens between adjacent phrase terms 213. Step 214 involves comparing the linked terms to a phrase list. If the entered phrase is matched to the phrase list 215, then the occurrences of that phrase are linked to the articles in the database 216. A discussion of how articles are linked and listed is provided with reference to FIG. 5. Once the phrase search is complete, the program loops back 218 to step 211 to see if the user wishes to search additional phrases; if the user does not 220, then the program skips down to step 224.

Although not illustrated, two other search modes are available. The expert mode allows users to search literals without having those literals subjected to the stop list or stemming (discussed below). The expert mode is actuated when the user surrounds literals by quotation marks.

Furthermore, the user also can designate priority search terms by typing at least one "+" symbol next to a term. The computer will then rank the terms by priority so that those terms will be weighed in advance of the structured query. The user can also order multiple priorities by placing more than one "+" sign.

Step 224 involves the step of building the search inquiry structure through stem indexing. The purpose of stem indexing is to provide a search of not only the entered terms, but all related terms. Accordingly, if the user types in the word "leaf" in the search window at step 112 (FIG. 2), stem indexing will link all other stems to the root "leaf" that exist in that index, i.e., "leaves", "leafing". Following stem indexing, the stems are linked to a Basic Receiving Unit ("BRU") 226 in order to map the stem to the idea.

A BRU represents the lowest common denominator for the database. BRU's are discrete data elements defined by subject matter. Thus, the size of BRU's may vary depending upon the amount of information for a distinct subject. In the encyclopaedia embodiment, BRU's represent each of the subjects listed in the table of contents for an article. Accordingly, when stems are concatenated at step 228 to the BRU, those stems are thus linked to a subject matter-based data entity. The linked stems for the root are then concatenated at step 228.

Figure 5:
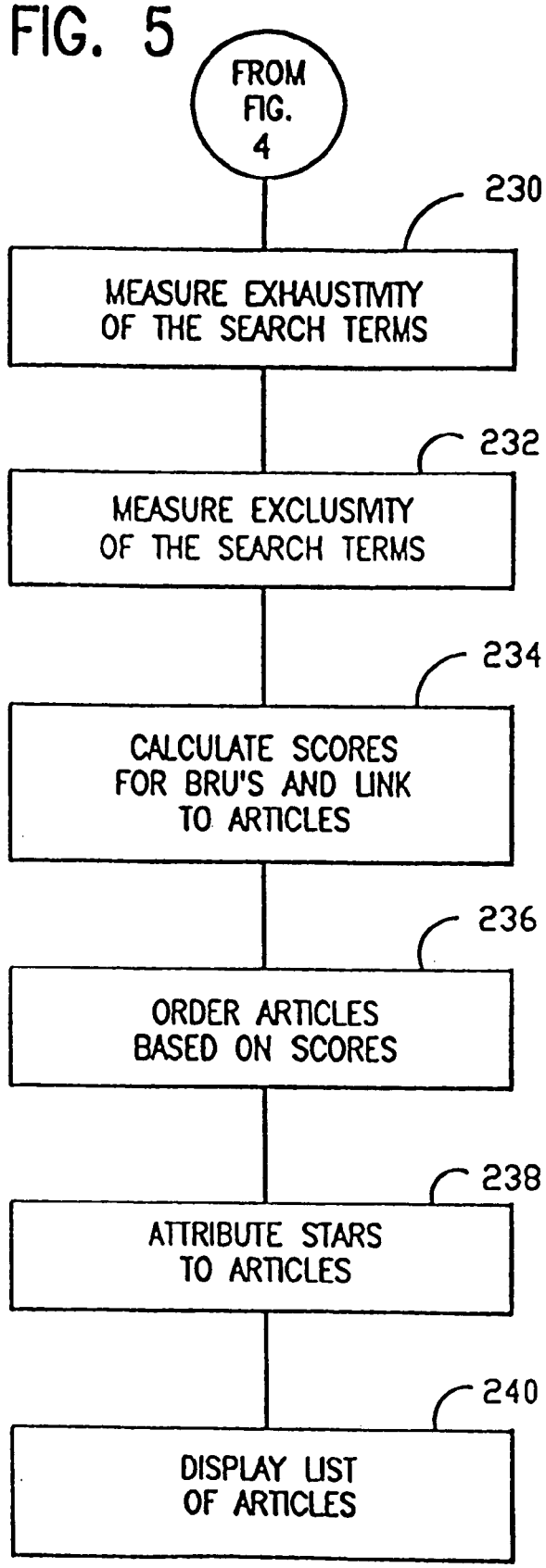
FIG. 5 is a third flow chart of the logic operations of the Idea Search entry path.

Referring now to FIG. 5, the remaining steps of the Idea Search algorithm are described. At steps 230 and 232 the concatenated stems are measured using two coefficients. The first coefficient 230 involves the measure of exhaustivity of the search term. Exhaustivity represents a mathematical measure of the number of occurrences of the stem in the BRU's. The exclusivity coefficient 232 involves the relatedness of the search term to the idea being searched.

An example of the difference between exhaustivity and exclusivity can be seen when comparing the term "small" to the term "German". It is highly likely that "small" would have a high exhaustivity coefficient but low exclusivity coefficient. "German" would have the opposite result.

Once the coefficients are calculated they are then combined to provide a score for each BRU at step 234. The BRU's scores are then combined to provide article scores 235. The article titles are then ranked by relevance in step 236. As previously noted, one or more asterisks may be appended to article titles in the lists. Asterisks denote articles whose combined coefficients scores exceed a pre-set threshold 238. The list of article titles is then displayed at step 240 (same as step 136, FIG. 2).

Figure 6:
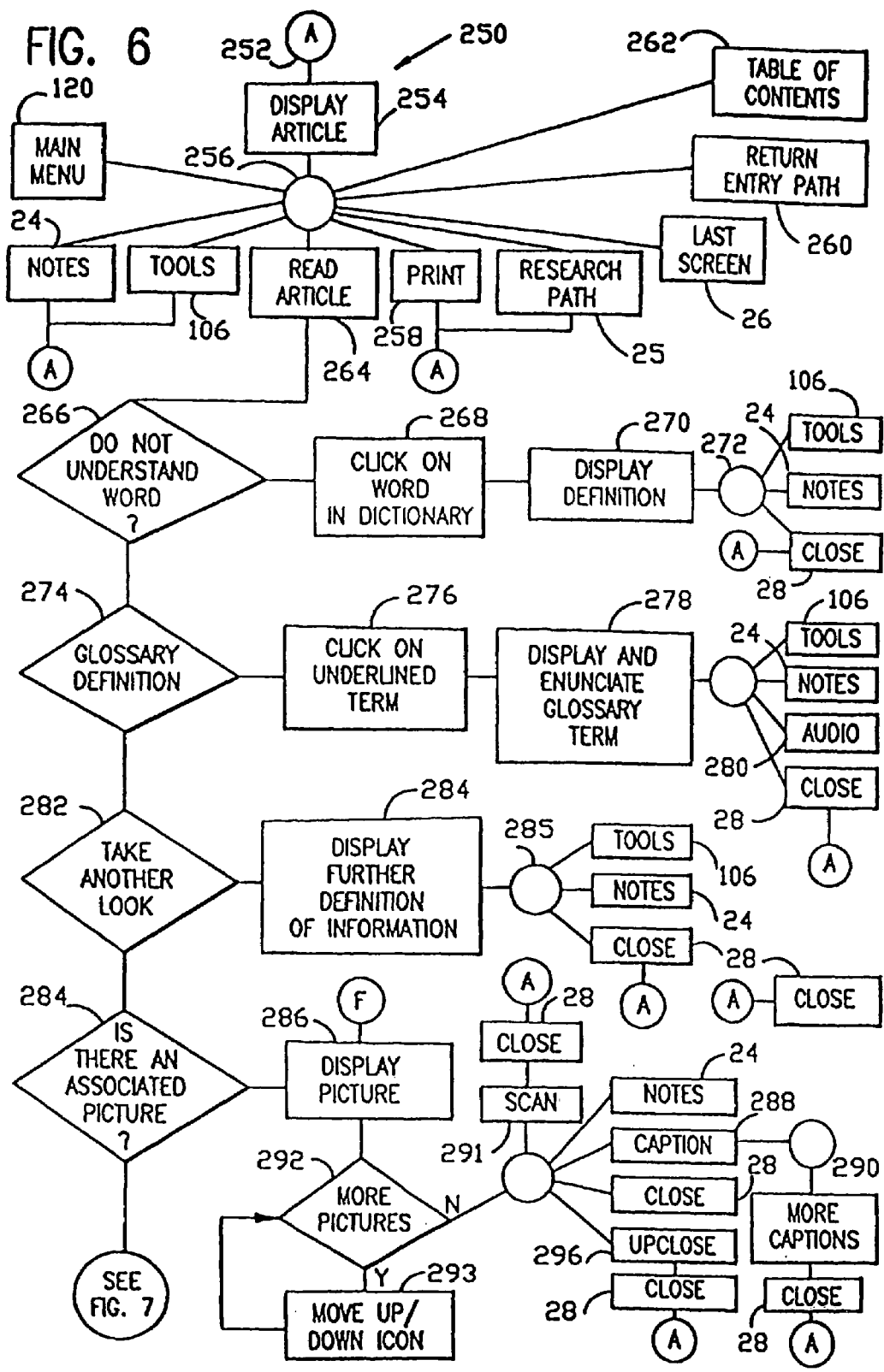
FIG. 6 is a first flow chart of the logic operations of the Article Display program.

Referring now to FIG. 6 the program for displaying the article is shown. The database of the instant invention, as previously mentioned, is particularly applicable for use as multimedia encyclopaedia. A large part of the encyclopaedia database consists of articles which contain text, color photographs, tables, charts and maps as well as audio and animation data. The instant computer program is thereby designed so that the user may easily access the various types of data without losing track of his place in the encyclopaedia. Each screen is also set up to give the name of the article that is being viewed and the page number relative to that article. Side notes are available in the articles to indicate the focus of particular paragraphs of interest.

The text of the article is comprised of underlined and non-underlined words. If the user places the mouse and clicks on any of the non-underlined words an automatic dictionary definition for that word is displayed. Upon clicking it closed, the dictionary window will then disappear and the user returns to the article. The underlined text designates glossary terms. By clicking an underlined word with the mouse, a window appears showing the definition of that word. An audio pronunciation of that word also occurs. An audio sound icon is also displayed in the glossary window prompt line. The icon leaves the user with the option of hearing that word pronounced again.

Accompanying the text are numerous functions represented by icons. The functions include a Picture display function, a More About function, a Take Another Look function, a Moving Picture display function, and an Audio function. Each of the functions will be described in more detail below.

The article display program 250 is entered at 252 where the text of the article is immediately displayed 254. In addition to the previously mentioned text and functions represented by the article display program 250, a plurality of functions are represented on prompt line 252. Those functions include the Main Menu function 120, Notes 24, Tools 106, Print 258, Research Path 25, Last Screen 26, Return to Entry Path 260 and the Table of Contents 262. The user may select any of those functions at select step 256. Details regarding the operation of the various functions are discussed further in connection with FIGS. 8–12.

Should the user wish to read the article in step 264 he moves the mouse and/or cursor to the Up/Down icons or keys. If in reading the article, the user does not understand a word 266 or wishes to receive a further definition of that word, he may then click the mouse on the word in question in step 268. The definition for that word is then automatically displayed at step 270.

The user may then choose a number of dictionary-related functions in step 272, including Tools 106 and Notes 24. However, should the user desire to return to the article, he activates the Close command 28.

If the user wishes to obtain a glossary definition for an underlined word at 274, he clicks the mouse on the underlined term in step 276. The underlined term, as previously described, is then displayed and the pronunciation of that term enunciated at step 278. The glossary window also provides the user with a variety of functions including Tools 106, Notes 24, and Audio 280. By actuating the Audio function 280, the user can replay the enunciation of the glossary term. Activating the close command 28 returns to the article display 252.

Articles are organized so that by activating an icon showing "a pair of eyes", the user calls the Take Another Look function 282. This function is used to explain a difficult concept through pictures or language that is simpler than that used in the article text. The prompt line in the Take Another Look function 282 includes the Tools function 106, Notes function 24 or the Close command 28.

If a Picture icon (represented by a camera) is shown adjacent to text 284, the user may activate an associated picture by clicking the icon on step 284. The picture is then displayed. Multiple pictures 292 can be reviewed by clicking the mouse on up and down arrow icons 293.

The picture display mode 284 also includes a number of functions to facilitate a review of the picture. The caption function 288, for example, provides a window over the picture describing the contents of that picture. The user is then presented with several functions for manipulating, the caption. The move caption function 290 moves the caption to the top of the screen so that the user can see the portion of the photograph or picture under the caption. By clicking the move caption icon again at step 290, the caption is returned to the bottom of the window. Activating the Close command 28, closes the window, and the user can then return by clicking close 28 again 254.

The scan function 291 enables the user to scan up, down, left or right.

Finally, pictures can also be viewed using an up-close function 296. When activated, the system enlarges the picture one or more levels. Activation of the close command 28 will return the user to the article display.

Figure 7:
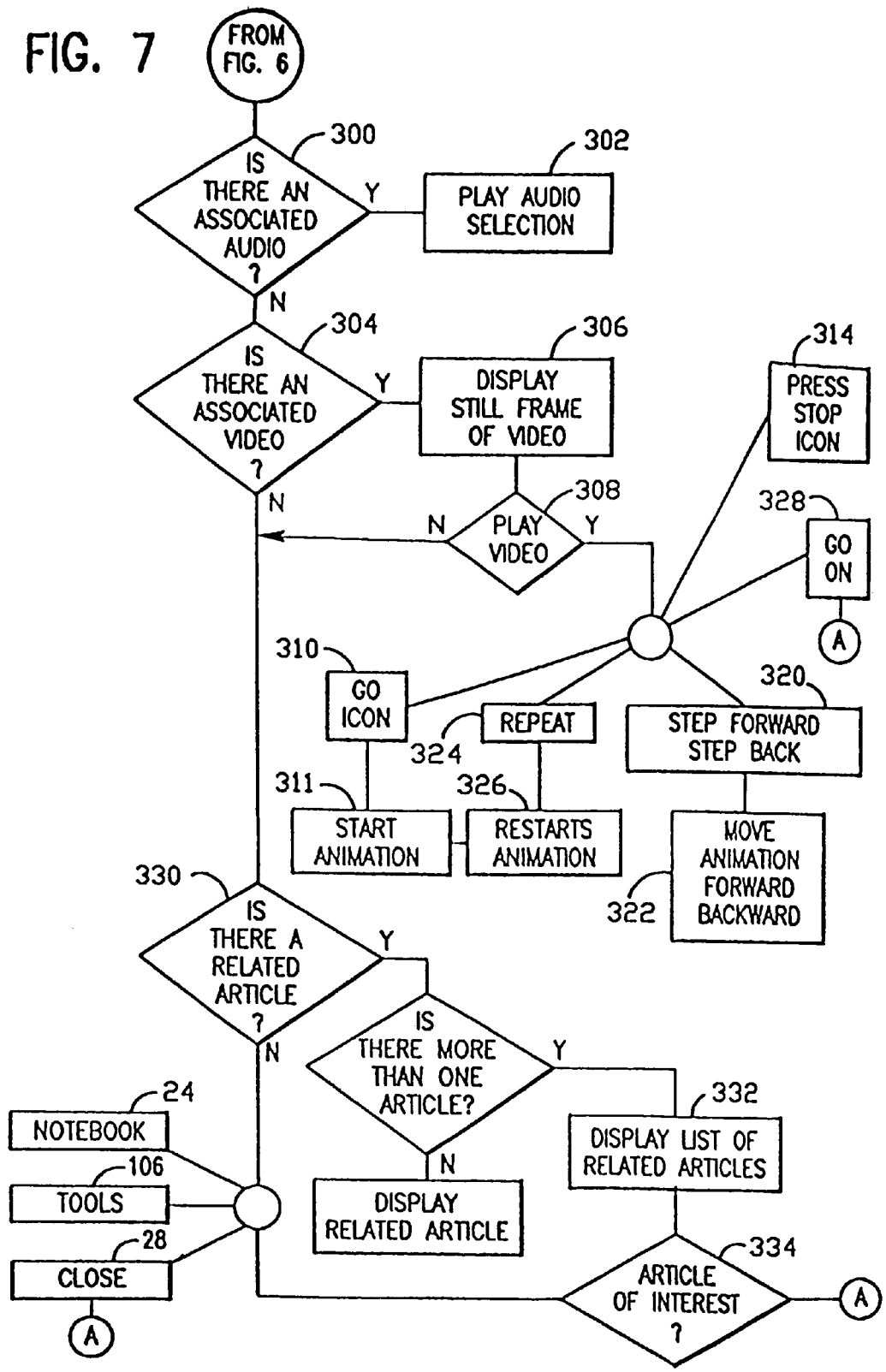
FIG. 7 is a second flow chart of the logic operations of the Article Display program.

FIG. 7 illustrates additional logical operations of the article display program. In particular, if an associated audio icon exists adjacent to text at step 300, then the user can click the icon, on causing a digitized audio selection to be played at step 302. The user can select the audio function 300 as many times as desired.

If the text has an associated video icon 304, then the user can activate a display of a still frame of that video at step 306 by clicking the video icon with the mouse. The animation sequence commences by activation of the Go icon command 310, 311. The Go command can be re-activated again to review the same video. Any time the user wants to stop the animation, he can click the mouse on an associated Stop icon 314. Once the animation has been stopped, clicking the Go icon 310 causes the animation to start again 311. Moreover, to see the animation in a step by step sequence, the user can employ step options 320 which allow the animation to move one frame at a time backwards or forwards 322. Additionally, the user has the option of repeating the entire animation. This occurs by clicking the Repeat icon 324. To exit the video animation function 324 the user must activate the Go On command 328 which returns him to the article display program entry point 252 (FIG. 6).

The final function available in the article display program is the See Also or Cross Word function 330. This function is displayed when there is material related to the article being displayed. If the user activates an appropriate icon for this function, a list of related articles is displayed only if more than one related article exists. Otherwise the function takes the user directly to the related article 332. If the user then finds an article of interest 334, he then calls that article 335.

Figure 8:
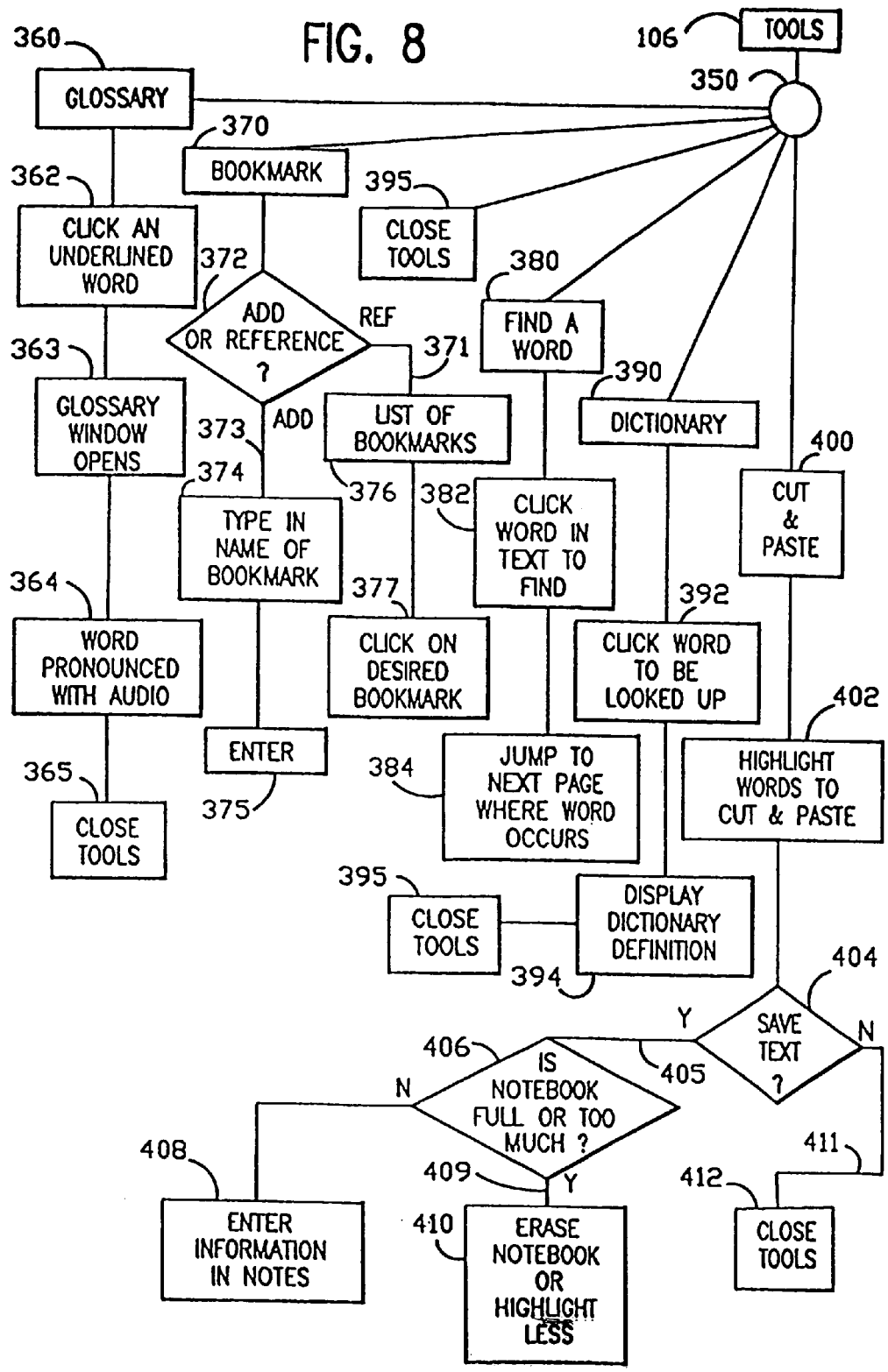
FIG. 8 is a flow chart of the logic operations of the Tools function.

Referring now to FIG. 8, a functional flow diagram of the logical elements of the Tools function 350 is illustrated. The Tools function includes five functions: Glossary 360, Bookmark 370, Find-a-Word 380, Dictionary 390 and Cut and Paste 400. In addition, a Close-Tools command 395 is available to close the Tool function 350. Brief descriptions of the Tools functions are set forth below.

The Glossary function 360 operates in the same manner as described in FIG. 6. The Glossary function 360 operates by first prompting the user at step 362 to click on an underlined word. Once the word has been clicked, a window then opens at 363 and the word is spoken 364. By activating the Close Tools command 395, the window is removed.

The bookmark function 370 marks a specific place in the database so that a user can return to that place at a later point in his research. When the bookmark function 370 is clicked on, if there are no bookmarks, the user is allowed to type in a bookmark in the database. Otherwise the user is presented with a menu having two choices 372: (a) add a bookmark to the section 373 or (2) select a previously-stored bookmark 377. The first option opens a window 364 which requests the user to type in the name of the bookmark. Once that has been done, the user then must press the enter key 375 to save the bookmark. Selecting the second option causes the bookmark to display a list containing the names of all the bookmarks that have been saved 376. Selection of a desired bookmark 377 will cause associated articles to be displayed.

The Find-a-Word function 380 enables the user to look up the next occurrence of a word found in the text of an article. The Find-a-Word function 380 operates as follows: the user activates the Find-a-Word function through an appropriate icon. A window 382 is then opened which instructs the user to click a word in the text. The computer display then jumps to the next page that the user is currently viewing and displays that page 384. Each time the subject word appears on that page, it is highlighted.

For example, suppose a user is on page 1 of the ASTRONOMY article and wants to find the next occurrence of the word "sky". Clicking Find-a-Word 380 and then clicking the word "sky" will take the user to page 3 of the article where he can see the word "sky" highlighted several times.

The Dictionary function 390 allows the user to look up the meaning of any word he does not know or recognize. In operation, when the Dictionary function icon 390 is clicked, a window 392 first opens. The window prompts the user to click the word that he wants to look up in the dictionary. After selecting a word, a dictionary display 394 is opened up. The display provides the actual dictionary entries for that word as it would appear in a published dictionary. An example of a dictionary that could be used in such a database is the Merriam Webster Intermediate Dictionary. To return to the text without using the dictionary again, the Close Tools command 395 is activated.

The Dictionary may be scrolled up or down by clicking a mouse over up arrows on the display (not shown). By clicking the up arrow, the definition of the word that precedes the one just viewed can be seen while the down arrow takes the user to the next word in the dictionary. If the word definition covers more area than available on the screen, clicking the down arrow then displays the rest of the definition.

The Dictionary function 390 is available any time a mouse or cursor is placed on a word 392 that does not activate a separate function. The purpose of the Dictionary function 390 is, therefore, to remind users that this feature is available.

Figure 9:
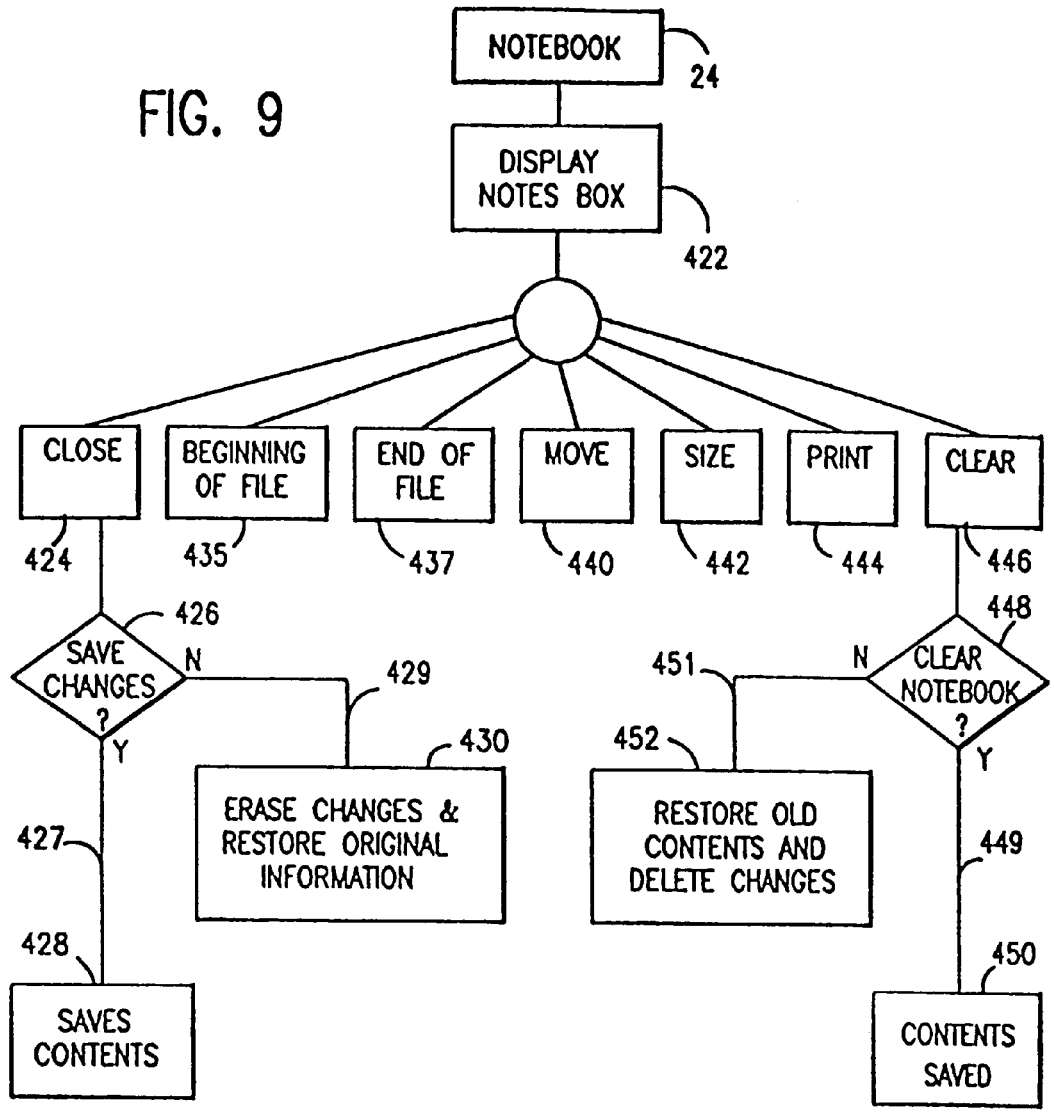
FIG. 9 is a flow chart of the logic operations of the Notebook function.

The Cut and Paste function 400 lets the user copy part of an article that he is viewing and place that information directly into his Notes (see FIG. 9). When the Cut and Paste function 400 is activated, the computer will ask the user to highlight words to cut and paste 402. Highlighting the text involves moving a mouse and/or cursor to the beginning of the place in the text that the user wishes to underline. He then depresses one of the mouse buttons and holds the button down while dragging the cursor to the end of the text that he wants to cut-out. Words will be highlighted as the mouse moves across that area. When the mouse button is released, the computer will then ask whether the user wishes to save that text 404. If the user clicks "yes" 405, then the computer will transfer information into the Notebook 408.

If the Notebook is full, or if the user tries to cut and paste too much text 406, then a message will appear on the display 410 instructing the user to either erase the Notebook or highlight less information. If the user chooses not to save text 411, then by activating the Close Tool command 412, the user returns to the appropriate screen.

Referring now to FIG. 9, the Notes or Notebook function 24 is activated when the user wishes to take notes on information appearing anywhere in the database. When the icon representing the Notebook function 24 is activated, a window opens 422 which provides an available space for the user to enter his notes. As the user enters information in this window, letters will be added in the box where a flashing line on the cursor appears. Text is inserted by moving the cursor to where the user wants new text to appear. The notes window 422 also includes up and down arrows for scrolling the text up and down, one line at a time. The Notebook window 422 is adapted to hold approximately 108 lines of text. If the window 422 becomes full, some information will need to be erased before any new text is added. Text is erased by depressing the BACKSPACE key.

The Notebook window 422 is accompanied by a variety of functions and commands. The Close function 424 queries the user whether he wishes to save his changes that were made in the Notebook window 426. If the user enters "yes" 427, then the contents of the Notebook, along with any changes made in those contents, will be saved. The user is then returned to the screen from which he opened the Notebook. Clicking "yes" 427 also provides a safety function. If the user accidentally clears information in the Notebook, then by clicking "yes" 427 that information will be restored. If the user does not want to save any changes, he enters "no" 429 causing all of the changes made in the Notebook to be erased. As a result, the original information that had been in the Notebook before the changes were made will be available 430.

The Beginning of File function 435 lets the user move up to the first line of the Notebook. The End of File function 437 takes the cursor to the last line of text appearing in the Notebook window.

The Move function 440 moves the Notebook window to the top of the screen. Activating the function a second time, puts the Notebook window back at the bottom of the screen. The purpose of the Move function 440, therefore, is to place the window in an appropriate area so that the user can still see information on the screen.

The Size function 442 changes the size of the Notebook window display. When activated, the size of the Notebook window 422 is doubled. By clicking the size function 442 again, the Notebook window 422 is reduced to its original size so that more of the underlying text is visible.

The Print function 444 activates printing of the contents of the Notebook window 422.

The Clear function 446 removes all text from the Notebook. When the Clear function 446 is clicked on, the computer will ask the user at 448 whether he wishes to save his changes. If he answers "yes" 449, then the contents of the Notebook, along with any changes, are saved at step 450. If the user enters "no" 451, whatever was originally in the Notebook is restored and the changes are deleted at step 452.

Figure 10:
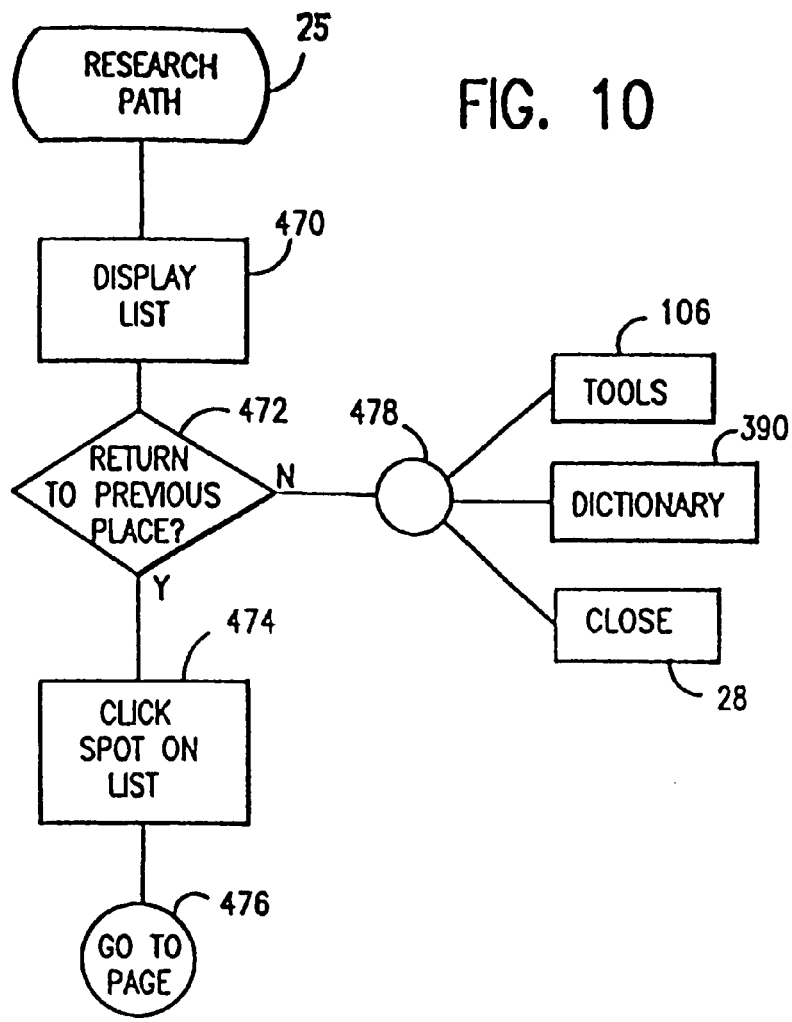
FIG. 10 is a flow chart of the logic operations of the Research Path function.

FIG. 10 illustrates a flow chart of the logical operations of the Research Path function 25. When entering Research Path 25, the user clicks on the research path icon whereupon a display list showing the major steps that the user has previously taken, is displayed at step 470. The major steps listed on the display include the entry paths previously taken, the title of the articles that the user has previously reviewed and any headings or subheadings of those articles that the user has seen.

For example, the following list represents a typical research path for an encyclopaedia search:

Science Feature Articles
    ASTRONOMY
        Eclipses
    ANIMALS, DOMESTICATED
Title Finder
    Aardvark The entry at the top of this list, "Science Features Articles", represents the first entry path while the article "Aardvark" is the last place the user was before his present location. From this list, it also is clear what research has already been done. The two entry paths, "Science Feature Articles" and "Title Finder", were accessed and the articles on "Astronomy", and "Domesticated Animals" were uncovered. The "Aardvark" and "Eclipses" subjects within the articles were then specifically accessed.

Should the user desire to return to a previous spot 472 listed on the Research Path display 470, the user employs his mouse to click that item on the list 474 which will then return him to the first page for that item 476. If, however, the user does not wish to call any of the items on the Research Path, then he may select at step 428 the Tools function 106, the Dictionary function 390, or exit by turning on the close command 28.

Figure 11:
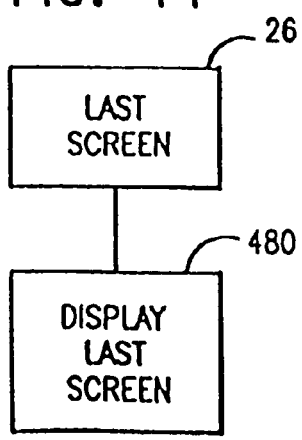
FIG. 11 is a flow chart of the logic operations of the Last Screen function.

FIG. 11 illustrates the Last Screen function 26. This function enables the user to take one step back, returning to the last screen. The Last Screen 20 can, for example, be used to retrace steps through a series of screens. Thus, if the user is looking at page 3 of an article and wishes to click back to page 1, the last screen can be clicked twice, retracing his steps back to page 2 and then to page 1. The user can, therefore, activate the last screen function 26 as many times as needed to retrieve an earlier screen. However, those windows that have appeared on a previous screen cannot be opened by using the Last Screen function 26. To operate this function, the user presses the Last Screen icon whereupon a display of the last screen will occur at step 480.

Figure 12:
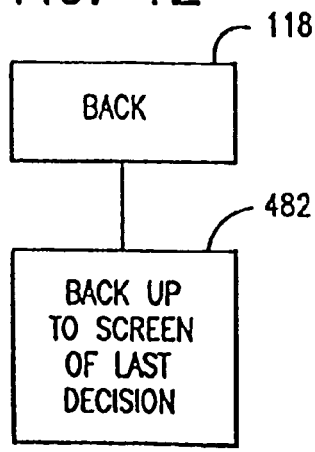
FIG. 12 is a flow chart of the logic operations of the Back function.

Referring now to FIG. 12, a flow chart of the logical operation for the Back function 118 is shown. When the user selects this function, the system automatically backs up to the screen where a change in the decision had previously been made at step 482.

Figure 13:
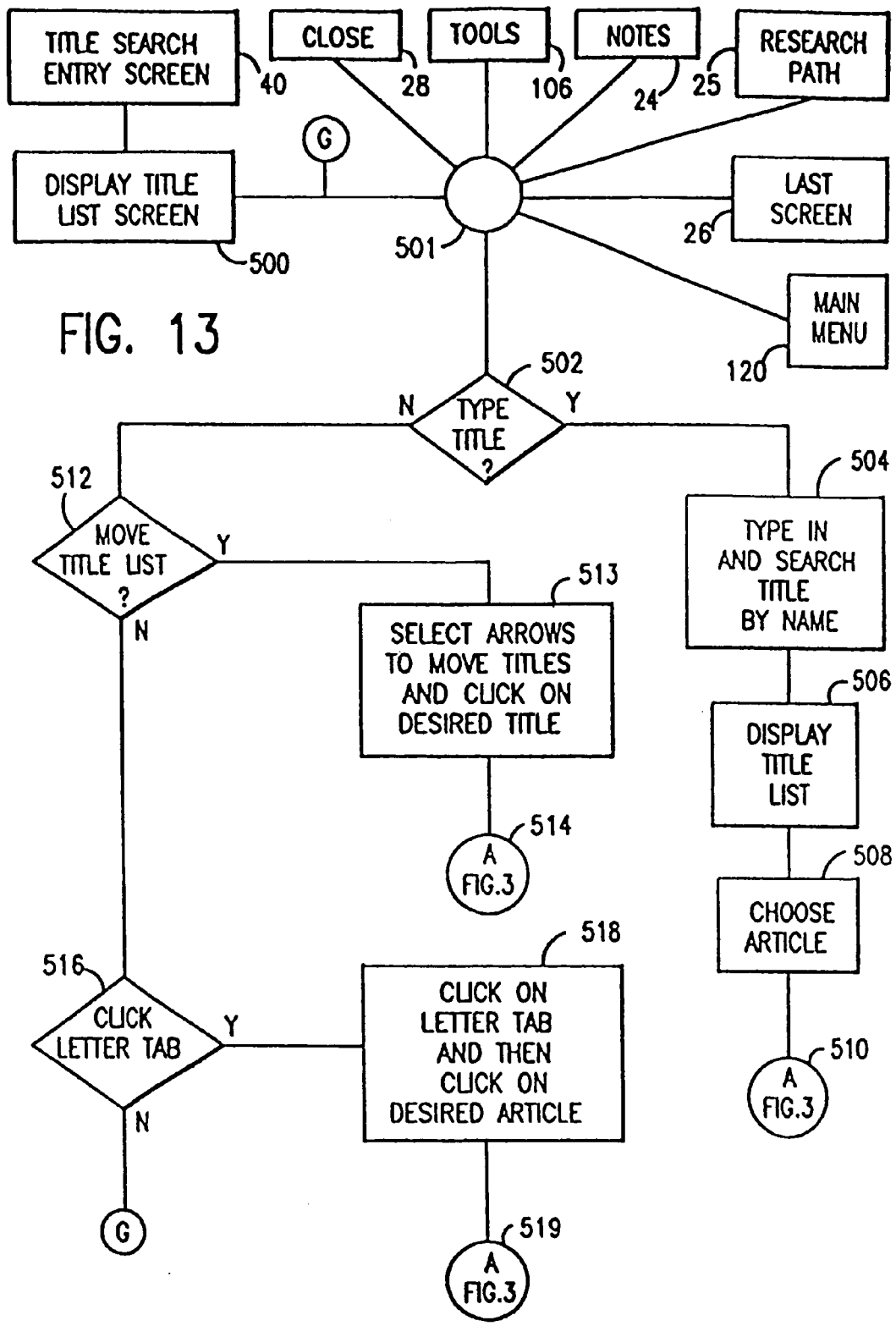
FIG. 13 is a flow chart of the logic operations of the Title Search entry path.

FIG. 13 illustrates the Title Finder entry path 40. The Title Finder 40 is activated from the Main Menu (FIG. 1) by clicking the Title Finder icon located on the Main Menu display. A title list screen is immediately displayed at step 500. At this point, the user has a number of options for searching titles as well as a number of functions he can activate 501 to assist his search. Those functions include Tools 106, Notes 24, Research Path 25, Last Screen 26 and Main Menu 120. The search for titles can be done in three modes. In the first mode, the user enters the title in a box on the display whereupon the Title Finder searches the title list. The decision to enter the title occurs at step 502 and the user then types in the title at step 504. The computer then searches the title list. Whether or not the title is found, the computer will go to that part of the title list that is the nearest match to the typed title 506. The user may then go to the article by clicking his mouse on the desired title 508, 510. The second method of searching involves scrolling through the title list 512 by activating up/down arrows 513 until the title of an article is found. The user can then go to the article 514.

The third mode of searching occurs when the user has a subject in mind but is not sure of the exact title or spelling. He can then click a letter tab shown in the display representing the first letter of the subject that he wishes to search 516. The computer will then move to the page of the alphabetical title list 518 for the identified letter. The user can then click the up/down arrows until he finds the article he wants, and then retrieves the article at step 519.

Figure 14:
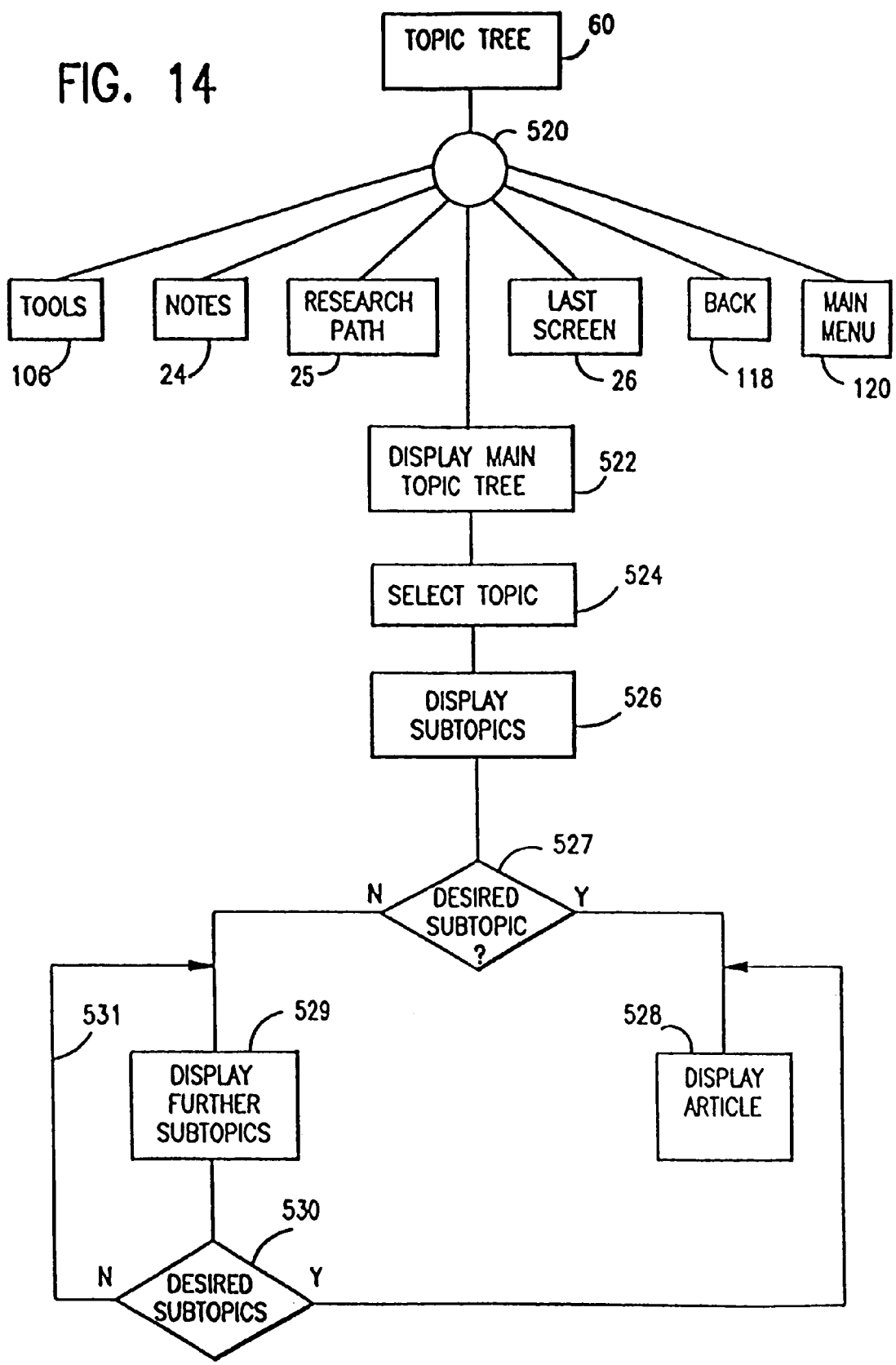
FIG. 14 is a flow chart of the logic operations of the Topic Tree entry path.

FIG. 14 illustrates the Topic Tree entry path 60. As previously noted (see discussion of FIG. 1), Topic Tree 60 is the entry path that divides all of the articles in the database into topics and sub-topics enabling a user to progressively narrow his/her search through the tree. In operation, upon entering Topic Tree 60, a list of topics 522 is displayed along with a prompt line of functions. The functions include Tools 106, Notes 24, Research Path 25, Last Screen 26, Back 118 and Main Menu 120. Should the user decide to search through the Topic Tree, he moves the cursor over the topic of interest and clicks his mouse on at step 524. A list of sub-topics is then provided at 526.

Sub-topics exist in two forms. If the sub-topics are listed with an initial capital letter, then that sub-topic covers further sub-topics. Those additional sub-topics are shown on later screens. However, if the sub-topic shown on the list is capitalized, then it directly corresponds to an article. By clicking that sub-topic with a mouse 527, an article is displayed at 528. Further sub-topics are displayed at step 529 and the process loops down to further sub-topic levels, at steps 530 and 531, until the desired article is uncovered. If the user then decides to go back a level to return to a previous menu screen, he may do so by clicking the Back function 118. Actuating the Main Menu function 120 will, in turn, return the user to the Main Menu so that he may choose another entry path or exit the multimedia search program altogether.

Figure 15:
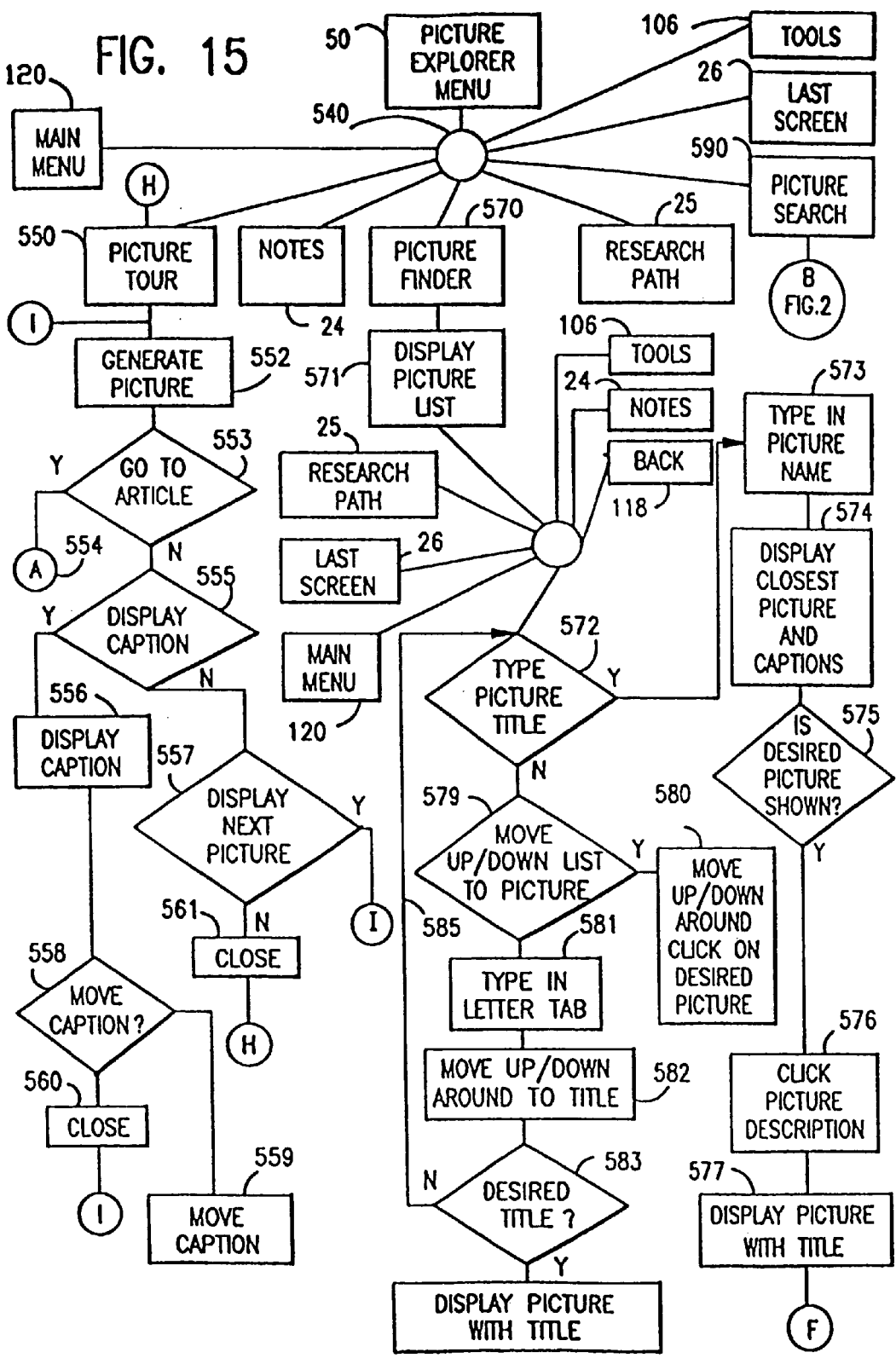
FIG. 15 is a flow chart of the logic operations of the Picture Explorer entry path.

FIG. 15 is a flow chart showing the Picture Explorer entry path 50. The purpose of Picture Explorer is to give the user three ways to find pictures in the database. Once a picture is retrieved that is of interest, the user can go directly to an article to learn more about that picture.

To use, upon entering the Picture Explorer menu 50, the user can select one of several options at step 540. Those options include the three separate search paths: picture tour 550, picture finder 570 and picture search 590. Additionally, a number of functions are available including Tools 106, Notes 24, Research Path 25, Last Screen 26, Tools 106 and Main Menu 120.

The picture tour search path 550 presents a randomly ordered selection of pictures from the database. To move forward through the pictures, the user moves the up/down arrows 552. If the picture appears to be of interest, then the user can retrieve an article at steps 553 and 554, display a caption for each picture at steps 555 and 556 or simply move down to the next picture at step 557. Additionally, the caption can be moved at steps 558, 559 or the user can return to the picture, to an article or to the Main Menu of the Picture Explorer entry path at steps 560 and 561.

The picture finder entry path 570 lets the user read through a list of picture captions which are grouped alphabetically. The organization of the caption list and the method for searching that list, is similar to the Title Finder entry path algorithm 40 (FIG. 13). In operation, upon entering the Picture Finder 570 a number of functions become available for user selection, including Tools 106, Notes 24, Research Path 25, Last Screen 26, Main Menu 120 or Back 118. As in title search, the picture finder provides three ways of searching for picture captions. The first method 572 involves typing in the picture name 573 whereupon picture titles closest to that typed in are then displayed 514. If the user then wishes to learn more about a picture 575, he can activate the caption 576. The second method involves scrolling up or down through the picture list at step 579 to review the desired picture 580. The third method involves clicking a mouse on a letter tab 575 which will then move to the page in which the picture titles, starting with the tab letter, appear. The user may then move up and down that page 582 until he finds the desired picture caption 583. Step 585 loops back to the first decision point for the picture finder search path 570.

Picture search 590 operates in a manner similar to that previously described with regard to the idea search (See FIGS. 2–5). Generally, the picture search program 590 operates when a search term describing the picture caption is entered in the picture search window. For example, should the user want to know how automobile engines work, he types in the picture search window "how do automobile engines work?" The user then activates the Go On command (FIG. 2) to tell the computer to begin the search. When the computer completes its search, search words are re-displayed as highlighted terms. A list of pictures with captions also is presented and the user can see the picture described by a caption in the list by clicking the mouse on that caption. The user then calls the associated article by activating the Go To Article function.

The user also can scroll through the list to see adjacent captions. Captions preceded by at least one asterisk most likely contain information directly relevant to the search request. The New List or New Search functions are also available in this program. These functions operate in the same manner described previously for Idea Search.

Figure 16:
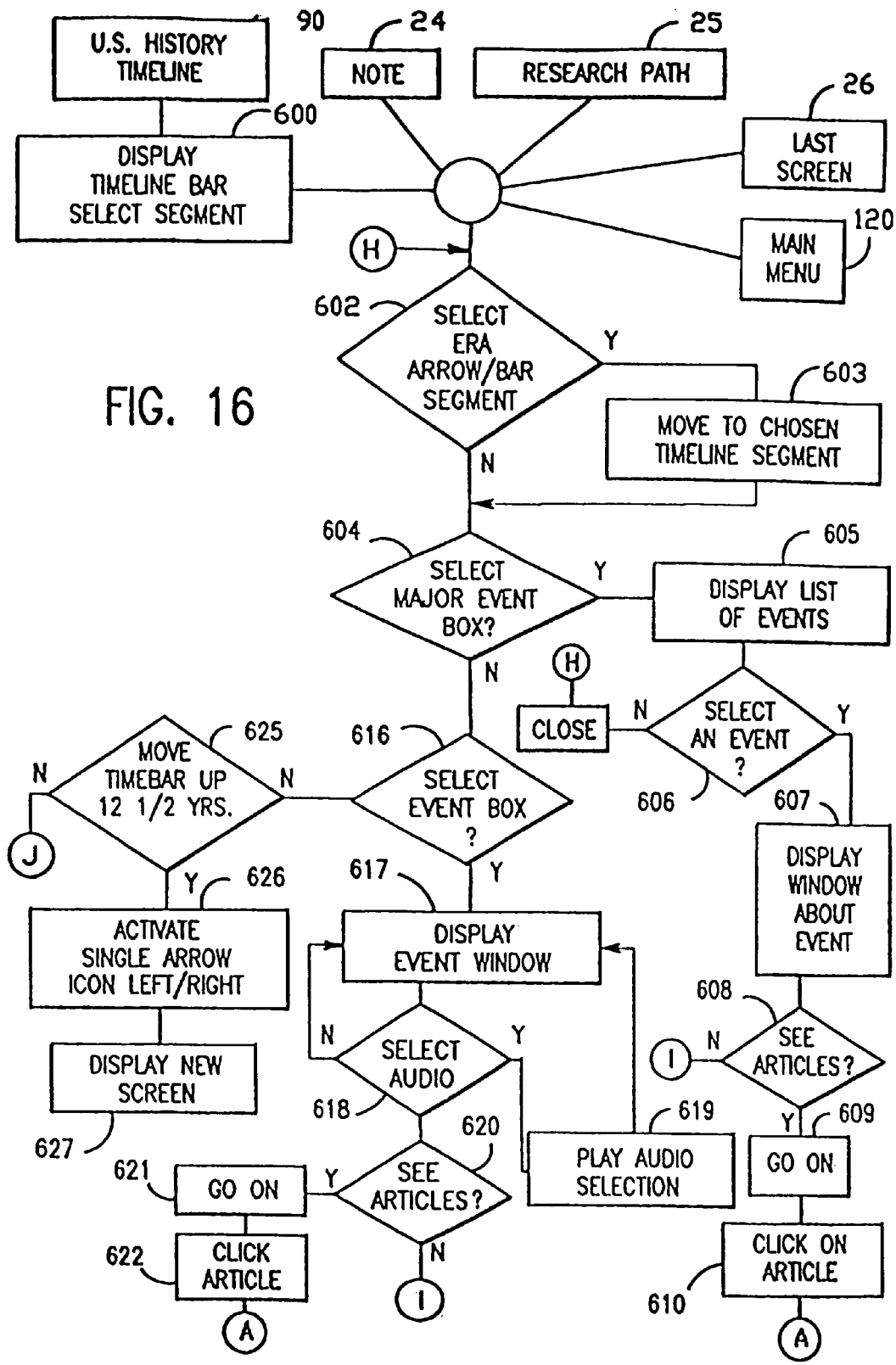
FIG. 16 is a first flow chart of the logic operations of the History Timeline entry path.

FIG. 16 is a flowchart of the logical operations of the History Timeline entry path 90. This entry path contains numerous events of historical significance organized along various timelines. When a user clicks a mouse on the name of an event appearing on a timeline, a window opens and summarizes that event. Each window includes a list of articles that relate to the event. Clicking a mouse on a listed article will take the user directly to the portion of that article involving that event. The History Timeline is entered by activating an identifying icon in the Main Menu (FIG. 1). As a result, a timeline display 600 is provided.

The timeline display 600 consists of a year bar marked in 5 year intervals. Each interval is expanded into a separate display. Each display includes a plurality of major event boxes, event boxes and a president bar. An era banner is also provided in the display which groups dates and historical events into major periods. The president bar operates to open a window that gives the full name and dates the president was in office and a list of the major legislation or other significant events of that president's administration. Information is ordered by the years in which those events occurred. By clicking the Go To Article function the user can then view a particular article relating to that event.

When the History Timeline is entered through display 600. That display will introduce the entry path and also display the beginning period for the timeline. The user may then either click the 5 year segment of the year bar, or click the mouse on an arrow to move the timeline display ahead 12½ years 602, 603. Once the user has reached the desired timeline segment, he may then choose among several ways to retrieve information. A number of functions including Notes 24, Research Path 25, Last Screen 26 and Main Menu 120 are available on all timebar screens The first way to retrieve information is by activating a major event box 604. Major Events represent historical occurrences consisting of at least two events. For example, if the user chooses the "Discovery and Exploration" major event box, then a window will open 605 listing several events that took place during the time period covered by the major event (between the years 1490–1625). If the user then selects an event appearing on the list at step 606, i.e., "1492—Christopher Columbus discovers the New World", another window opens containing a description of that event at step 607. The user may click the mouse on the up/down arrows to read more about the event.

If the user then wishes to see articles relating to that event 608, he then activates the Go On command 609. A window with a list of article titles is then set forth. The user can then call a related article e.g. "Columbus" by clicking the mouse over the listed title 610 as previously described. When in reviewing the article, the user is ready to return to the History Timeline 90, he activates an icon representing the timeline.

A second search option in History Timeline 90 is the event box 616. The event box operates in a similar manner to the major event box, except that it only represents one event. Accordingly, when clicking a mouse on the event box, a window opens 617 displaying information about the event. Often included in the event window 617 is an audio feature 618 which is played by clicking an audio icon 619. Articles can then be selected in steps 620–622 in the same manner as for major events. The option for moving the next display screen by the arrow icons is shown in steps 625–627.

Figure 17:
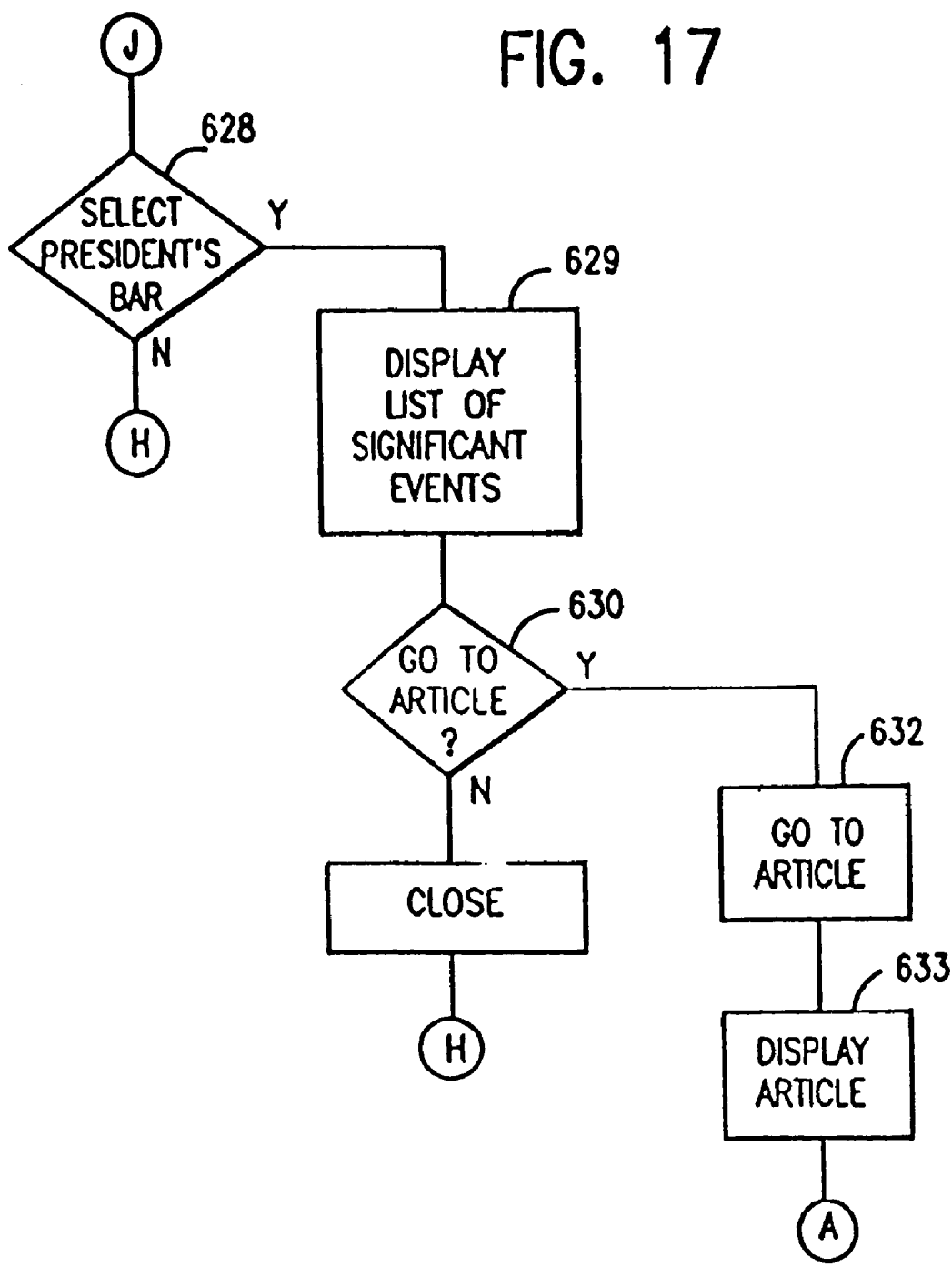
FIG. 17 is a second flow chart of the logic operations of the History Timeline entry path.

Turning now to FIG. 17, the third method of searching the History Timeline 90 is shown. This third method involves activating the president's bar 628. To use, a user clicks on a display box containing a president's name. A display listing significant events during that president's administration 629 is then shown. If the user wishes to see a related article 630, he clicks the Go To Article command 632 which causes a display of the article at step 633. To exit from the article and return to the History Timeline icon, the user must then activate an appropriate icon appearing in the prompt line.

Figure 18:
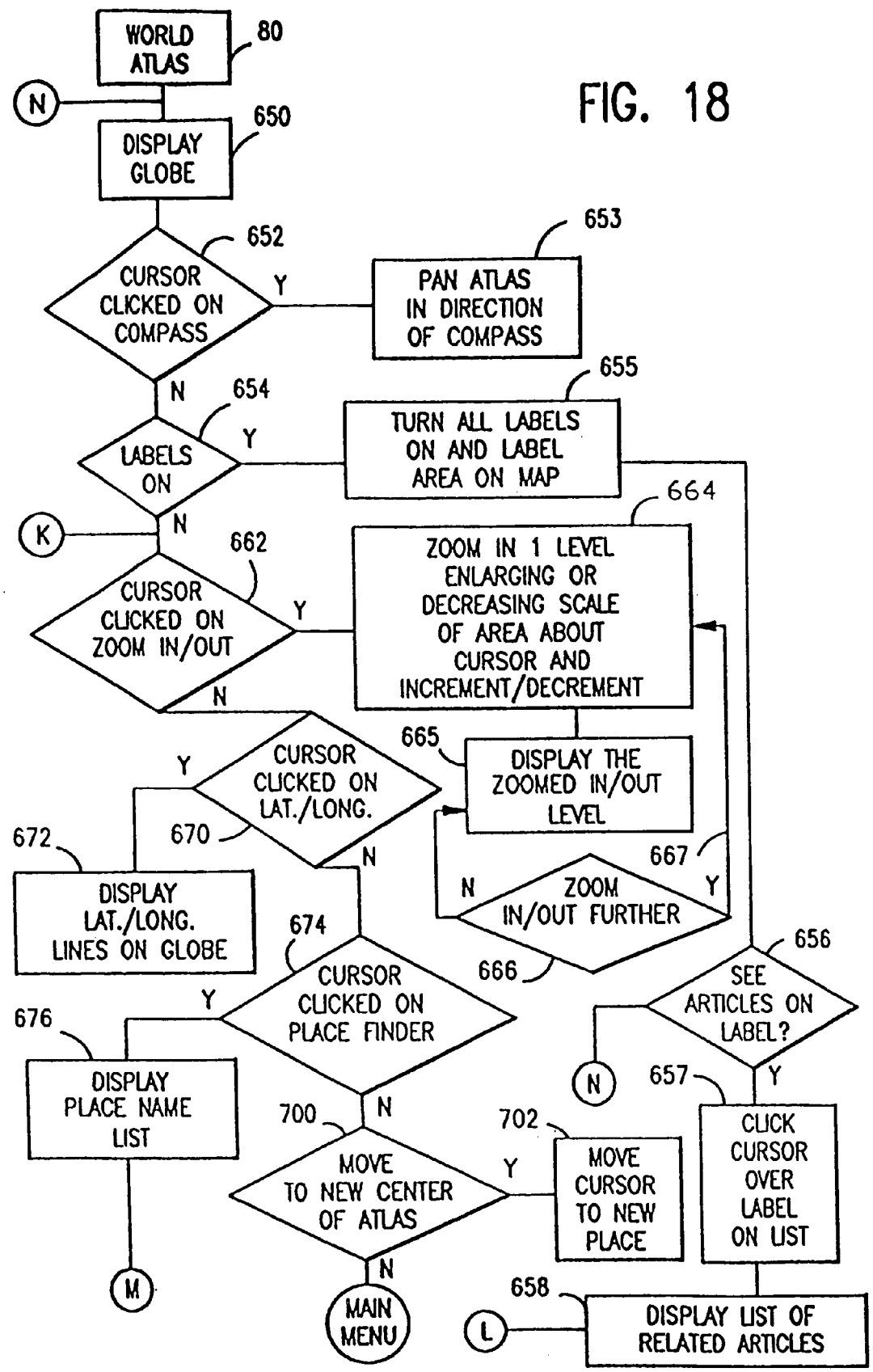
FIG. 18 is a first flow chart of the logical functions of the World Atlas entry path.

FIG. 18 is a flow chart showing the logical operations of the World Atlas entry path 80. The purpose of this entry path is to allow a user to see and use maps of the earth. The user can specify a place he wants to see, then the computer can draw a corresponding map. To find out more about places shown on the map, the user can then retrieve articles relating to a desired part of the map.

The World Atlas program is entered by clicking the World Atlas icon in the Main Menu (FIG. 1). Immediately upon entering World Atlas, an atlas is displayed at step 650. There are seven levels from which the user can display a map from the atlas. Each level corresponds to the scale of the atlas. When the user first enters World Atlas, he will see a map of the Western Hemisphere drawn at level 1. The user may then choose to rotate, zoom-in, or zoom-out of each level. By moving a cursor on the Atlas, the center of the Atlas may be moved to correspond to the cursor's position. The user also rotates the globe by clicking the mouse on a compass direction icon at step 652 which will cause the atlas to pan in the direction of the compass 653.

Figure 19:
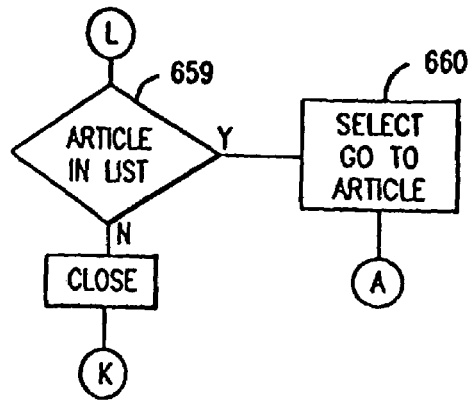
FIG. 19 is a second flow chart of the World Atlas entry path.

A further feature of the World Atlas entry path is the labels function 654. Labels operates as follows: when the user turns Labels on 655, place name labels are written onto the atlas. If the user is interested in seeing an article that is related to a place name label 656, he can click the cursor over the label 657 which will then display a list of articles related to the place name 658. If an article of interest appears in the list 659 (FIG. 19), the user can then select that article 660. The user returns from the article to the timeline by pressing a timeline icon, as previously described.

Another viewing function for the World Atlas entry path is the zoom-in and zoom-out feature. As previously mentioned, there are seven levels from which the earth can be viewed. If the zoom-in is initiated 662, the user can focus on one or more levels to see a closer view of that area of the map 665. The map can be zoomed-in all the way at steps 666 and 667 to level 7. When the lowest level is reached, the zoom-in clickspot disappears and the user can only zoom-out.

When the maps are displayed at levels 3 and 7, a mileage scale appears on the lower right corner of the screen. Mileage scales are not given for levels 1 and 2 because these levels give two global views of the earth. In other words, measuring distances between two points on the globe must take into account the curvature of the earth. Mileage scales are most useful when distances can thus be represented as straight lines. At levels 3 through 7, therefore, distances between two points can be measured by a straight line. A further viewing function for the Atlas is the latitude-longitude option 670. By clicking on the latitude-longitude function, the computer adds lines 672 to the Atlas indicating latitude and longitude markings. This will thus give the user a better idea of the location of various places on the map.

Figure 20:
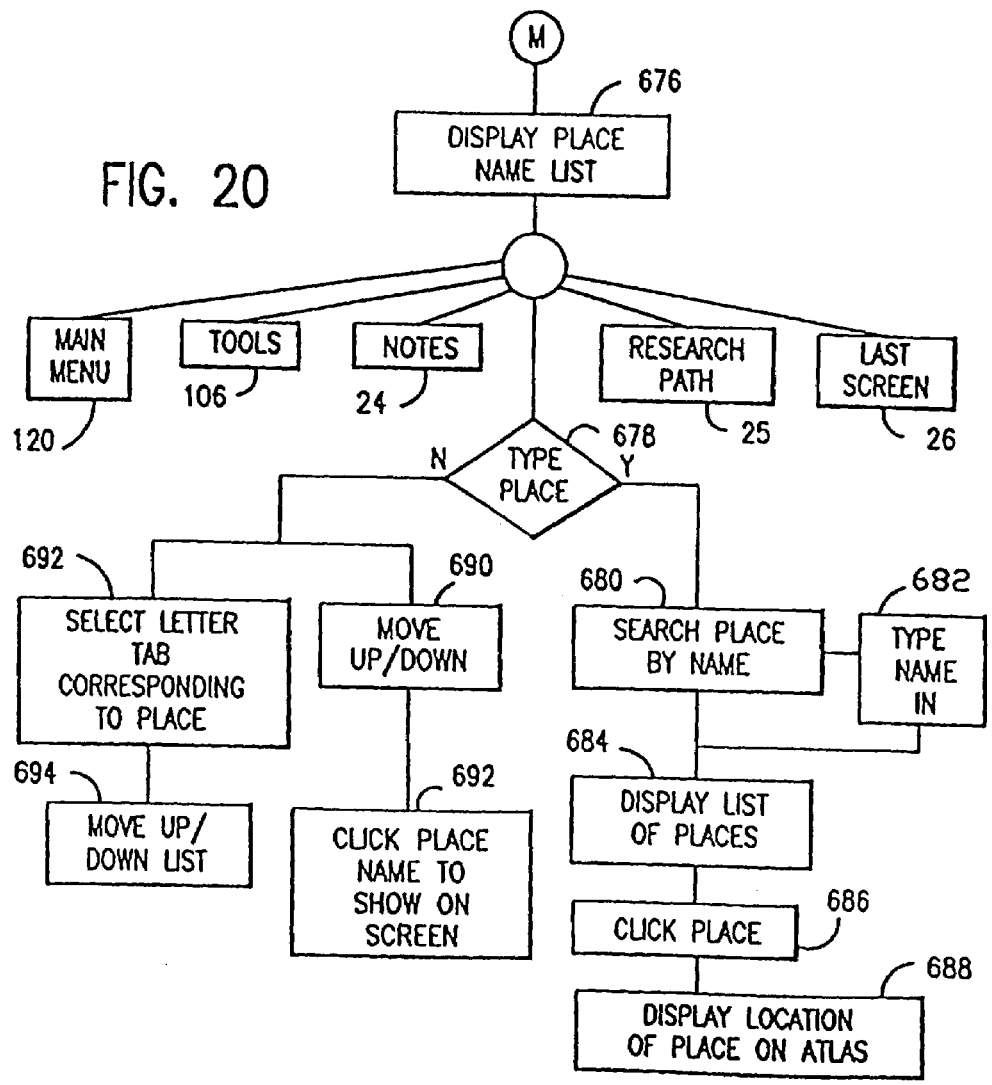
FIG. 20 is a flow chart of the logical operations of the Place Name subroutine for the World Atlas entry path of FIG. 18.

Step 674 relates to the Place Finder search path. This feature enables a user to search the globe in three ways: (1) by clicking a mouse on the up/down arrow and moving through an alphabetical list of places, (2) by clicking a letter tab that appears along the side of the list of places, or (3) by typing in the first few letters of a place that the user wants to see. Once the place is found on the list, by any of the above methods, the user then clicks the mouse on that place entry, and that entry will be immediately displayed on the globe. Operations of the place finder program are shown in more detail in FIG. 20. Specifically, the place name list is first displayed upon activating the place finder icon 676. The user is then provided with a selection of functions including Tools 106, Notes 24, Research Path 25, Last Screen 26 and Main Menu 120. In addition to these functions, the user may search the place name list at step 678.

If the user decides to search the place name list 678 by name 680, he must first type in the name in the place box 682. A search by the computer of the list of names 684 then occurs. If the user then clicks the mouse on the place name 686 on the list, a map having the place identified at its center is shown 688. Activating the up/down icons 690 or selecting a letter tab corresponding to the first letter of the place name list 692 and 694 also will turn up place names for the list.

Returning to FIG. 18, the Atlas also may be rotated by moving the mouse to a new place on the Atlas 700 and then clicking on the mouse 702. As a result, the Atlas will be redisplayed with the cursor positioned as it's center.

The World Atlas entry path 80 can be used to approximate the latitude and longitude of many places. For example, whenever a map is on the screen, the coordinates of the latitude and longitude of that point in the center of the screen appear across the top of the screen. Reference coordinates are available whether or not the latitude and longitude lines appear on the map. Moreover, when the place name search path is used in conjunction with the latitude and longitude functions, the exact coordinates of that place are thereby made available. However, if a place that does not have a discrete location is searched (e.g., river, region) then the computer draws a map around the center-point of the screen region or area displayed.

For example, suppose the user accesses the place name search path to draw a map of Shanghai, China. A circle representing the geographic location of Shanghai then appears at the center of the screen and the highlighted word "Shanghai" is displayed next to it. The latitude and longitude of the city (31N 121E) also appear on the display. If the user then clicks the mouse on the "Lat/Long On" icon at step 670, the computer will add lines for the latitude and longitude. This will then give the user a better idea of the location of various places on the map.

Alternatively, if the user decides to see a rap of "Korea", the computer will then re-draw the map so that Korea is at the center of the screen. The latitude and longitude reading in the title line (36N 127E) thereby represents the coordinates of the approximate center of the country of Korea.

Another feature of the World Atlas entry path, is that when a map is drawn, the arrow cursor remains in the prompt line and cannot be moved up into the map area. Only after a map has been completely drawn, shaded and labelled (if labels are turned on), can the cursor be moved onto the map.

All cities that appear on the map have a circle next to their labels. A circle indicates the geographic location of the city. Cities that are capitals of countries are marked with a star surrounded by a circle. Cities that are capitals of states have a star located next to their labels. When the place finder is used, the place label will be highlighted on the map that is drawn, and a symbol will be located at the center of the screen.

Figure 21:
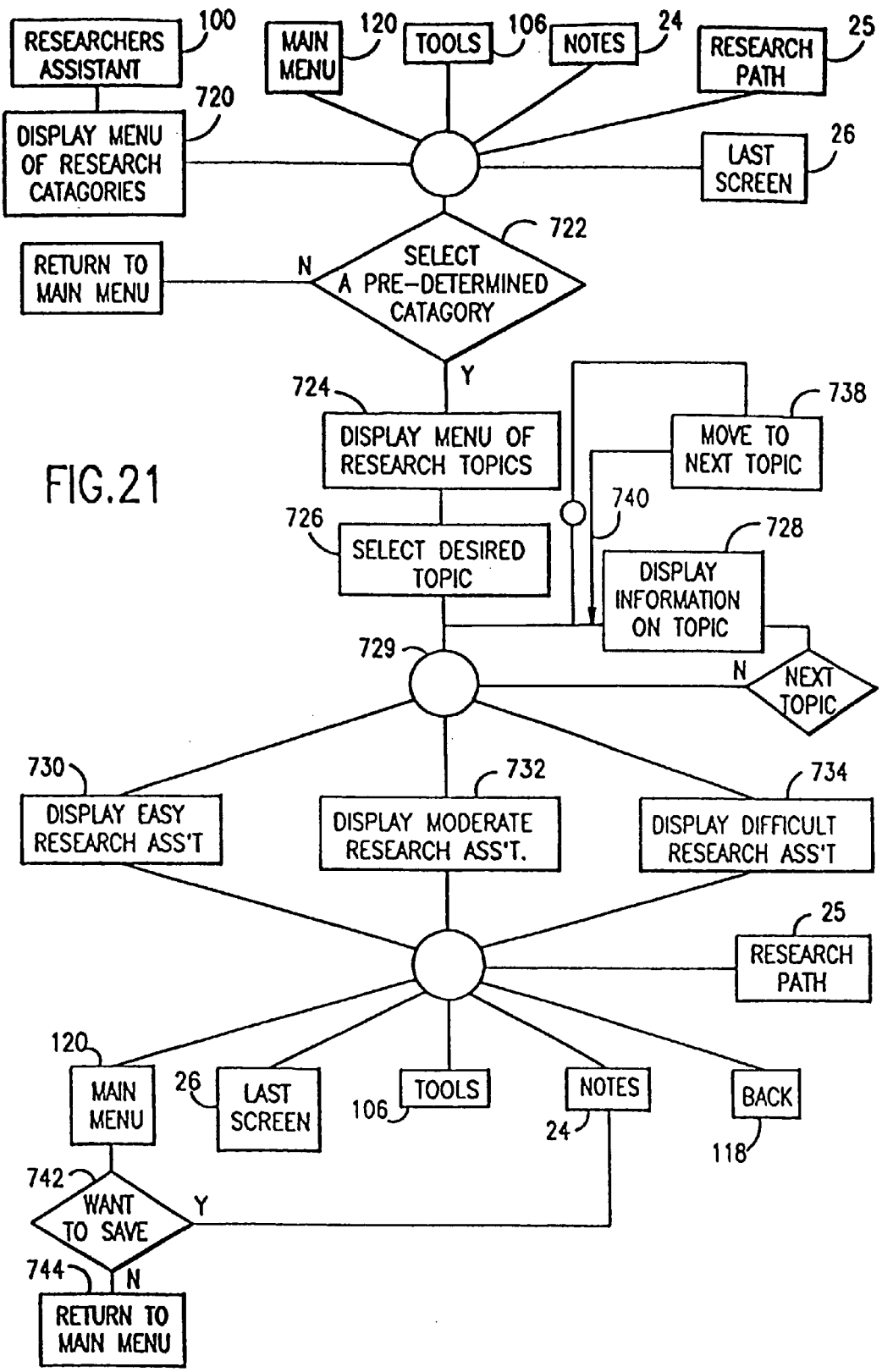
FIG. 21 is a flow chart of the logical operations of the Researcher's Assistant entry path.

FIG. 21 illustrates the logical operations of the Researcher's Assistant entry path 70. The purpose of the Researchers Assistant is to set-up research questions for users. Researcher's Assistant contains numerous articles divided into several categories. Each particular category consists of topics containing three assignments. The assignments are marked according to their level of difficulty for the user. To use the Researcher's Assistant 100, a display 720 is provided to the user which allows him to select from one of several available topic categories. A number of other options are available on the display's prompt line including Notes 24, Research Path 25, Last Screen 26, Tools 106 and the Main Menu 120.

If a research category is selected 722 from display 720, then a list of research topics appears 724. The user may then select the research assignment after reviewing the displayed description of the topic 728. The selection step 729 involves three levels of difficulty 730, 732 and 734. An assignment is selected by clicking a mouse on the chosen assignment. The user may then review information about the topic and about the assignment. Once the user makes a decision about which assignment to work on, he can then cut and paste that assignment into his Notes 24 and then return to the Main Menu through function 120. In the Main Menu, the user can then choose an appropriate entry path for that assignment. The other options include the ability to go back and view the last screen 26, to go to another program from the Research Path list 25, to go back to the last decision step through the Back function 118 or to employ Tools 106.

For example, if the user is interested in doing research on "spiders" he then selects "Living Things" from the research categories at step 720. The term "spider" would then be selected from the topic list at step 726. The user would then read the screens of introductory text for that topic and move through those screens using the down arrow at step 728. At the end of the topic, three assignments would be available:

Make That Four Pairs Of Shoes Please

Spiders Have Feelings Too

Beautiful But Deadly

To make a selection 729, the user clicks the name of the assignment 730, 732 and 734 so that the information on the assignment will then be displayed. That information includes the name of articles where the user will find the information for that assignment.

Should a different assignment on the same topic be desired, the Back function 118 returns the user to the screen where the three assignments 730, 732 and 734 are listed. Should the user want to then select a different topic from the same category, the Back function 118 is activated again, returning to the topic menu 724. Clicking Back 118 once more, returns to the menu of research categories where the user can select a new category of topics.

Any time the user is looking at the introductory text for a topic, the user can click the next topic function 736 which will move them ahead 738 to the next topic in the same category without having to return to the topic menu 740. To change a research category, however, the Back function 118 must be employed as described above.

Once the user has determined which assignment he wants to search by clicking the Main Menu 120, the user is then prompted by the display about whether or not he wishes to save that assignment stored in his notes 24. If the answer is "no", the user will return to the Main Menu at step 744.

As an alternative, the Researcher's Assistant path can be designed to be played as a game. The goal of the game is to encourage users to compete in obtaining information from the database. The game is arranged as a competitive scavenger hunt. Each user is asked to collect information about a question and is encouraged to collect facts and store the collected facts in a single storage area. The user then is scored on the time it takes him to retrieve facts and the number of correct facts he collected. The game is played at different levels of difficulty.

Figure 22:
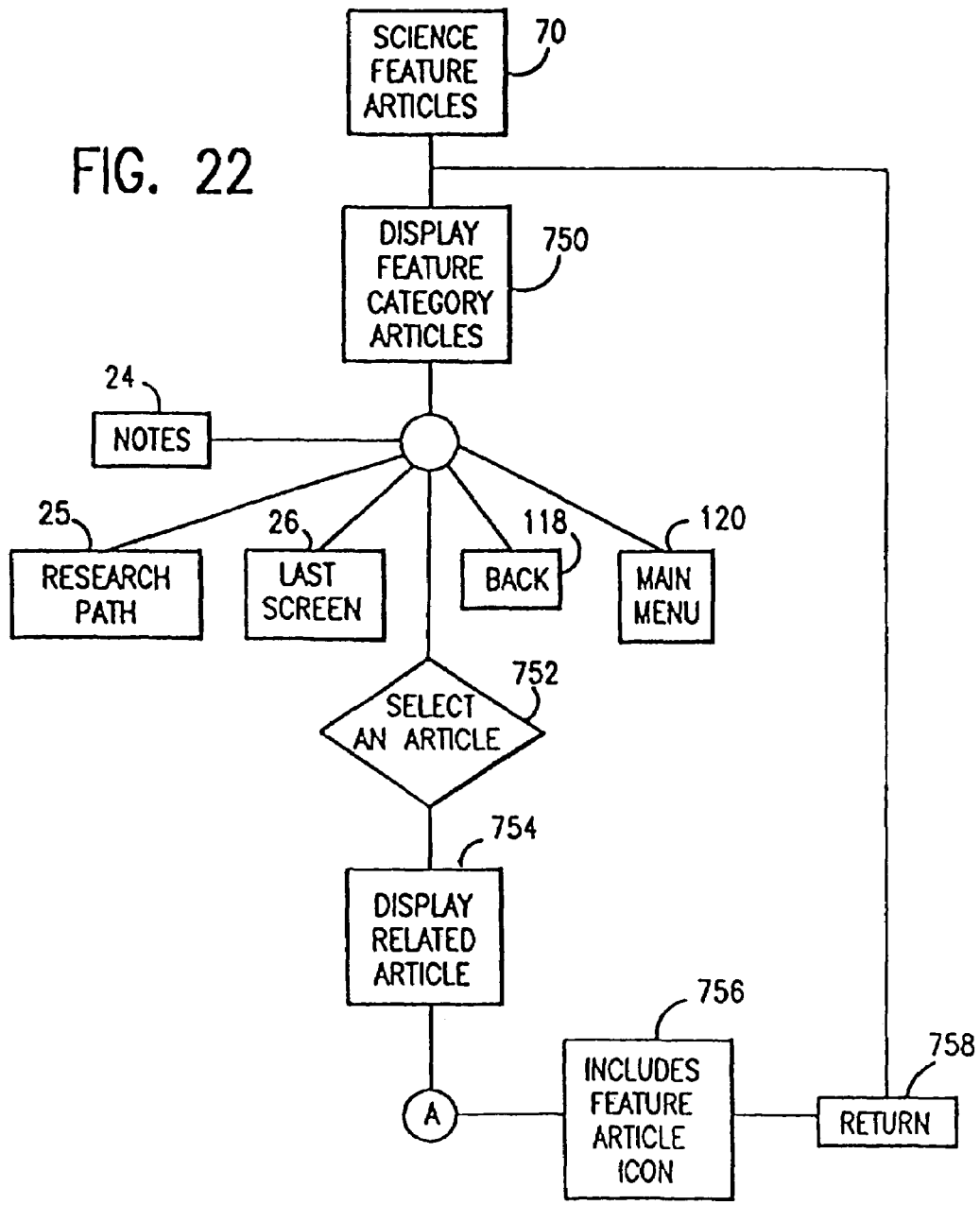
FIG. 22 is a functional flow chart of the logical operations of the Feature Articles entry path.
Figure 23:
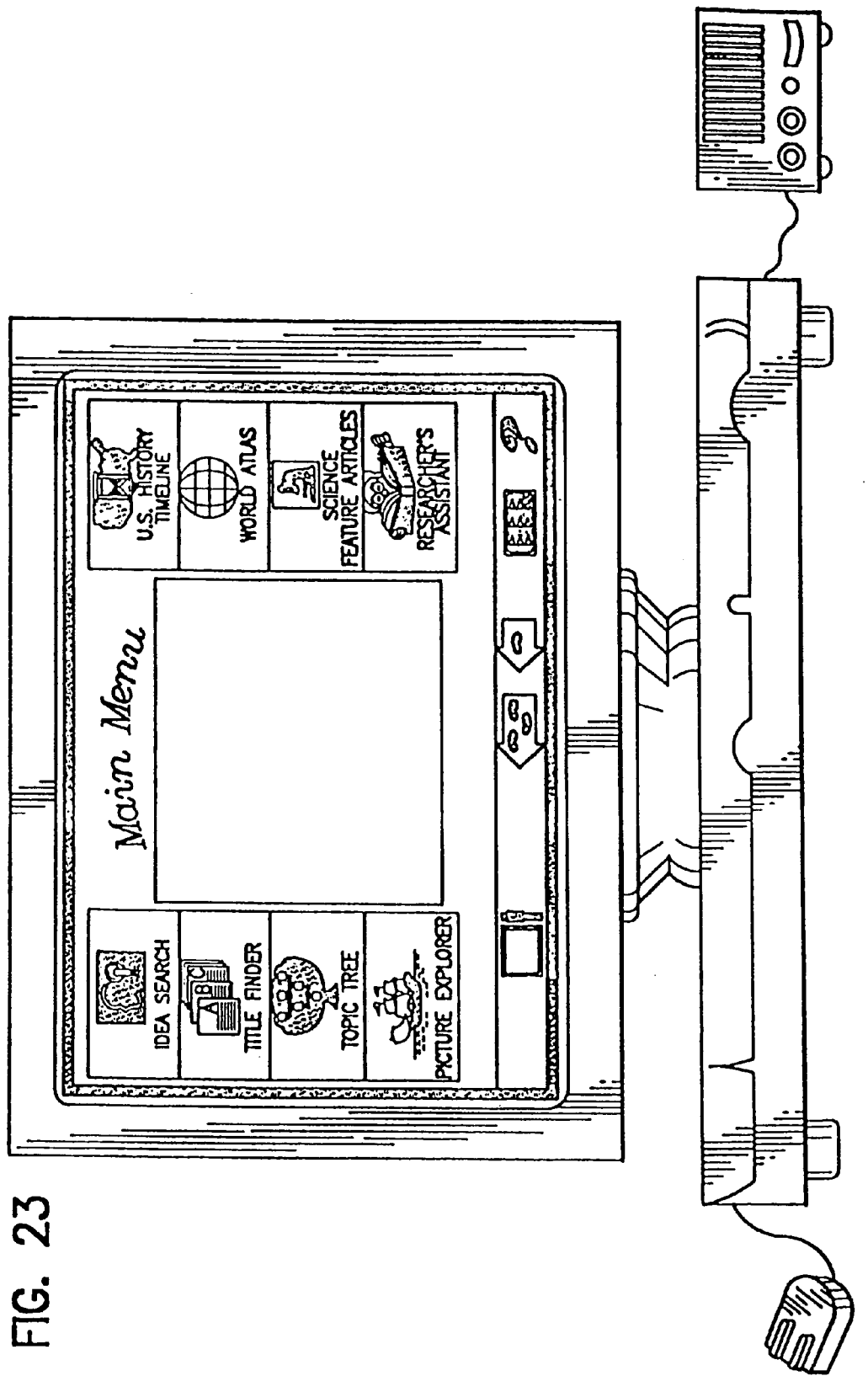
FIG. 23 is a plan view of the search system and related hardware.

FIG. 22 illustrates the Feature Articles entry path 70. This entry path takes the user directly to a number of the most interesting articles in the database. All articles have been enhanced with additional text, sound and pictures. In use, when the user clicks on the entry path icon, a display of the feature categories for Feature Articles are presented 750. The user then selects an article 752 by moving a cursor over one of the titles shown on the display screen 750 and by clicking the mouse. As a result, the display will show page one of the article 754 that is selected. The user then goes to the article display which includes on its prompt line the Feature Articles 756. By clicking the icon on at step 758, the user will return to the Feature Articles menu 70. Other functions available in the Feature Articles entry path 70 are Notes 24, Research Path 25, Last Screen 26, Back 118 and Main Menu 120.

While a particular embodiment of the present invention has been disclosed, it is to be understood that various different modifications are possible and are contemplated as being within the true spirit and scope of the claims. There is no intention, therefore, of limiting this invention to the exact abstract or disclosure presented herein. More particularly, it is contemplated that this invention can be used with any information that can be stored in a database. While the present invention has largely been described with reference to an encyclopaedia, other databases of published graphical or textual information could be included.

The invention claimed is:

1. A computerized map system, comprising:
   a computer readable storage medium;
   computer software stored on the storage medium and operable to:
   cause an image of at least a portion of a map to be displayed on a display screen;
   provide a zoom feature wherein portions of the map can be viewed on the display screen in various scales;
   provide a pan feature wherein the user may provide input to cause the map image on the display screen to pan in a plurality of directions;
   display a plurality of place indicators on the display screen, wherein a specific place indicator indicates the position of a place on the map and indicates that further information about the place is available;
   display text information associated with a first one of the plurality of place indicators in response to input from a user indicating selection of the first place indicator;
   provide a text browse feature that allows the user to browse a first list of places, select a first place from the first list, and display an image of a part of the map indicating the location of the first place in response to input from the user; and
   provide a text search feature that allows the user to enter textual search information to search for a second place, receive a second list of places in response to the search, select a second place from the second list of places, and display an image of a part of the map indicating the location of the second place in response to input from the user.

2. The system of claim 1, wherein the computer software is further operable to display reference coordinates on the display screen corresponding to the geographic location of at least one point on the map displayed on the display screen.

3. The system of claim 2, wherein the reference coordinates are latitude and longitude coordinates.

4. The system of claim 3, wherein the computer software is further operable to cause latitude and longitude lines to be displayed on the display screen.

5. The system of claim 1, wherein the computer software is further operable to display reference coordinates on the display screen corresponding to the geographic location of the first place after the user has selected the first place.

6. The system of claim 1, wherein the computer software is further operable to display reference coordinates on the display screen corresponding to the geographic location of the second place after the user has selected the second place.

7. The system of claim 1, wherein the computer software is further operable to cause latitude and longitude lines to be displayed on the display screen.

8. The system of claim 1, wherein the computer software is further operable to cause at least one textual article about a place on the map to be retrieved in response to input from the user.

9. The system of claim 1, wherein the computer software is further operable to allow the user to provide input that causes a cursor to move on the display screen; and cause the portion of the map displayed on the display screen to be altered in response to the movement of the cursor.

10. The system of claim 9, wherein the computer software is further operable to display reference coordinates on the display screen corresponding to the geographic location of at least one point on the map displayed on the display screen.

11. The system of claim 9, wherein the computer software is further operable to display reference coordinates on the display screen corresponding to the geographic location of the first place after the user has selected the first place.

12. The system of claim 9, wherein the computer software is further operable to display reference coordinates on the display screen corresponding to the geographic location of the second place after the user has selected the second place.

13. The system of claim 9, wherein the computer software is further operable to allow the user to selectively control whether the place indicators are displayed on the display screen.

14. The system of claim 13, wherein the computer software is further operable to display reference coordinates on the display screen corresponding to the geographic location of at least one point on the map displayed on the display screen.

15. The system of claim 13, wherein the computer software is further operable to display reference coordinates on the display screen corresponding to the geographic location of the first place after the user has selected the first place.

16. The system of claim 13, wherein the computer software is further operable to display reference coordinates on the display screen corresponding to the geographic location of the second place after the user has selected the second place.

17. The system of claim 13, wherein the computer software is further operable to cause a mileage scale to be displayed on the display screen for the portion of the map that is being displayed.

18. The system of claim 13, wherein the text browse feature displays a list of places that a user may scroll through.

19. The system of claim 18, wherein the computer software is further operable to display reference coordinates on the display screen corresponding to the geographic location of at least one point on the map displayed on the display screen.

20. The system of claim 19, wherein the computer software is further operable to cause a mileage scale to be displayed on the display screen for the portion of the map that is being displayed.

21. The system of claim 18, wherein the computer software is further operable to display reference coordinates on the display screen corresponding to the geographic location of the first place after the user has selected the first place.

22. The system of claim 18, wherein the computer software is further operable to display reference coordinates on the display screen corresponding to the geographic location of the second place after the user has selected the second place.

23. The system of claim 1, wherein the computer software is further operable to display place names on the display screen.

24. The system of claim 23, wherein the computer software is further operable to allow the user to selectively control whether place names are displayed on the display screen.

25. The system of claim 23, wherein the place names serve as place indicators.

26. The system of claim 1, wherein the computer software is further operable to allow the user to selectively control whether the place indicators are displayed on the display screen.

27. The system of claim 26, wherein the computer software is further operable to display reference coordinates on the display screen corresponding to the geographic location of at least one point on the map displayed on the display screen.

28. The system of claim 26, wherein the computer software is further operable to display reference coordinates on the display screen corresponding to the geographic location of the first place after the user has selected the first place.

29. The system of claim 26, wherein the computer software is further operable to display reference coordinates on the display screen corresponding to the geographic location of the second place after the user has selected the second place.

30. The system of claim 26, wherein the computer software is further operable to cause a mileage scale to be displayed on the display screen for the portion of the map that is being displayed.

31. The system of claim 30, wherein the computer software is further operable to display reference coordinates on the display screen corresponding to the geographic location of at least one point on the map displayed on the display screen.

32. The system of claim 30, wherein the computer software is further operable to display reference coordinates on the display screen corresponding to the geographic location of the first place after the user has selected the first place.

33. The system of claim 30, wherein the computer software is further operable to display reference coordinates on the display screen corresponding to the geographic location of the second place after the user has selected the second place.

34. The system of claim 1, wherein the computer software is further operable to cause a mileage scale to be displayed on the display screen for the portion of the map that is being displayed.

35. The system of claim 1, wherein the text browse feature displays a list of places that a user may scroll through.

36. The system of claim 35, wherein the computer software is further operable to display reference coordinates on the display screen corresponding to the geographic location of at least one point on the map displayed on the display screen.

37. The system of claim 35, wherein the computer software is further operable to display reference coordinates on the display screen corresponding to the geographic location of the first place after the user has selected the first place.

38. The system of claim 35, wherein the computer software is further operable to display reference coordinates on the display screen corresponding to the geographic location of the second place after the user has selected the second place.

39. The system of claim 35, wherein the computer software is further operable to allow the user to provide input that causes a cursor to move on the display screen; and cause the portion of the map displayed on the display screen to be altered in response to the movement of the cursor.

40. The system of claim 39 wherein the computer software is further operable to display reference coordinates on the display screen corresponding to the geographic location of at least one point on the map displayed on the display screen.

41. The system of claim 39, wherein the computer software is further operable to display reference coordinates on the display screen corresponding to the geographic location of the first place after the user has selected the first place.

42. The system of claim 39, wherein the computer software is further operable to display reference coordinates on the display screen corresponding to the geographic location of the second place after the user has selected the second place.

43. The system of claim 35, wherein the computer software is further operable to allow the user to selectively control whether the place indicators are displayed on the display screen.

44. The system of claim 43, wherein the computer software is further operable to display reference coordinates on the display screen corresponding to the geographic location of at least one point on the map displayed on the display screen.

45. The system of claim 43, wherein the computer software is further operable to display reference coordinates on the display screen corresponding to the geographic location of the first place after the user has selected the first place.

46. The system of claim 43, wherein the computer software is further operable to display reference coordinates on the display screen corresponding to the geographic location of the second place after the user has selected the second place.

47. The system of claim 1, wherein at least part of the text information may also be retrieved through either the text browse feature or text search feature.

48. The computerized map system of claim 1, further comprising:
- an idea entry path for searching textual information stored on the storage medium for terms and phrases that closely resemble a search inquiry;
- a title finder entry path for locating titles, wherein the titles are searched using the title finder entry path by moving through an alphabetical list of titles;
- a topic tree entry path for dividing certain textual information into topics and sub-topics in order to assist a user in browsing through the textual information;
- a picture explorer entry path for locating at least one picture stored on the storage medium and for retrieving textual information related to the at least one picture;
- a history timeline entry path for displaying historical events arranged on a timeline in order that a user may access in formation about one of the events;
- a feature articles entry path which takes a user directly to at least one article stored in the storage medium; and
- a researcher's assistant entry path which contains subject matter categories divided into topics, wherein the topics are further divided into research assignments and wherein the research assignments are ordered by level of difficulty.

49. A method of electronically using a map, comprising:
causing an image of at least a portion of a map to be displayed on an electronic display screen;
providing a zoom feature wherein portions of the map can be viewed on the display screen in various scales;
providing a pan feature wherein the user may provide input to cause the map image on the display screen to pan in a plurality of directions;
displaying a plurality of place indicators on the display screen, wherein a specific place indicator indicates the position of a place on the map and indicates that further information about the place is available;
displaying text information associated with a first one of the plurality of place indicators in response to input from a user indicating selection of the first place indicator;
providing a text browse feature that allows the user to browse a first list of places, select a first place from the first list, and display an image of a part of the map indicating the location of the first place in response to input from the user; and
providing a text search feature that allows the user to enter textual search information to search for a second place, receive a second list of places in response to the search, select a second place from the second list of places, and display an image of a part of the map indicating the location of the second place in response to input from the user.

50. The method of claim 49, further comprising displaying reference coordinates on the display screen corresponding to the geographic location of at least one point on the map displayed on the display screen.

51. The method of claim 50, wherein the reference coordinates are latitude and longitude coordinates.

52. The method of claim 51, further comprising causing latitude and longitude lines to be displayed on the display screen.

53. The method of claim 49, further comprising displaying reference coordinates on the display screen corresponding to the geographic location of the first place after the user has selected the first place.

54. The method of claim 49, further comprising displaying reference coordinates on the display screen corresponding to the geographic location of the second place after the user has selected the second place.

55. The method of claim 49, further comprising causing latitude and longitude lines to be displayed on the display screen.

56. The method of claim 49, further comprising causing at least one textual article about a place on the map to be retrieved in response to input from the user.

57. The method of claim 49, further comprising causing a cursor to move on the display screen in response to input from the user; and causing the portion of the map displayed on the display screen to be altered in response to the movement of the cursor.

58. The method of claim 57, further comprising displaying reference coordinates on the display screen corresponding to the geographic location of at least one point on the map displayed on the display screen.

59. The method of claim 57, further comprising displaying reference coordinates on the display screen corresponding to the geographic location of the first place after the user has selected the first place.

60. The method of claim 57, further comprising displaying reference coordinates on the display screen corresponding to the geographic location of the second place after the user has selected the second place.

61. The method of claim 57, further comprising selectively controlling whether the place indicators are displayed on the display screen in response to input from the user.

62. The method of claim 61, further comprising displaying reference coordinates on the display screen corresponding to the geographic location of at least one point on the map displayed on the display screen.

63. The method of claim 61, further comprising displaying reference coordinates on the display screen corresponding to the geographic location of the first place after the user has selected the first place.

64. The method of claim 57, further comprising displaying reference coordinates on the display screen corresponding to the geographic location of the second place after the user has selected the second place.

65. The method of claim 57, further comprising causing a mileage scale to be displayed on the display screen for the portion of the map that is being displayed.

66. The method of claim 57, wherein the text browse feature displays a list of places that a user may scroll through.

67. The method of claim 66, further comprising displaying reference coordinates on the display screen corresponding to the geographic location of at least one point on the map displayed on the display screen.

68. The method of claim 67, further comprising causing a mileage scale to be displayed on the display screen for the portion of the map that is being displayed.

69. The method of claim 66, further comprising displaying reference coordinates on the display screen corresponding to the geographic location of the first place after the user has selected the first place.

70. The method of claim 66, further comprising displaying reference coordinates on the display screen corresponding to the geographic location of the second place after the user has selected the second place.

71. The method of claim 49, further comprising displaying place names on the display screen.

72. The method of claim 71, further comprising selectively controlling whether place names are displayed on the display screen in response to input from the user.

73. The method of claim 71, wherein the place names serve as place indicators.

74. The method of claim 49, further comprising selectively controlling whether the place indicators are displayed on the display screen in response to input from the user.

75. The method of claim 74, further comprising displaying reference coordinates on the display screen corresponding to the geographic location of at least one point on the map displayed on the display screen.

76. The method of claim 74, further comprising displaying reference coordinates on the display screen corresponding to the geographic location of the first place after the user has selected the first place.

77. The method of claim 74, further comprising displaying reference coordinates on the display screen corresponding to the geographic location of the second place after the user has selected the second place.

78. The method of claim 74, further comprising causing a mileage scale to be displayed on the display screen for the portion of the map that is being displayed.

79. The method of claim 78, further comprising displaying reference coordinates on the display screen corresponding to the geographic location of at least one point on the map displayed on the display screen.

80. The method of claim 78, further comprising displaying reference coordinates on the display screen corresponding to the geographic location of the first place after the user has selected the first place.

81. The method of claim 78, further comprising displaying reference coordinates on the display screen corresponding to the geographic location of the second place after the user has selected the second place.

82. The method of claim 49, further comprising causing a mileage scale to be displayed on the display screen for the portion of the map that is being displayed.

83. The method of claim 49, wherein the text browse feature displays a list of places that a user may scroll through.

84. The method of claim 83, further comprising displaying reference coordinates on the display screen corresponding to the geographic location of at least one point on the map displayed on the display screen.

85. The method of claim 83, further comprising displaying reference coordinates on the display screen corresponding to the geographic location of the first place after the user has selected the first place.

86. The method of claim 83, further comprising displaying reference coordinates on the display screen corresponding to the geographic location of the second place after the user has selected the second place.

87. The method of claim 83, further comprising causing a cursor to move on the display screen in response to input from the user; and causing the portion of the map displayed on the display screen to be altered in response to the movement of the cursor.

88. The method of claim 87, further comprising displaying reference coordinates on the display screen corresponding to the geographic location of at least one point on the map displayed on the display screen.

89. The method of claim 87, further comprising displaying reference coordinates on the display screen corresponding to the geographic location of the first place after the user has selected the first place.

90. The method of claim 87, further comprising displaying reference coordinates on the display screen corresponding to the geographic location of the second place after the user has selected the second place.

91. The method of claim 83, further comprising selectively controlling whether place names are displayed on the display screen in response to input from the user.

92. The method of claim 91, further comprising displaying reference coordinates on the display screen corresponding to the geographic location of at least one point on the map displayed on the display screen.

93. The method of claim 91, further comprising displaying reference coordinates on the display screen corresponding to the geographic location of the first place after the user has selected the first place.

94. The method of claim 91, further comprising displaying reference coordinates on the display screen corresponding to the geographic location of the second place after the user has selected the second place.

95. The method of claim 49, wherein at least part of the text information may also be retrieved through either the text browse feature or text search feature.

96. A computerized map system, comprising:
a computer readable storage medium;
computer software stored on the storage medium and operable to:
cause an image of at least a portion of a map to be displayed on a display screen;
change the portion of the map displayed on the display screen in response to user input;
display a plurality of place indicators on the display screen, wherein a specific place indicator indicates the position of a place on the map and indicates that further information about the place is available;
display text information associated with a first one of the plurality of place indicators in response to input from a user indicating selection of the first place indicator;
provide a text search feature that allows the user to enter textual search information to search for a first place, receive a first list of places in response to the search, select a first place from the first list of places, and display an image of a part of the map indicating the location of the first place in response to input from the user; and
provide a text browse feature that allows the user to browse a second list of places, select a second place from the second list, and display an image of a part of the map indicating the location of the second place in response to input from the user.

97. The system of claim 96, wherein the computer software is further operable to display reference coordinates on the display screen corresponding to the geographic location of at least one point on the map displayed on the display screen.

98. The system of claim 97, wherein the reference coordinates are latitude and longitude coordinates.

99. The system of claim 96, wherein the computer software is further operable to display reference coordinates on the display screen corresponding to the geographic location of the first place after the user has selected the first place.

100. The system of claim 96, wherein the computer software is further operable to allow the user to provide input that causes a cursor to move on the display screen; and cause the portion of the map displayed on the display screen to be altered in response to the movement of the cursor.

101. The system of claim 100, wherein the computer software is further operable to allow the user to selectively control whether place names are displayed on the display screen.

102. The system of claim 100, wherein the computer software is further operable to display reference coordinates on the display screen corresponding to the geographic location of at least one point on the map displayed on the display screen.

103. The system of claim 100, wherein the computer software is further operable to display reference coordinates on the display screen corresponding to the geographic location of the first place after the user has selected the first place.

104. The system of claim 100, wherein the computer software is further operable to allow the user to selectively control whether the place indicators are displayed on the display screen.

105. The system of claim 104, wherein the computer software is further operable to display reference coordinates on the display screen corresponding to the geographic location of at least one point on the map displayed on the display screen.

106. The system of claim 100, wherein the place names serve as place indicators.

107. The system of claim 96, wherein the computer software is further operable to display place names on the display screen.

108. The system of claim 96, wherein the computer software is further operable to allow the user to selectively control whether the place indicators are displayed on the display screen.

109. The system of claim 108, wherein the computer software is further operable to display reference coordinates on the display screen corresponding to the geographic location of at least one point on the map displayed on the display screen.

110. The system of claim 108, wherein the computer software is further operable to display reference coordinates on the display screen corresponding to the geographic location of the first place after the user has selected the first place.

111. The system of claim 96, wherein the computer software is further operable to cause a mileage scale to be displayed on the display screen for the portion of the map that is being displayed.

112. The system of claim 96, wherein at least part of the text information may also be retrieved through the text search feature.

113. A method of electronically using a map, comprising:
causing an image of at least a portion of a map to be displayed on a display screen;
changing the portion of the map displayed on the display screen in response to user input;
displaying a plurality of place indicators on the display screen, wherein a specific place indicator indicates the position of a place on the map and indicates that further information about the place is available;
displaying text information associated with a first one of the plurality of place indicators in response to input from a user indicating selection of the first place indicator;
providing a text search feature that allows the user to enter textual search information to search for a first place, receive a first list of places in response to the search, select a first place from the first list of places, and display an image of a part of the map indicating the location of the first place in response to input from the user; and
providing a text browse feature that allows the user to browse a second list of places, select a second place from the second list, and display an image of a part of the map indicating the location of the second place in response to input from the user.

114. The method of claim 113, further comprising displaying reference coordinates on the display screen corresponding to the geographic location of at least one point on the map displayed on the display screen.

115. The method of claim 114, wherein the reference coordinates are latitude and longitude coordinates.

116. The method of claim 113, further comprising displaying reference coordinates on the display screen corresponding to the geographic location of the first place after the user has selected the first place.

117. The method of claim 113, further comprising causing a cursor to move on the display screen in response to input from the user; and causing the portion of the map displayed on the display screen to be altered in response to the movement of the cursor.

118. The method of claim 117, further comprising displaying reference coordinates on the display screen corresponding to the geographic location of at least one point on the map displayed on the display screen.

119. The method of claim 117, further comprising displaying reference coordinates on the display screen corresponding to the geographic location of the first place after the user has selected the first place.

120. The method of claim 117, further comprising selectively controlling whether the place indicators are displayed on the display screen in response to input from the user.

121. The method of claim 120, further comprising displaying reference coordinates on the display screen corresponding to the geographic location of at least one point on the map displayed on the display screen.

122. The method of claim 113, further comprising displaying place names on the display screen.

123. The method of claim 122, further comprising selectively controlling whether place names are displayed on the display screen in response to input from the user.

124. The method of claim 122, wherein the place names serve as place indicators.

125. The method of claim 113, further comprising selectively controlling whether the place indicators are displayed on the display screen in response to input from the user.

126. The method of claim 125, further comprising displaying reference coordinates on the display screen corresponding to the geographic location of at least one point on the map displayed on the display screen.

127. The method of claim 125, further comprising displaying reference coordinates on the display screen corresponding to the geographic location of the first place after the user has selected the first place.

128. The method of claim 113, further comprising causing a mileage scale to be displayed on the display screen for the portion of the map that is being displayed.

129. The method of claim 113, wherein at least part of the text information may also be retrieved through the text search feature.

* * * * *